US012527693B2

(12) United States Patent
Locke

(10) Patent No.: US 12,527,693 B2
(45) Date of Patent: Jan. 20, 2026

(54) DRESSING WITH INTEGRATED SENSOR FOR NEGATIVE-PRESSURE THERAPY

(71) Applicant: Solventum Intellectual Properties Company, Maplewood, MN (US)

(72) Inventor: Christopher Brian Locke, Bournemouth (GB)

(73) Assignee: Solventum Intellectual Properties Company, Maplewood, MN (US)

( * ) Notice: Subject to any disclaimer, the term of this patent is extended or adjusted under 35 U.S.C. 154(b) by 791 days.

(21) Appl. No.: 17/621,601

(22) PCT Filed: Jun. 11, 2020

(86) PCT No.: PCT/US2020/037253
§ 371 (c)(1),
(2) Date: Dec. 21, 2021

(87) PCT Pub. No.: WO2020/263584
PCT Pub. Date: Dec. 30, 2020

(65) Prior Publication Data
US 2022/0354704 A1 Nov. 10, 2022

Related U.S. Application Data

(60) Provisional application No. 62/865,745, filed on Jun. 24, 2019.

(51) Int. Cl.
*A61F 13/05* (2024.01)
*A61F 13/02* (2006.01)
*A61F 13/00* (2006.01)
(52) U.S. Cl.
CPC .......... *A61F 13/0243* (2013.01); *A61F 13/05* (2024.01); *A61F 2013/00659* (2013.01);
(Continued)

(58) Field of Classification Search
CPC .............. A61F 13/05; A61F 2013/0094; A61F 2013/0095; A61M 1/90; A61M 1/96; A61M 1/966; A61M 1/73; A61M 1/732
See application file for complete search history.

(56) References Cited

U.S. PATENT DOCUMENTS 1,355,846 A   10/1920  Rannells
2,547,758 A    4/1951  Keeling
(Continued)

FOREIGN PATENT DOCUMENTS

AU    550575 B2   3/1986
AU    745271 B2   3/2002
(Continued)

OTHER PUBLICATIONS

International Search Report and Written Opinion Corresponding to Application No. PCT/US2020/037253, mailed Sep. 18, 2020.
(Continued)

*Primary Examiner* — Catharine L Anderson

(57) ABSTRACT

A dressing for treating a tissue site with negative pressure, having an integrated sensor comprising a force or load measurement sensor. The sensor may telemeter to a therapy system the deformation of the dressing as the dressing is pushed into the tissue site during the application of negative pressure to the tissue site. The sensor may measure the force that is applied to the dressing. Measurements of the force applied to the dressing may be taken using the sensor on a periodic basis during negative-pressure therapy to enable monitoring of the fill level of the tissue site as granulation tissue fills the tissue site. Monitoring of the force applied to the tissue site over the course of negative-pressure therapy may assist a clinician in making decisions on how to manage and treat the patient, as well as providing confirmatory data about the efficacy of the therapy.

28 Claims, 28 Drawing Sheets

(52) U.S. Cl.
CPC .............. *A61F 2013/00727* (2013.01); *A61F 2013/00957* (2013.01)

(56) References Cited

U.S. PATENT DOCUMENTS

| | | | |
|---|---|---|---|
| 2,632,443 A | 3/1953 | Lesher | |
| 2,682,873 A | 7/1954 | Evans et al. | |
| 2,910,763 A | 11/1959 | Lauterbach | |
| 2,969,057 A | 1/1961 | Simmons | |
| 3,066,672 A | 12/1962 | Crosby, Jr. et al. | |
| 3,367,332 A | 2/1968 | Groves | |
| 3,520,300 A | 7/1970 | Flower, Jr. | |
| 3,568,675 A | 3/1971 | Harvey | |
| 3,648,692 A | 3/1972 | Wheeler | |
| 3,682,180 A | 8/1972 | McFarlane | |
| 3,826,254 A | 7/1974 | Mellor | |
| 4,080,970 A | 3/1978 | Miller | |
| 4,096,853 A | 6/1978 | Weigand | |
| 4,139,004 A | 2/1979 | Gonzalez, Jr. | |
| 4,165,748 A | 8/1979 | Johnson | |
| 4,184,510 A | 1/1980 | Murry et al. | |
| 4,233,969 A | 11/1980 | Lock et al. | |
| 4,245,630 A | 1/1981 | Lloyd et al. | |
| 4,256,109 A | 3/1981 | Nichols | |
| 4,261,363 A | 4/1981 | Russo | |
| 4,275,721 A | 6/1981 | Olson | |
| 4,284,079 A | 8/1981 | Adair | |
| 4,297,995 A | 11/1981 | Golub | |
| 4,333,468 A | 6/1982 | Geist | |
| 4,373,519 A | 2/1983 | Errede et al. | |
| 4,382,441 A | 5/1983 | Svedman | |
| 4,392,853 A | 7/1983 | Muto | |
| 4,392,858 A | 7/1983 | George et al. | |
| 4,419,097 A | 12/1983 | Rowland | |
| 4,465,485 A | 8/1984 | Kashmer et al. | |
| 4,475,909 A | 10/1984 | Eisenberg | |
| 4,480,638 A | 11/1984 | Schmid | |
| 4,525,166 A | 6/1985 | Leclerc | |
| 4,525,374 A | 6/1985 | Vaillancourt | |
| 4,540,412 A | 9/1985 | Van Overloop | |
| 4,543,100 A | 9/1985 | Brodsky | |
| 4,548,202 A | 10/1985 | Duncan | |
| 4,551,139 A | 11/1985 | Plaas et al. | |
| 4,569,348 A | 2/1986 | Hasslinger | |
| 4,605,399 A | 8/1986 | Weston et al. | |
| 4,608,041 A | 8/1986 | Nielsen | |
| 4,640,688 A | 2/1987 | Hauser | |
| 4,655,754 A | 4/1987 | Richmond et al. | |
| 4,664,662 A | 5/1987 | Webster | |
| 4,710,165 A | 12/1987 | McNeil et al. | |
| 4,733,659 A | 3/1988 | Edenbaum et al. | |
| 4,743,232 A | 5/1988 | Kruger | |
| 4,758,220 A | 7/1988 | Sundblom et al. | |
| 4,787,888 A | 11/1988 | Fox | |
| 4,826,494 A | 5/1989 | Richmond et al. | |
| 4,838,883 A | 6/1989 | Matsuura | |
| 4,840,187 A | 6/1989 | Brazier | |
| 4,863,449 A | 9/1989 | Therriault et al. | |
| 4,872,450 A | 10/1989 | Austad | |
| 4,878,901 A | 11/1989 | Sachse | |
| 4,897,081 A | 1/1990 | Poirier et al. | |
| 4,906,233 A | 3/1990 | Moriuchi et al. | |
| 4,906,240 A | 3/1990 | Reed et al. | |
| 4,919,654 A | 4/1990 | Kalt | |
| 4,941,882 A | 7/1990 | Ward et al. | |
| 4,953,565 A | 9/1990 | Tachibana et al. | |
| 4,969,880 A | 11/1990 | Zamierowski | |
| 4,985,019 A | 1/1991 | Michelson | |
| 5,037,397 A | 8/1991 | Kalt et al. | |
| 5,086,170 A | 2/1992 | Luheshi et al. | |
| 5,092,858 A | 3/1992 | Benson et al. | |
| 5,100,396 A | 3/1992 | Zamierowski | |
| 5,134,994 A | 8/1992 | Say | |
| 5,149,331 A | 9/1992 | Ferdman et al. | |
| 5,167,613 A | 12/1992 | Karami et al. | |
| 5,176,663 A | 1/1993 | Svedman et al. | |
| 5,215,522 A | 6/1993 | Page et al. | |
| 5,232,453 A | 8/1993 | Plass et al. | |
| 5,261,893 A | 11/1993 | Zamierowski | |
| 5,278,100 A | 1/1994 | Doan et al. | |
| 5,279,550 A | 1/1994 | Habib et al. | |
| 5,298,015 A | 3/1994 | Komatsuzaki et al. | |
| 5,342,376 A | 8/1994 | Ruff | |
| 5,344,415 A | 9/1994 | DeBusk et al. | |
| 5,358,494 A | 10/1994 | Svedman | |
| 5,437,622 A | 8/1995 | Carion | |
| 5,437,651 A | 8/1995 | Todd et al. | |
| 5,527,293 A | 6/1996 | Zamierowski | |
| 5,549,584 A | 8/1996 | Gross | |
| 5,556,375 A | 9/1996 | Ewall | |
| 5,607,388 A | 3/1997 | Ewall | |
| 5,636,643 A | 6/1997 | Argenta et al. | |
| 5,645,081 A | 7/1997 | Argenta et al. | |
| 6,071,267 A | 6/2000 | Zamierowski | |
| 6,135,116 A | 10/2000 | Vogel et al. | |
| 6,241,747 B1 | 6/2001 | Ruff | |
| 6,287,316 B1 | 9/2001 | Agarwal et al. | |
| 6,345,623 B1 | 2/2002 | Heaton et al. | |
| 6,488,643 B1 | 12/2002 | Tumey et al. | |
| 6,493,568 B1 | 12/2002 | Bell et al. | |
| 6,553,998 B2 | 4/2003 | Heaton et al. | |
| 6,814,079 B2 | 11/2004 | Heaton et al. | |
| 7,846,141 B2 | 12/2010 | Weston | |
| 8,062,273 B2 | 11/2011 | Weston | |
| 8,216,198 B2 | 7/2012 | Heagle et al. | |
| 8,251,979 B2 | 8/2012 | Malhi | |
| 8,257,327 B2 | 9/2012 | Blott et al. | |
| 8,398,614 B2 | 3/2013 | Blott et al. | |
| 8,449,509 B2 | 5/2013 | Weston | |
| 8,529,548 B2 | 9/2013 | Blott et al. | |
| 8,535,296 B2 | 9/2013 | Blott et al. | |
| 8,551,060 B2 | 10/2013 | Schuessler et al. | |
| 8,568,386 B2 | 10/2013 | Malhi | |
| 8,679,081 B2 | 3/2014 | Heagle et al. | |
| 8,834,451 B2 | 9/2014 | Blott et al. | |
| 8,926,592 B2 | 1/2015 | Blott et al. | |
| 9,017,302 B2 | 4/2015 | Vitaris et al. | |
| 9,198,801 B2 | 12/2015 | Weston | |
| 9,211,365 B2 | 12/2015 | Weston | |
| 9,289,542 B2 | 3/2016 | Blott et al. | |
| 10,258,258 B2 * | 4/2019 | Larson | A61B 5/024 |
| 11,717,447 B2 * | 8/2023 | Brownhill | A61F 13/00059 604/543 |
| 11,992,602 B2 * | 5/2024 | Quintanar | A61M 1/966 |
| 2002/0077661 A1 | 6/2002 | Saadat | |
| 2002/0115951 A1 | 8/2002 | Norstrem et al. | |
| 2002/0120185 A1 | 8/2002 | Johnson | |
| 2002/0143286 A1 | 10/2002 | Tumey | |
| 2014/0005618 A1 | 1/2014 | Locke et al. | |
| 2014/0163491 A1 | 6/2014 | Schuessler et al. | |
| 2015/0080788 A1 | 3/2015 | Blott et al. | |
| 2015/0094673 A1 | 4/2015 | Pratt et al. | |
| 2021/0023281 A1 | 1/2021 | Locke et al. | |
| 2021/0282712 A1 * | 9/2021 | Hilgers | A61B 5/721 |

FOREIGN PATENT DOCUMENTS

| | | |
|---|---|---|
| AU | 755496 B2 | 12/2002 |
| CA | 2005436 A1 | 6/1990 |
| DE | 26 40 413 A1 | 3/1978 |
| DE | 43 06 478 A1 | 9/1994 |
| DE | 29 504 378 U1 | 9/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 A1 | 7/2000 |
| GB | 692578 A | 6/1953 |
| GB | 2195255 A | 4/1988 |
| GB | 2 197 789 A | 6/1988 |
| GB | 2 220 357 A | 1/1990 |
| GB | 2 235 877 A | 3/1991 |
| GB | 2 329 127 A | 3/1999 |
| GB | 2 333 965 A | 8/1999 |

(56) References Cited

FOREIGN PATENT DOCUMENTS

| JP | 4129536 B2 | 8/2008 |
|---|---|---|
| SG | 71559 | 4/2002 |
| WO | 80/02182 A1 | 10/1980 |
| WO | 87/04626 A1 | 8/1987 |
| WO | 90/010424 A1 | 9/1990 |
| WO | 93/009727 A1 | 5/1993 |
| WO | 94/20041 A1 | 9/1994 |
| WO | 96/05873 A1 | 2/1996 |
| WO | 97/18007 A1 | 5/1997 |
| WO | 99/13793 A1 | 3/1999 |
| WO | 2017195038 A1 | 11/2017 |
| WO | 2018227144 A1 | 12/2018 |
| WO | 2019036169 A1 | 2/2019 |
| WO | 2020061334 A1 | 3/2020 |

OTHER PUBLICATIONS

Louis C. Argenta, MD and Michael J. Morykwas, PHD; Vacuum-Assisted Closure: A New Method for Wound Control and Treatment: Clinical Experience; Annals of Plastic Surgery; vol. 38, No. 6, Jun. 1997; pp. 563-576.
Susan Mendez-Eatmen, RN; "When wounds Won't Heal" RN Jan. 1998, vol. 61 (1); Medical Economics Company, Inc., Montvale, NJ, USA; pp. 20-24.
James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.
John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.
S.E. Greer, et al. "The Use of Subatmospheric Pressure Dressing Therapy to Close Lymphocutaneous Fistulas of the Groin" British Journal of Plastic Surgery (2000), 53, pp. 484-487.
George V. Letsou, MD., et al; "Stimulation of Adenylate Cyclase Activity in Cultured Endothelial Cells Subjected to Cyclic Stretch"; Journal of Cardiovascular Surgery, 31, 1990, pp. 634-639.
Orringer, Jay, et al; "Management of Wounds in Patients with Complex Enterocutaneous Fistulas"; Surgery, Gynecology & Obstetrics, Jul. 1987, vol. 165, pp. 79-80.
International Search Report for PCT International Application PCT/GB95/01983; Nov. 23, 1995.
PCT International Search Report for PCT International Application PCT/GB98/02713; Jan. 8, 1999.
PCT Written Opinion; PCT International Application PCT/GB98/02713; Jun. 8, 1999.
PCT International Examination and Search Report, PCT International Application PCT/GB96/02802; Jan. 15, 1998 & Apr. 29, 1997.
PCT Written Opinion, PCT International Application PCT/GB96/02802; Sep. 3, 1997.
Dattilo, Philip P., JR., et al; "Medical Textiles: Application of an Absorbable Barbed Bi-directional Surgical Suture"; Journal of Textile and Apparel, Technology and Management, vol. 2, Issue 2, Spring 2002, pp. 1-5.
Kostyuchenok, B.M., et al; "Vacuum Treatment in the Surgical Management of Purulent Wounds"; Vestnik Khirurgi, Sep. 1986, pp. 18-21 and 6 page English translation thereof.
Davydov, YU. A., et al; "Vacuum Therapy in the Treatment of Purulent Lactation Mastitis"; Vestnik Khirurgi, May 14, 1986, pp. 66-70, and 9 page English translation thereof.
Yusupov. YU.N., et al; "Active Wound Drainage", Vestnki Khirurgi, vol. 138, Issue 4, 1987, and 7 page English translation thereof.
Davydov, YU.A., et al; "Bacteriological and Cytological Assessment of Vacuum Therapy for Purulent Wounds"; Vestnik Khirugi, Oct. 1988, pp. 48-52, and 8 page English translation thereof.
Davydov, YU.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.
Chariker, Mark E., M.D., et al; "Effective Management of incisional and cutaneous fistulae with closed suction wound drainage"; Contemporary Surgery, vol. 34, Jun. 1989, pp. 59-63.
Egnell Minor, Instruction Book, First Edition, 300 7502, Feb. 1975, pp. 24.
Egnell Minor: Addition to the Users Manual Concerning Overflow Protection—Concerns all Egnell Pumps, Feb. 3, 1983, pp. 2.
Svedman, P.: "Irrigation Treatment of Leg Ulcers", The Lancet, Sep. 3, 1983, pp. 532-534.
Chinn, Steven D. et al.: "Closed Wound Suction Drainage", The Journal of Foot Surgery, vol. 24, No. 1, 1985, pp. 76-81.
Arnljots, Björn et al.: "Irrigation Treatment in Split-Thickness Skin Grafting of Intractable Leg Ulcers", Scand J. Plast Reconstr. Surg., No. 19, 1985, pp. 211-213.
Svedman, P.: "A Dressing Allowing Continuous Treatment of a Biosurface", IRCS Medical Science: Biomedical Technology, Clinical Medicine, Surgery and Transplantation, vol. 7, 1979, p. 221.
Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.
N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (copy and certified translation).
K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.
G. Živadinovi?, V. ?uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).
F.E. Johnson, "An Improved Technique for Skin Graft Placement Using a Suction Drain," Surgery, Gynecology, and Obstetrics 159 (1984), pp. 584-585.
A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).
M. Schein, R. Saadia, J.R. Jamieson, and G.A.G. Decker, "The 'Sandwich Technique' in the Management of the Open Abdomen," British Journal of Surgery 73 (1986), pp. 369-370.
D.E. Tribble, An Improved Sump Drain-Irrigation Device of Simple Construction, Archives of Surgery 105 (1972) pp. 511-513.
M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).
C.E. Tennants, "The Use of Hypermia in the Postoperative Treatment of Lesions of the Extremities and Thorax," Journal of the American Medical Association 64 (1915), pp. 1548-1549.
Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.
V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").
V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").
V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").
V.A.C. © Therapy Clinical Guidelines: A Reference Source for Clinicians; Jul. 2007.

(56) References Cited

OTHER PUBLICATIONS

2018. Parker FlexSense Sensing Technology. [online] Available at:<https://promo.parker.com/parkerimages/promosite/FlexSense/UNITED%20STATES/Images/FlexSense-Bulletin_010217> [Accessed Dec. 28, 2021].

Jacobson, M. (Feb. 4, 2019). Connectivity for remote monitoring. Today's Medical Developments. Retrieved Dec. 28, 2021, from https://www.todaysmedicaldevelopments.com/article/connectivity-for-remote-monitoring/.

\* cited by examiner

| IF | | | THEN |
|---|---|---|---|
| SENSOR 145 MEASUREMENT | PUMP DUTY | PRESSURE MEASUREMENT | STATUS |
| 1 — LOWER STRAIN (RAPID REDUCTION FROM HIGHER STRAIN TO LOWER STRAIN) | 0% OR VERY LOW | $P_{TARGET}$ | BLOCKAGE IN ANCILLARY LUMEN 475, ANCILLARY CONDUIT 1210, AND/OR ANCILLARY CONDUIT 1215 |
| 2 — LOWER STRAIN (RAPID REDUCTION FROM HIGHER STRAIN TO LOWER STRAIN) | 0% OR VERY LOW | ATMOSPHERIC PRESSURE | BLOCKAGE IN PRIMARY LUMEN 470 AND/OR PRIMARY CONDUIT 1205 |
| 3 — LOWER STRAIN (RAPID REDUCTION FROM HIGHER STRAIN TO LOWER STRAIN) | HIGH OR 100% | ATMOSPHERIC PRESSURE | LEAK |

FIG. 20

| IF | | THEN |
|---|---|---|
| SENSOR 145 MEASUREMENT | PUMP DUTY | STATUS |
| 1 — LOWER STRAIN (RAPID REDUCTION FROM HIGHER STRAIN TO LOWER STRAIN) | 0% OR VERY LOW | BLOCKAGE IN PRIMARY LUMEN 475 AND\OR PRIMARY CONDUIT 1205 |
| 2 — LOWER STRAIN (RAPID REDUCTION FROM HIGHER STRAIN TO LOWER STRAIN) | HIGH OR 100% | LEAK |

FIG. 21

DRESSING WITH INTEGRATED SENSOR FOR NEGATIVE-PRESSURE THERAPY

RELATED APPLICATION

The present application claims priority to U.S. Provisional Patent Application No. 62/865,745, entitled "DRESSING WITH INTEGRATED SENSOR FOR NEGATIVE-PRESSURE THERAPY," filed Jun. 24, 2019, which is incorporated herein by reference for all purposes.

TECHNICAL FIELD

The invention set forth in the appended claims relates generally to tissue treatment systems and more particularly, but without limitation, to dressings for tissue treatment and methods of using the dressings for tissue treatment with negative pressure.

BACKGROUND

Clinical studies and practice have shown that reducing pressure in proximity to a tissue site can augment and accelerate growth of new tissue at the tissue site. The applications of this phenomenon are numerous, but it has proven particularly advantageous for treating wounds. Regardless of the etiology of a wound, whether trauma, surgery, or another cause, proper care of the wound is important to the outcome. Treatment of wounds or other tissue with reduced pressure may be commonly referred to as "negative-pressure therapy," but is also known by other names, including "negative-pressure wound therapy," "reduced-pressure therapy," "vacuum therapy," "vacuum-assisted closure," and "topical negative-pressure," for example. Negative-pressure therapy may provide a number of benefits, including migration of epithelial and subcutaneous tissues, improved blood flow, and micro-deformation of tissue at a wound site. Together, these benefits can increase development of granulation tissue and reduce healing times.

While the clinical benefits of negative-pressure therapy are widely known, improvements to therapy systems, components, and processes may benefit healthcare providers and patients.

BRIEF SUMMARY

New and useful systems, apparatuses, and methods for treating tissue in a negative-pressure therapy environment are set forth in the appended claims. Illustrative embodiments are also provided to enable a person skilled in the art to make and use the claimed subject matter.

For example, in some embodiments, a sensor comprising a force or load measurement sensor may be integrated with a dressing, wherein the sensor may telemeter to a therapy system the deformation of the dressing as the dressing is pushed into a tissue site during the application of negative pressure to the tissue site. The sensor may measure the closure force that is applied to the dressing. Measurements of the closure force applied to the dressing may be taken using the sensor on a periodic basis during negative-pressure therapy to enable monitoring of the fill level of the tissue site as granulation tissue fills the tissue site. Monitoring the closure force applied to the tissue site over the course of negative-pressure therapy may assist in making decisions on how to manage and treat the patient, as well as providing confirmatory data about the efficacy of the therapy.

For example, in some embodiments, a sensor comprising a force or load measurement sensor may be integrated with a dressing. The sensor may trigger a "pressure loss" or "blockage" alarm in the event that the dressing fails to deflate after the application of negative pressure or rapidly inflates that may result from a therapy system failure or a blockage in a fluid system of the therapy system.

In some embodiments, a sensor may be integrated with a dressing, wherein the sensor may be placed in direct contact with the tissue site. The sensor may measure the force applied to the dressing as an analogue for the applied negative pressure. In some embodiments, the sensor may measure gas pressure applied to the dressing. The therapy system may be able to use the measurements of the sensor to control the negative pressure applied to the dressing to overcome pressure drops in the fluid system of the therapy system. The measurements from the sensor may also aid in delivering the desired target negative pressure to the tissue site.

In some embodiments, the sensor may be an electroactive polymer (EAP) sensor configured to measure the strain in the dressing. In some embodiments, the sensor may be a strain gauge. In some embodiments, the sensor may be a gas pressure sensor.

More generally, a dressing for treating a tissue site with negative pressure may comprise a tissue interface, a cover coupled to the tissue interface, and a sensor configured to measure a strain in the dressing.

In some embodiments, a sensor module configured to be coupled to a dressing for treating a tissue site with negative pressure may comprise a controller and an electroactive polymer sensor coupled to the controller.

In some embodiments, a method of treating a tissue site with negative pressure, may comprise applying a dressing having a cover and a tissue interface to the tissue site, coupling a sensor to the dressing, fluidly coupling a dressing interface to the tissue site, fluidly coupling a fluid conductor to the dressing interface, fluidly coupling a negative-pressure source to the tissue interface via the fluid conductor, measuring a baseline strain in the dressing using the sensor in the absence of negative pressure applied to the tissue site, applying negative pressure to the tissue site using the negative-pressure source; and measuring a strain in the dressing using the sensor.

Objectives, advantages, and a preferred mode of making and using the claimed subject matter may be understood best by reference to the accompanying drawings in conjunction with the following detailed description of illustrative embodiments.

BRIEF DESCRIPTION OF THE DRAWINGS

FIG. 20 is a table that may be associated with an example method of detecting leaks and blockages in various components of the therapy system;

FIG. 21 is a table that may be associated with another example method of determining the presence of blockages or leaks in various components of the therapy system;

DESCRIPTION OF EXAMPLE EMBODIMENTS

The following description of example embodiments provides information that enables a person skilled in the art to make and use the subject matter set forth in the appended claims, but it may omit certain details already well-known in the art. The following detailed description is, therefore, to be taken as illustrative and not limiting.

The example embodiments may also be described herein with reference to spatial relationships between various elements or to the spatial orientation of various elements depicted in the attached drawings. In general, such relationships or orientation assume a frame of reference consistent with or relative to a patient in a position to receive treatment.

However, as should be recognized by those skilled in the art, this frame of reference is merely a descriptive expedient rather than a strict prescription.

Figure 1:
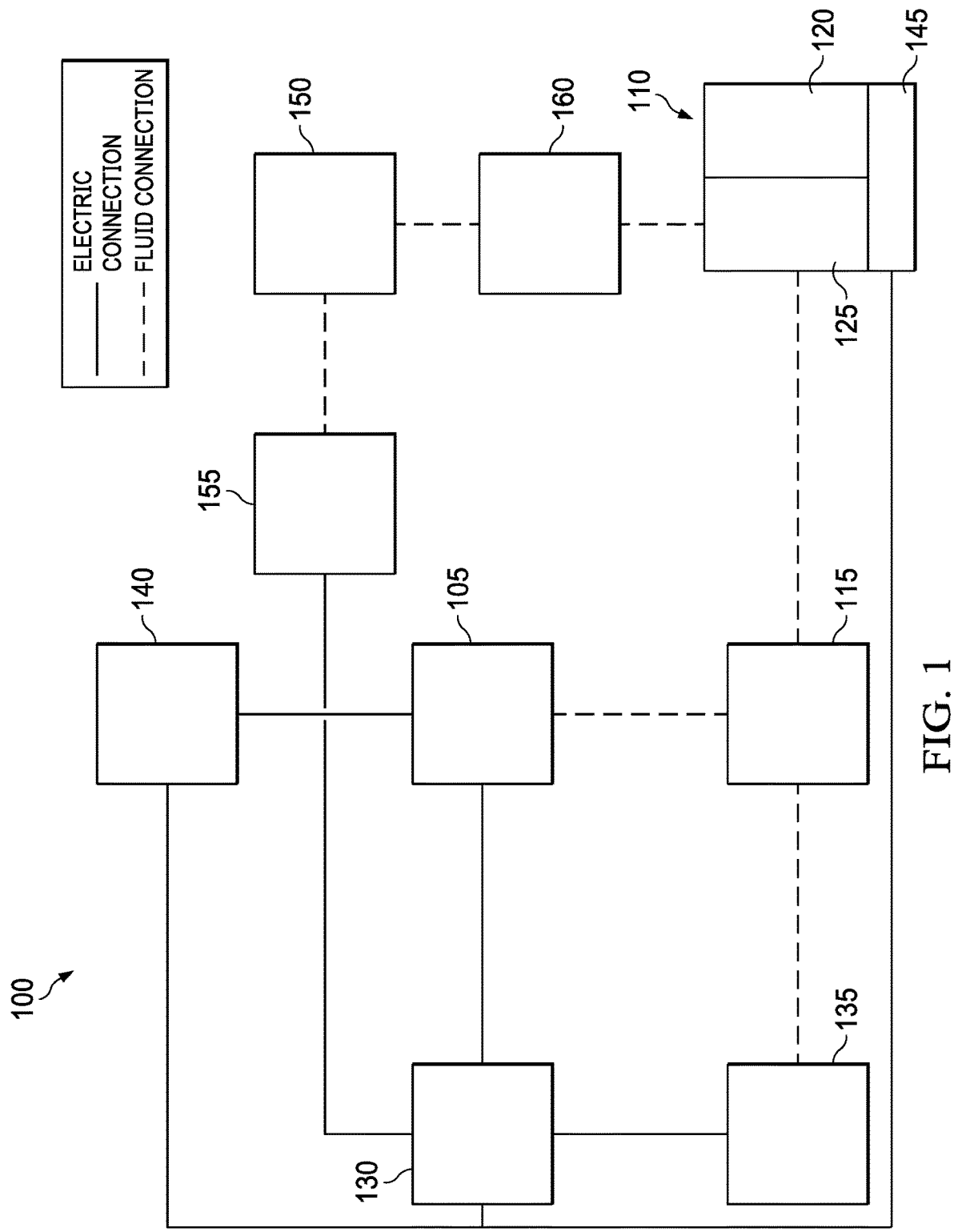
FIG. 1 is a functional block diagram of an example embodiment of a therapy system that can provide negative-pressure treatment and instillation treatment in accordance with this specification.

FIG. 1 is a simplified functional block diagram of an example embodiment of a therapy system 100 that can provide negative-pressure therapy to a tissue site in accordance with this specification.

The term "tissue site" in this context broadly refers to a wound, defect, or other treatment target located on or within tissue, including, but not limited to, bone tissue, adipose tissue, muscle tissue, neural tissue, dermal tissue, vascular tissue, connective tissue, cartilage, tendons, or ligaments. A wound may include chronic, acute, traumatic, subacute, and dehisced wounds, partial-thickness burns, ulcers (such as diabetic, pressure, or venous insufficiency ulcers), flaps, and grafts, for example. The term "tissue site" may also refer to areas of any tissue that are not necessarily wounded or defective, but are instead areas in which it may be desirable to add or promote the growth of additional tissue. For example, negative pressure may be applied to a tissue site to grow additional tissue that may be harvested and transplanted.

The therapy system 100 may include a source or supply of negative pressure, such as a negative-pressure source 105, and one or more distribution components. A distribution component is preferably detachable and may be disposable, reusable, or recyclable. A dressing, such as a dressing 110, and a fluid container, such as a container 115, are examples of distribution components that may be associated with some examples of the therapy system 100. As illustrated in the example of FIG. 1, the dressing 110 may comprise or consist essentially of a tissue interface 120, a cover 125, or both in some embodiments.

A fluid conductor is another illustrative example of a distribution component. A "fluid conductor," in this context, broadly includes a tube, pipe, hose, conduit, or other structure with one or more lumina or open pathways adapted to convey a fluid between two ends. Typically, a tube is an elongated, cylindrical structure with some flexibility, but the geometry and rigidity may vary. Moreover, some fluid conductors may be molded into or otherwise integrally combined with other components. Distribution components may also include or comprise interfaces or fluid ports to facilitate coupling and de-coupling other components. In some embodiments, for example, a dressing interface may facilitate coupling a fluid conductor to the dressing 110. For example, such a dressing interface may be a SENSAT.R.A.C.™ Pad available from Kinetic Concepts, Inc. of San Antonio, Texas.

The therapy system 100 may also include a regulator or controller, such as a controller 130. Additionally, the therapy system 100 may include sensors to measure operating parameters and provide feedback signals to the controller 130 indicative of the operating parameters. As illustrated in FIG. 1, for example, the therapy system 100 may include a sensor 135, a sensor 140, and one or more additional sensors 145 coupled to the controller 130.

The therapy system 100 may also include a source of instillation solution. For example, a solution source 150 may be fluidly coupled to the dressing 110, as illustrated in the example embodiment of FIG. 1. The solution source 150 may be fluidly coupled to a positive-pressure source such as a positive-pressure source 155, a negative-pressure source such as the negative-pressure source 105, or both in some embodiments. A regulator, such as an instillation regulator 160, may also be fluidly coupled to the solution source 150 and the dressing 110 to ensure proper dosage of instillation solution (e.g. saline) to a tissue site. For example, the instillation regulator 160 may comprise a piston that can be pneumatically actuated by the negative-pressure source 105 to draw instillation solution from the solution source during a negative-pressure interval and to instill the solution to a dressing during a venting interval. Additionally or alternatively, the controller 130 may be coupled to the negative-pressure source 105, the positive-pressure source 155, or both, to control dosage of instillation solution to a tissue site. In some embodiments, the instillation regulator 160 may also be fluidly coupled to the negative-pressure source 105 through the dressing 110, as illustrated in the example of FIG. 1.

Some components of the therapy system 100 may be housed within or used in conjunction with other components, such as sensors, processing units, alarm indicators, memory, databases, software, display devices, or user interfaces that further facilitate therapy. For example, in some embodiments, the negative-pressure source 105 may be combined with the controller 130, the solution source 150, and other components into a therapy unit.

In general, components of the therapy system 100 may be coupled directly or indirectly. For example, the negative-pressure source 105 may be directly coupled to the container 115 and may be indirectly coupled to the dressing 110 through the container 115. Coupling may include fluid, mechanical, thermal, electrical, or chemical coupling (such as a chemical bond), or some combination of coupling in some contexts. For example, the negative-pressure source 105 may be electrically coupled to the controller 130 and may be fluidly coupled to one or more distribution components to provide a fluid path to a tissue site. In some embodiments, components may also be coupled by virtue of physical proximity, being integral to a single structure, or being formed from the same piece of material.

A negative-pressure supply, such as the negative-pressure source 105, may be a reservoir of air at a negative pressure or may be a manual or electrically-powered device, such as a vacuum pump, a suction pump, a wall suction port available at many healthcare facilities, or a micro-pump, for example. "Negative pressure" generally refers to a pressure less than a local ambient pressure, such as the ambient pressure in a local environment external to a sealed therapeutic environment. In many cases, the local ambient pressure may also be the atmospheric pressure at which a tissue site is located. Alternatively, the pressure may be less than a hydrostatic pressure associated with tissue at the tissue site. Unless otherwise indicated, values of pressure stated herein are gauge pressures. References to increases in negative pressure typically refer to a decrease in absolute pressure, while decreases in negative pressure typically refer to an increase in absolute pressure. While the amount and nature of negative pressure provided by the negative-pressure source 105 may vary according to therapeutic requirements, the pressure is generally a low vacuum, also commonly referred to as a rough vacuum, between −5 mm Hg (−667 Pa) and −500 mm Hg (−66.7 kPa). Common therapeutic ranges are between −50 mm Hg (−6.7 kPa) and −300 mm Hg (−39.9 kPa).

The container 115 is representative of a container, canister, pouch, or other storage component, which can be used to manage exudates and other fluids withdrawn from a tissue site. In many environments, a rigid container may be preferred or required for collecting, storing, and disposing of fluids. In other environments, fluids may be properly disposed of without rigid container storage, and a re-usable container could reduce waste and costs associated with negative-pressure therapy.

A controller, such as the controller 130, may be a microprocessor or computer programmed to operate one or more components of the therapy system 100, such as the negative-pressure source 105. In some embodiments, for example, the controller 130 may be a microcontroller, which generally comprises an integrated circuit containing a processor core and a memory programmed to directly or indirectly control one or more operating parameters of the therapy system 100. Operating parameters may include the power applied to the negative-pressure source 105, the pressure generated by the negative-pressure source 105, or the pressure distributed to the tissue interface 120, for example. The controller 130 is also preferably configured to receive one or more input signals, such as a feedback signal, and programmed to modify one or more operating parameters based on the input signals.

Sensors, such as the sensor 135, the sensor 140, and the sensor 145 are generally known in the art as any apparatus operable to detect or measure a physical phenomenon or property, and generally provide a signal indicative of the phenomenon or property that is detected or measured. For example, the sensor 135, the sensor 140, and the sensor 145 may be configured to measure one or more operating parameters of the therapy system 100. In some embodiments, the sensor 135 may be a transducer configured to measure pressure in a pneumatic pathway and convert the measurement to a signal indicative of the pressure measured. In some embodiments, for example, the sensor 135 may be a piezoresistive strain gauge. The sensor 140 may optionally measure operating parameters of the negative-pressure source 105, such as a voltage or current, in some embodiments. In some embodiments, the sensor 145 may be coupled to the dressing 110. In some embodiments, the sensor 145 may be configured to measure a strain in the dressing 110. In some embodiments, for example, the sensor 145 may be an electroactive polymer (EAP) sensor. In some embodiments, for example, the sensor 145 may be a strain gauge. In some embodiments, the sensor 145 may be configured to measure a gas pressure delivered to a tissue site. In some embodiments, for example, the sensor 145 may be a gas pressure sensor. In some embodiments, the sensor 145 may be configured to measure the temperature of the dressing 110. In some embodiments, the sensor 145 may be configured to measure the humidity of the dressing 110. In some embodiments, the sensor 145 may be configured to measure the moisture of the dressing 110. The dressing 110 may include any number or combination of types of sensors 145. Preferably, the signals from the sensor 135, the sensor 140, and the one or more sensors 145 are suitable as an input signal to the controller 130, but some signal conditioning may be appropriate in some embodiments. For example, the signal may need to be filtered or amplified before it can be processed by the controller 130. Typically, the signal is an electrical signal, but may be represented in other forms, such as an optical signal.

The tissue interface 120 can be generally adapted to partially or fully contact a tissue site. The tissue interface 120 may take many forms, and may have many sizes, shapes, or thicknesses, depending on a variety of factors, such as the type of treatment being implemented or the nature and size of a tissue site. For example, the size and shape of the tissue interface 120 may be adapted to the contours of deep and irregular shaped tissue sites. Any or all of the surfaces of the tissue interface 120 may have an uneven, coarse, or jagged profile.

In some embodiments, the tissue interface 120 may comprise or consist essentially of a manifold. A manifold in this context may comprise or consist essentially of a means for collecting or distributing fluid across the tissue interface 120 under pressure. For example, a manifold may be adapted to receive negative pressure from a source and distribute negative pressure through multiple apertures across the tissue interface 120, which may have the effect of collecting fluid from across a tissue site and drawing the fluid toward the source. In some embodiments, the fluid path may be reversed or a secondary fluid path may be provided to facilitate delivering fluid, such as fluid from a source of instillation solution, across a tissue site.

In some embodiments, the cover 125 may provide a bacterial barrier and protection from physical trauma. The cover 125 may also be constructed from a material that can reduce evaporative losses and provide a fluid seal between two components or two environments, such as between a therapeutic environment and a local external environment. The cover 125 may comprise or consist of, for example, an elastomeric film or membrane that can provide a seal adequate to maintain a negative pressure at a tissue site for a given negative-pressure source. The cover 125 may have a high moisture-vapor transmission rate (MVTR) in some applications. For example, the MVTR may be at least 250 grams per square meter per twenty-four hours ($g/m^2/24$ hours) in some embodiments, measured using an upright cup technique according to ASTM E96/E96M Upright Cup Method at 38° C. and 10% relative humidity (RH). In some embodiments, an MVTR up to 5,000 $g/m^2/24$ hours may provide effective breathability and mechanical properties.

In some example embodiments, the cover 125 may be a polymer drape, such as a polyurethane film, that is permeable to water vapor but impermeable to liquid. Such drapes typically have a thickness in the range of 25-50 microns. For permeable materials, the permeability generally should be low enough that a desired negative pressure may be maintained. The cover 125 may comprise, for example, one or more of the following materials: polyurethane (PU), such as hydrophilic polyurethane; cellulosics; hydrophilic polyamides; polyvinyl alcohol; polyvinyl pyrrolidone; hydrophilic acrylics; silicones, such as hydrophilic silicone elastomers; natural rubbers; polyisoprene; styrene butadiene rubber; chloroprene rubber; polybutadiene; nitrile rubber; butyl rubber; ethylene propylene rubber; ethylene propylene diene monomer; chlorosulfonated polyethylene; polysulfide rubber; ethylene vinyl acetate (EVA); co-polyester; and polyether block polymide copolymers. Such materials are commercially available as, for example, Tegaderm® drape, commercially available from 3M Company, Minneapolis, Minnesota; polyurethane (PU) drape, commercially available from Avery Dennison Corporation, Pasadena, California; polyether block polyamide copolymer (PEBAX), for example, from Arkema S.A., Colombes, France; and Inspire 2301 and Inpsire 2327 polyurethane films, commercially available from Expopack Advanced Coatings, Wrexham, United Kingdom. In some embodiments, the cover 125 may comprise INSPIRE 2301 having an MVTR (upright cup technique) of 2600 $g/m^2/24$ hours and a thickness of about 30 microns.

An attachment device may be used to attach the cover 125 to an attachment surface, such as undamaged epidermis, a gasket, or another cover. The attachment device may take many forms. For example, an attachment device may be a medically-acceptable, pressure-sensitive adhesive configured to bond the cover 125 to epidermis around a tissue site. In some embodiments, for example, some or all of the cover 125 may be coated with an adhesive, such as an acrylic adhesive, which may have a coating weight of about 25-65 grams per square meter (g.s.m.). Thicker adhesives, or combinations of adhesives, may be applied in some embodiments to improve the seal and reduce leaks. Other example embodiments of an attachment device may include a double-sided tape, paste, hydrocolloid, hydrogel, silicone gel, or organogel.

The solution source 150 may also be representative of a container, canister, pouch, bag, or other storage component, which can provide a solution for instillation therapy. Compositions of solutions may vary according to a prescribed therapy, but examples of solutions that may be suitable for some prescriptions include hypochlorite-based solutions, silver nitrate (0.5%), sulfur-based solutions, biguanides, cationic solutions, and isotonic solutions.

In operation, the tissue interface 120 may be placed within, over, on, or otherwise proximate to a tissue site. If the tissue site is a wound, for example, the tissue interface 120 may partially or completely fill the wound, or it may be placed over the wound. The cover 125 may be placed over the tissue interface 120 and sealed to an attachment surface near a tissue site. For example, the cover 125 may be sealed to undamaged epidermis peripheral to a tissue site. Thus, the dressing 110 can provide a sealed therapeutic environment proximate to a tissue site, substantially isolated from the external environment, and the negative-pressure source 105 can reduce pressure in the sealed therapeutic environment.

The fluid mechanics of using a negative-pressure source to reduce pressure in another component or location, such as within a sealed therapeutic environment, can be mathematically complex. However, the basic principles of fluid mechanics applicable to negative-pressure therapy and instillation are generally well-known to those skilled in the art, and the process of reducing pressure may be described illustratively herein as "delivering," "distributing," or "generating" negative pressure, for example.

In general, exudate and other fluid flow toward lower pressure along a fluid path. Thus, the term "downstream" typically implies something in a fluid path relatively closer to a source of negative pressure or further away from a source of positive pressure. Conversely, the term "upstream" implies something relatively further away from a source of negative pressure or closer to a source of positive pressure. Similarly, it may be convenient to describe certain features in terms of fluid "inlet" or "outlet" in such a frame of reference. This orientation is generally presumed for purposes of describing various features and components herein. However, the fluid path may also be reversed in some applications, such as by substituting a positive-pressure source for a negative-pressure source, and this descriptive convention should not be construed as a limiting convention.

Negative pressure applied across the tissue site through the tissue interface 120 in the sealed therapeutic environment can induce macro-strain and micro-strain in the tissue site. Negative pressure can also remove exudate and other fluid from a tissue site, which can be collected in container 115.

In some embodiments, the controller 130 may receive and process data from one or more sensors, such as the sensor 135, the sensor 140, and the sensor 145. The controller 130 may also control the operation of one or more components of the therapy system 100 to manage the pressure delivered to the tissue interface 120. In some embodiments, controller 130 may include an input for receiving a desired target pressure and may be programmed for processing data relating to the setting and inputting of the target pressure to be applied to the tissue interface 120. In some example embodiments, the target pressure may be a fixed pressure value set by an operator as the target negative pressure desired for therapy at a tissue site and then provided as input to the controller 130. The target pressure may vary from tissue site to tissue site based on the type of tissue forming a tissue site, the type of injury or wound (if any), the medical condition of the patient, and the preference of the attending physician. After selecting a desired target pressure, the controller 130 can operate the negative-pressure source 105 in one or more control modes based on the target pressure and may receive feedback from one or more sensors to maintain the target pressure at the tissue interface 120.

Figure 2:
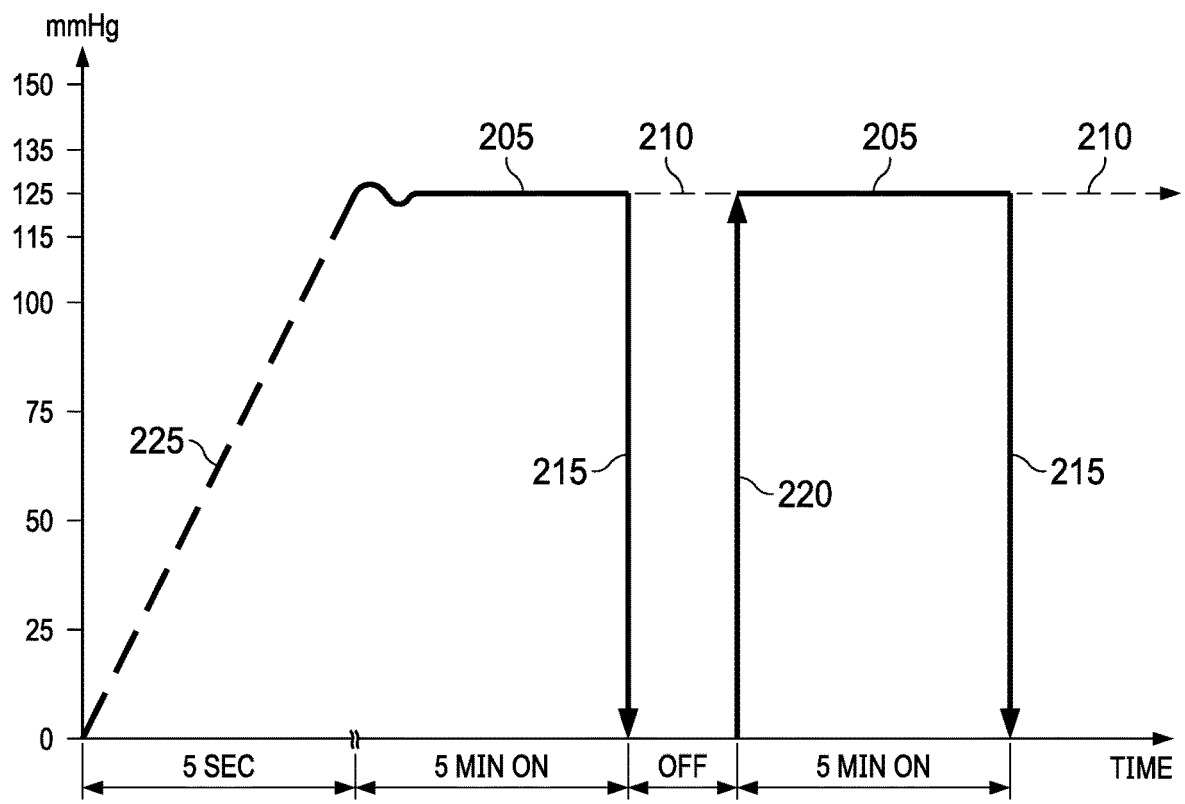
FIG. 2 is a graph illustrating additional details of example pressure control modes that may be associated with some embodiments of the therapy system of FIG. 1.

FIG. 2 is a graph illustrating additional details of an example control mode that may be associated with some embodiments of the controller 130. In some embodiments, the controller 130 may have a continuous pressure mode, in which the negative-pressure source 105 is operated to provide a constant target negative pressure, as indicated by line 205 and line 210, for the duration of treatment or until manually deactivated. Additionally or alternatively, the controller may have an intermittent pressure mode, as illustrated in the example of FIG. 2. In FIG. 2, the x-axis represents time and the y-axis represents negative pressure generated by the negative-pressure source 105 over time. In the example of FIG. 2, the controller 130 can operate the negative-pressure source 105 to cycle between a target pressure and atmospheric pressure. For example, the target pressure may be set at a negative-pressure value of 125 mmHg, as indicated by line 205, for a specified period of time (e.g., 5 min), followed by a specified period of time (e.g., 2 min) of deactivation, as indicated by the gap between the solid lines 215 and 220. The cycle can be repeated by activating the negative-pressure source 105, as indicated by line 220, which can form a square wave pattern between the target pressure and atmospheric pressure. In some embodiments, the ratio of the "on-time" to the "off-time" or the total "cycle time" may be referred to as a pump duty cycle (PD).

In some example embodiments, the increase in negative-pressure from ambient pressure to the target pressure may not be instantaneous. For example, the negative-pressure source 105 and the dressing 110 may have an initial rise time, as indicated by the dashed line 225. The initial rise time may vary depending on the type of dressing and therapy equipment being used. For example, the initial rise time for one therapy system may be in a range of about 20-30 mmHg/second and in a range of about 5-10 mmHg/second for another therapy system. If the therapy system 100 is operating in an intermittent mode, the repeating rise time, as indicated by the solid line 220, may be a value substantially equal to the initial rise time as indicated by the dashed line 225.

Figure 3:
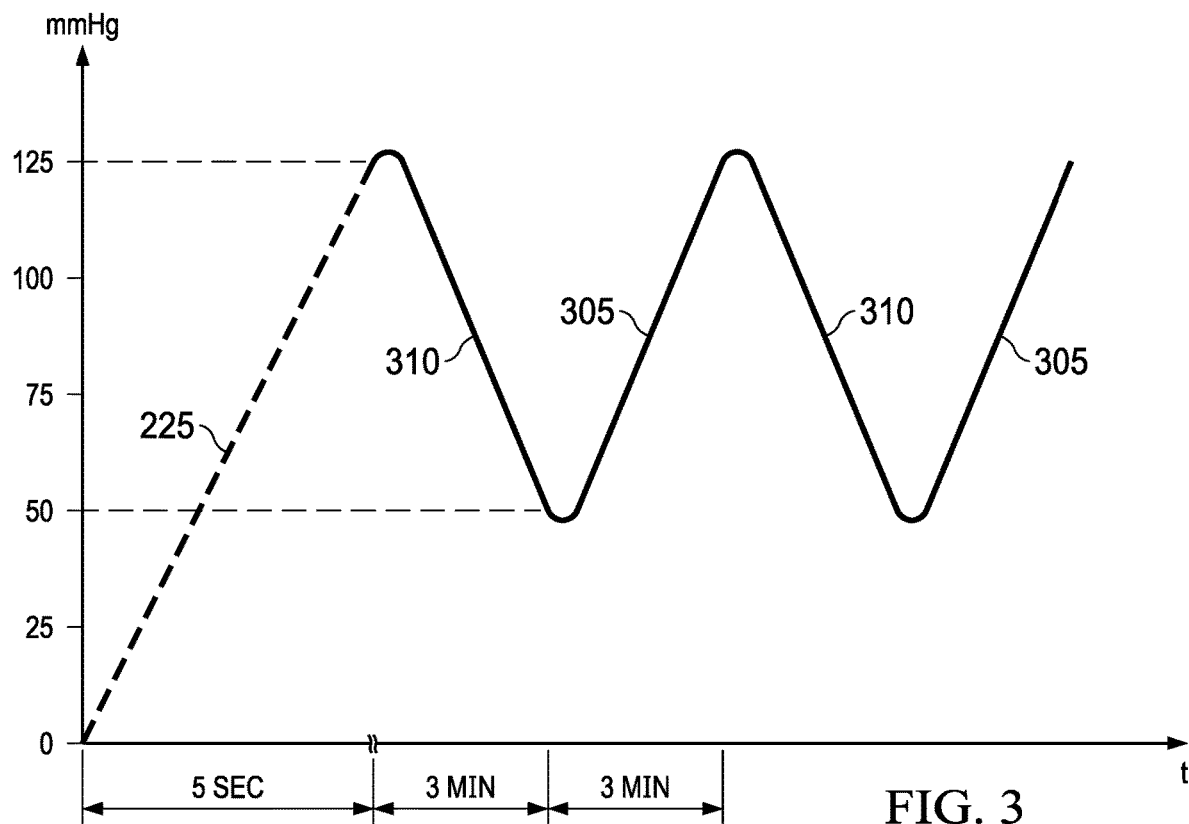
FIG. 3 is a graph illustrating additional details that may be associated with another example pressure control mode in some embodiments of the therapy system of FIG. 1.

FIG. 3 is a graph illustrating additional details that may be associated with another example pressure control mode in some embodiments of the therapy system 100. In FIG. 3, the x-axis represents time and the y-axis represents negative pressure generated by the negative-pressure source 105. The target pressure in the example of FIG. 3 can vary with time in a dynamic pressure mode. For example, the target pressure may vary in the form of a triangular waveform, varying between a negative pressure of 50 and 125 mmHg with a rise time 305 set at a rate of +25 mmHg/min. and a descent time 310 set at −25 mmHg/min. In other embodiments of the therapy system 100, the triangular waveform may vary between negative pressure of 25 and 125 mmHg with a rise time 305 set at a rate of +30 mmHg/min and a descent time 310 set at −30 mmHg/min.

In some embodiments, the controller 130 may control or determine a variable target pressure in a dynamic pressure mode, and the variable target pressure may vary between a maximum and minimum pressure value that may be set as an input prescribed by an operator as the range of desired negative pressure. The variable target pressure may also be processed and controlled by the controller 130, which can vary the target pressure according to a predetermined waveform, such as a triangular waveform, a sine waveform, or a saw-tooth waveform. In some embodiments, the waveform may be set by an operator as the predetermined or time-varying negative pressure desired for therapy.

In some embodiments, the controller 130 may receive and process data, such as data related to instillation solution provided to the tissue interface 120. Such data may include the type of instillation solution prescribed by a clinician, the volume of fluid or solution to be instilled to a tissue site ("fill volume"), and the amount of time prescribed for leaving solution at a tissue site ("dwell time") before applying a negative pressure to the tissue site. The fill volume may be, for example, between 10 and 500 mL, and the dwell time may be between one second to 30 minutes. The controller 130 may also control the operation of one or more components of the therapy system 100 to instill solution. For example, the controller 130 may manage fluid distributed from the solution source 150 to the tissue interface 120. In some embodiments, fluid may be instilled to a tissue site by applying a negative pressure from the negative-pressure source 105 to reduce the pressure at the tissue site, drawing solution into the tissue interface 120. In some embodiments, solution may be instilled to a tissue site by applying a positive pressure from the positive-pressure source 155 to move solution from the solution source 150 to the tissue interface 120. Additionally or alternatively, the solution source 150 may be elevated to a height sufficient to allow gravity to move solution into the tissue interface 120.

The controller 130 may also control the fluid dynamics of instillation by providing a continuous flow of solution or an intermittent flow of solution. Negative pressure may be applied to provide either continuous flow or intermittent flow of solution. The application of negative pressure may be implemented to provide a continuous pressure mode of operation to achieve a continuous flow rate of instillation solution through the tissue interface 120, or it may be implemented to provide a dynamic pressure mode of operation to vary the flow rate of instillation solution through the tissue interface 120. Alternatively, the application of negative pressure may be implemented to provide an intermittent mode of operation to allow instillation solution to dwell at the tissue interface 120. In an intermittent mode, a specific fill volume and dwell time may be provided depending, for example, on the type of tissue site being treated and the type of dressing being utilized. After or during instillation of solution, negative-pressure treatment may be applied. The controller 130 may be utilized to select a mode of operation and the duration of the negative pressure treatment before commencing another instillation cycle by instilling more solution.

Figure 4:
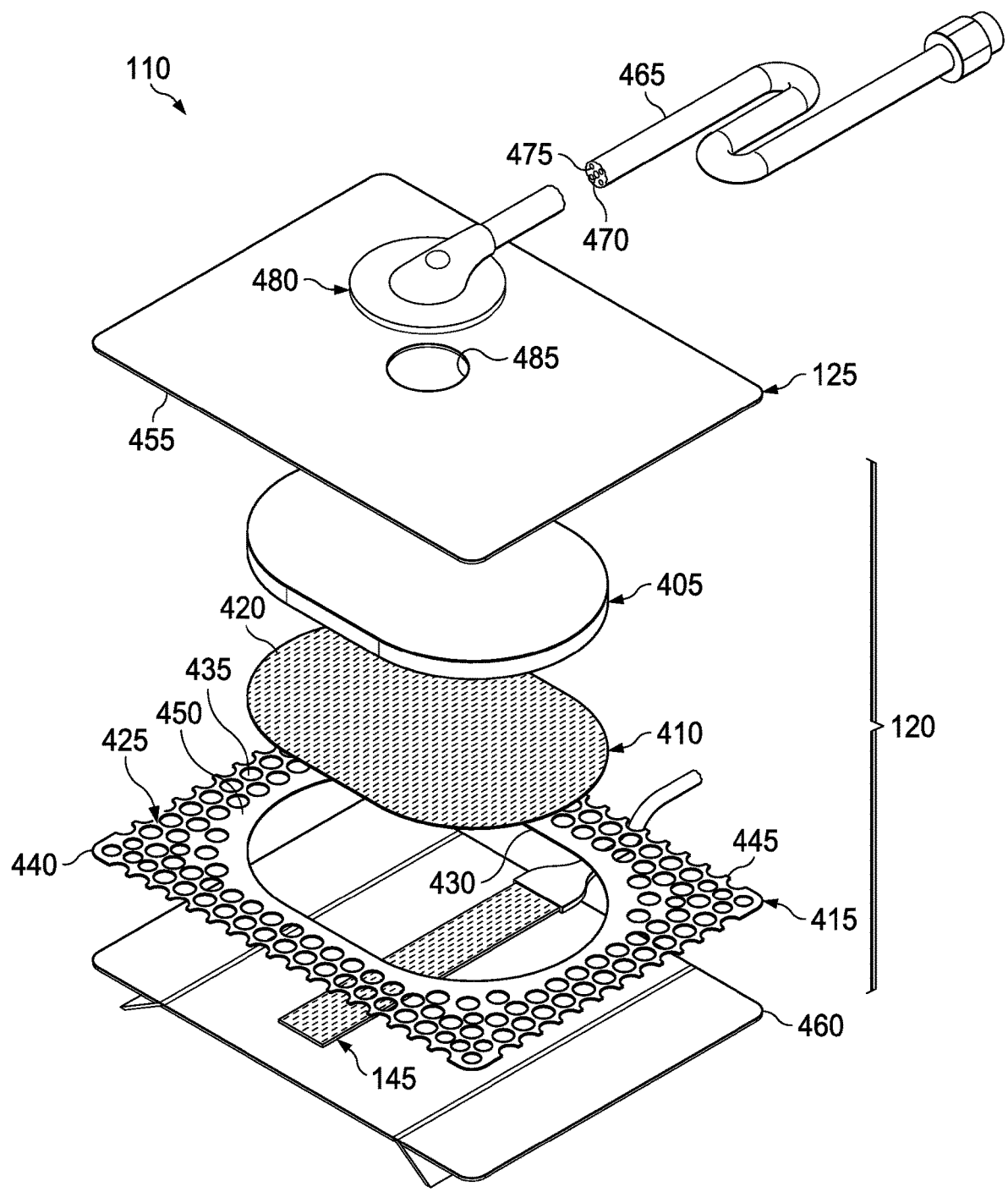
FIG. 4 is an assembly view of an example of a dressing including a sensor, illustrating additional details that may be associated with some example embodiments of the therapy system of FIG. 1.

FIG. 4 is an assembly view of an example of the dressing 110 of FIG. 1, illustrating additional details that may be associated with some embodiments. In the example of FIG. 4, the tissue interface 120 comprises a first layer 405, a second layer 410, and a third layer 415. In some embodiments, the first layer 405 may be disposed adjacent to the second layer 410, and the third layer 415 may also be disposed adjacent to the second layer 410 opposite the first layer 405. For example, the first layer 405 and the second layer 410 may be stacked so that the first layer 405 is in contact with the second layer 410. The first layer 405 may also be bonded to the second layer 410 in some embodiments. In some embodiments, the second layer 410 may be coextensive with a face of the first layer 405. In some embodiments, at least some portion of the third layer 415 may be bonded to the second layer 410.

The first layer 405 generally comprises or consists essentially of a manifold or a manifold layer, which provides a means for collecting or distributing fluid across the tissue interface 120 under pressure. For example, the first layer 405 may be adapted to receive negative pressure from a source and distribute negative pressure through multiple apertures across the tissue interface 120, which may have the effect of collecting fluid from across a tissue site and drawing the fluid toward the source. In some embodiments, the fluid path may be reversed or a secondary fluid path may be provided to facilitate delivering fluid, such as from a source of instillation solution, across the tissue interface 120.

In some illustrative embodiments, the pathways of the first layer 405 may be interconnected to improve distribution or collection of fluids. In some illustrative embodiments, the first layer 405 may comprise or consist essentially of a porous material having interconnected fluid pathways. Examples of suitable porous material that comprise or can be adapted to form interconnected fluid pathways (e.g., channels) may include cellular foam, including open-cell foam such as reticulated foam; porous tissue collections; and other porous material such as gauze or felted mat that generally include pores, edges, and/or walls. Liquids, gels, and other foams may also include or be cured to include apertures and fluid pathways. In some embodiments, the first layer 405 may additionally or alternatively comprise projections that form interconnected fluid pathways. For example, the first layer 405 may be molded to provide surface projections that define interconnected fluid pathways.

In some embodiments, the first layer 405 may comprise or consist essentially of a reticulated foam having pore sizes and free volume that may vary according to needs of a prescribed therapy. For example, a reticulated foam having a free volume of at least 90% may be suitable for many therapy applications, and a foam having an average pore size in a range of 400-600 microns may be particularly suitable for some types of therapy. The tensile strength of the first layer 405 may also vary according to needs of a prescribed therapy. For example, the tensile strength of a foam may be increased for instillation of topical treatment solutions. The 25% compression load deflection of the first layer 405 may be at least 0.35 pounds per square inch, and the 65% compression load deflection may be at least 0.43 pounds per square inch. In some embodiments, the tensile strength of the first layer 405 may be at least 10 pounds per square inch. The first layer 405 may have a tear strength of at least 2.5 pounds per inch. In some embodiments, the first layer 405 may be a foam comprised of polyols such as polyester or polyether, isocyanate such as toluene diisocyanate, and polymerization modifiers such as amines and tin compounds. In some examples, the first layer 405 may be a reticulated polyurethane foam such as used in GRANUFOAM™ dressing or V.A.C. VERAFLO™ dressing, both available from KCI of San Antonio, Texas.

Other suitable materials for the first layer 405 may include non-woven fabrics (Libeltex, Freudenberg), three-dimensional (3D) polymeric structures (molded polymers, embossed and formed films, and fusion bonded films [Supracore]), and mesh, for example.

In some examples, the first layer 405 may include a 3D textile, such as various textiles commercially available from Baltex, Muller, and Heathcoates. A 3D textile of polyester fibers may be particularly advantageous for some embodiments. For example, the first layer 405 may comprise or consist essentially of a three-dimensional weave of polyester fibers. In some embodiments, the fibers may be elastic in at least two dimensions. A puncture-resistant fabric of polyester and cotton fibers having a weight of about 650 grams per square meter and a thickness of about 1-2 millimeters may be particularly advantageous for some embodiments. Such a puncture-resistant fabric may have a warp tensile strength of about 330-340 kilograms and a weft tensile strength of about 480-280 kilograms in some embodiments. Another particularly suitable material may be a polyester spacer fabric having a weight of about 470 grams per square meter, which may have a thickness of about 4-5 millimeters in some embodiments. Such a spacer fabric may have a compression strength of about 20-25 kilopascals (at 40% compression). Additionally or alternatively, the first layer 405 may comprise or consist of a material having substantial linear stretch properties, such as a polyester spacer fabric having 2-way stretch and a weight of about 380 grams per square meter. A suitable spacer fabric may have a thickness of about 3-4 millimeters, and may have a warp and weft tensile strength of about 30-40 kilograms in some embodiments. The fabric may have a close-woven layer of polyester on one or more opposing faces in some examples. In some embodiments, a woven layer may be advantageously disposed on a first layer 405 to face a tissue site.

The first layer 405 generally has a first planar surface and a second planar surface opposite the first planar surface. The thickness of the first layer 405 between the first planar surface and the second planar surface may also vary according to needs of a prescribed therapy. For example, the thickness of the first layer 405 may be decreased to relieve stress on other layers and to reduce tension on peripheral tissue. The thickness of the first layer 405 can also affect the conformability of the first layer 405. In some embodiments, a suitable foam may have a thickness in a range of about 5 millimeters to 10 millimeters. Fabrics, including suitable 3D textiles and spacer fabrics, may have a thickness in a range of about 2 millimeters to about 8 millimeters.

The second layer 410 may comprise or consist essentially of a means for controlling or managing fluid flow. In some embodiments, the second layer 410 may be a fluid control layer comprising or consisting essentially of a liquid-impermeable, elastomeric material. For example, the second layer 410 may comprise or consist essentially of a polymer film, such as a polyurethane film. In some embodiments, the second layer 410 may comprise or consist essentially of the same material as the cover 125. The second layer 410 may also have a smooth or matte surface texture in some embodiments. A glossy or shiny finish better or equal to a grade B3 according to the SPI (Society of the Plastics Industry) standards may be particularly advantageous for some applications. In some embodiments, variations in surface height may be limited to acceptable tolerances. For example, the surface of the second layer 410 may have a substantially flat surface, with height variations limited to 0.2 millimeters over a centimeter.

In some embodiments, the second layer 410 may be hydrophobic. The hydrophobicity of the second layer 410 may vary, but may have a contact angle with water of at least ninety degrees in some embodiments. In some embodiments the second layer 410 may have a contact angle with water of no more than 150 degrees. For example, in some embodiments, the contact angle of the second layer 410 may be in a range of at least 90 degrees to about 120 degrees, or in a range of at least 120 degrees to 150 degrees. Water contact angles can be measured using any standard apparatus. Although manual goniometers can be used to visually approximate contact angles, contact angle measuring instruments can often include an integrated system involving a level stage, liquid dropper such as a syringe, camera, and software designed to calculate contact angles more accurately and precisely, among other things. Non-limiting examples of such integrated systems may include the FTA125, FTA200, FTA2000, and FTA4000 systems, all commercially available from First Ten Angstroms, Inc., of Portsmouth, VA, and the DTA25, DTA30, and DTA100 systems, all commercially available from Kruss GmbH of Hamburg, Germany. Unless otherwise specified, water contact angles herein are measured using deionized and distilled water on a level sample surface for a sessile drop added from a height of no more than 5 cm in air at 20-25° C. and 20-50% relative humidity. Contact angles herein represent averages of 5-9 measured values, discarding both the highest and lowest measured values. The hydrophobicity of the second layer 410 may be further enhanced with a hydrophobic coating of other materials, such as silicones and fluorocarbons, either as coated from a liquid, or plasma coated.

The second layer 410 may also be suitable for welding to other layers, including the first layer 405. For example, the second layer 410 may be adapted for welding to polyurethane foams using heat, radio frequency (RF) welding, or other methods to generate heat such as ultrasonic welding. RF welding may be particularly suitable for more polar materials, such as polyurethane, polyamides, polyesters and acrylates. Sacrificial polar interfaces may be used to facilitate RF welding of less polar film materials, such as polyethylene.

The area density of the second layer 410 may vary according to a prescribed therapy or application. In some embodiments, an area density of less than 40 grams per square meter may be suitable, and an area density of about 20-30 grams per square meter may be particularly advantageous for some applications.

In some embodiments, for example, the second layer 410 may comprise or consist essentially of a hydrophobic polymer, such as a polyethylene film. The simple and inert structure of polyethylene can provide a surface that interacts little, if any, with biological tissues and fluids, providing a surface that may encourage the free flow of liquids and low adherence, which can be particularly advantageous for many applications. Other suitable polymeric films include polyurethanes, acrylics, polyolefin (such as cyclic olefin copolymers), polyacetates, polyamides, polyesters, copolyesters, PEBAX block copolymers, thermoplastic elastomers, thermoplastic vulcanizates, polyethers, polyvinyl alcohols, polypropylene, polymethylpentene, polycarbonate, styrenics, silicones, fluoropolymers, and acetates. A thickness between 20 microns and 100 microns may be suitable for many applications. Films may be clear, colored, or printed. More polar films suitable for laminating to a polyethylene film include polyamide, co-polyesters, ionomers, and acrylics. To aid in the bond between a polyethylene and polar film, tie layers may be used, such as ethylene vinyl acetate, or modified polyurethanes. An ethyl methyl acrylate (EMA) film may also have suitable hydrophobic and welding properties for some configurations.

As illustrated in the example of FIG. 4, the second layer 410 may have one or more fluid restrictions 420, which can be distributed uniformly or randomly across the second layer 410. The fluid restrictions 420 may be bi-directional and pressure-responsive. For example, each of the fluid restrictions 420 generally may comprise or consist essentially of an elastic passage that is normally unstrained to substantially reduce liquid flow, and can expand or open in response to a pressure gradient. In some embodiments, the fluid restrictions 420 may comprise or consist essentially of perforations in the second layer 410. Perforations may be formed by removing material from the second layer 410. For example, perforations may be formed by cutting through the second layer 410, which may also deform the edges of the perforations in some embodiments. In the absence of a pressure gradient across the perforations, the passages may be sufficiently small to form a seal or fluid restriction, which can substantially reduce or prevent liquid flow. Additionally or alternatively, one or more of the fluid restrictions 420 may be an elastomeric valve that is normally closed when unstrained to substantially prevent liquid flow, and can open in response to a pressure gradient. A fenestration in the second layer 410 may be a suitable valve for some applications. Fenestrations may also be formed by removing material from the second layer 410, but the amount of material removed and the resulting dimensions of the fenestrations may be up to an order of magnitude less than perforations, and may not deform the edges.

For example, some embodiments of the fluid restrictions 420 may comprise or consist essentially of one or more slits, slots or combinations of slits and slots in the second layer 410. In some examples, the fluid restrictions 420 may comprise or consist of linear slots having a length less than 4 millimeters and a width less than 1 millimeter. The length may be at least 2 millimeters, and the width may be at least 0.4 millimeters in some embodiments. A length of about 3 millimeters and a width of about 0.8 millimeters may be particularly suitable for many applications, and a tolerance of about 0.1 millimeter may also be acceptable. Such dimensions and tolerances may be achieved with a laser cutter, for example. Slots of such configurations may function as imperfect valves that substantially reduce liquid flow in a normally closed or resting state. For example, such slots may form a flow restriction without being completely closed or sealed. The slots can expand or open wider in response to a pressure gradient to allow increased liquid flow.

The third layer 415 may comprise or consist essentially of a sealing layer formed from a soft, pliable material suitable for providing a fluid seal with a tissue site, such as a suitable gel material, and may have a substantially flat surface. For example, the third layer 415 may comprise, without limitation, a silicone gel, a soft silicone, hydrocolloid, hydrogel, polyurethane gel, polyolefin gel, hydrogenated styrenic copolymer gel, a foamed gel, a soft closed cell foam such as polyurethanes and polyolefins coated with an adhesive, polyurethane, polyolefin, or hydrogenated styrenic copolymers. In some embodiments, the third layer 415 may have a thickness between about 200 microns (μm) and about 1000 microns (μm). In some embodiments, the third layer 415 may have a hardness between about 5 Shore 00 and about 80 Shore 00. Further, the third layer 415 may be comprised of hydrophobic or hydrophilic materials.

In some embodiments, the third layer 415 may be a hydrophobic-coated material. For example, the third layer 415 may be formed by coating a spaced material, such as, for example, woven, nonwoven, molded, or extruded mesh with a hydrophobic material. The hydrophobic material for the coating may be a soft silicone, for example.

The third layer 415 may have a periphery 425 surrounding or around a treatment aperture 430, and apertures 435 in the periphery 425 disposed around the treatment aperture 430. The treatment aperture 430 may be complementary or correspond to a surface area of the first layer 405 in some examples. For example, the treatment aperture 430 may form a frame, window, or other opening around a surface of the first layer 405. The third layer 415 may also have corners 440 and edges 445. The corners 440 and the edges 445 may be part of the periphery 425. The third layer 415 may have an interior border 450 around the treatment aperture 430, which may be substantially free of the apertures 435, as illustrated in the example of FIG. 4. In some examples, as illustrated in FIG. 4, the treatment aperture 430 may be symmetrical and centrally disposed in the third layer 415, forming an open central window.

The apertures 435 may be formed by cutting, perforating, or by application of local RF or ultrasonic energy, for example, or by other suitable techniques for forming an opening or perforation in the third layer 415. The apertures 435 may have a uniform distribution pattern, or may be randomly distributed on the third layer 415. The apertures 435 in the third layer 415 may have many shapes, including circles, squares, stars, ovals, polygons, slits, complex curves, rectilinear shapes, triangles, for example, or may have some combination of such shapes.

Each of the apertures 435 may have uniform or similar geometric properties. For example, in some embodiments, each of the apertures 435 may be circular apertures, having substantially the same diameter. In some embodiments, each of the apertures 435 may have a diameter of about 1 millimeter to about 50 millimeters. In other embodiments, the diameter of each of the apertures 435 may be about 1 millimeter to about 20 millimeters.

In other embodiments, geometric properties of the apertures 435 may vary. For example, the diameter of the apertures 435 may vary depending on the position of the apertures 435 in the third layer 415. For example, in some embodiments, the apertures 435 disposed in the periphery 425 may have a diameter between about 5 millimeters and about 10 millimeters. A range of about 7 millimeters to about 9 millimeters may be suitable for some examples. In some embodiments, the apertures 435 disposed in the corners 440 may have a diameter between about 7 millimeters and about 8 millimeters.

At least one of the apertures 435 in the periphery 425 of the third layer 415 may be positioned at the edges 445 of the periphery 425, and may have an interior cut open or exposed at the edges 445 that is in fluid communication in a lateral direction with the edges 445. The lateral direction may refer to a direction toward the edges 445 and in the same plane as the third layer 415. As shown in the example of FIG. 4, the apertures 435 in the periphery 425 may be positioned proximate to or at the edges 445 and in fluid communication in a lateral direction with the edges 445. The apertures 435 positioned proximate to or at the edges 445 may be spaced substantially equidistant around the periphery 425 as shown in the example of FIG. 2. Alternatively, the spacing of the apertures 435 proximate to or at the edges 445 may be irregular.

In some embodiments, the sensor 145 may be coupled to the tissue interface 120. For example, as shown in FIG. 4, the sensor 145 may be configured to be coupled to the third layer 415 opposite the first layer 405. In some embodiments, the sensor 145 may be integrated with the third layer 415.

The sensor 145 may be configured to measure a physical phenomenon or property of the dressing 110. In some embodiments, for example, the sensor 145 may comprise an electroactive polymer (EAP) sensor configured to measure a strain in the dressing 110. The electrical characteristics of EAP sensors may change as they are stretched and deformed. For example, EAP sensors may act as displacement-to-capacitance transducers. EAP sensors may include a dielectric film that thins and expands in area as it is strained, increasing its capacitance. The capacitance change may be measured and can be converted to strain. In some embodiments, EAP sensors may be configured to measure compressive strain, bending strain, and torsional strain. In some embodiments, EAP sensors may be used to measure force or load. For example, the EAP sensor may be able to measure the closure force applied to a tissue site under the application of negative-pressure therapy. In some embodiments, the measurements from the EAP sensor may be correlated to a negative pressure applied to a tissue site. In some embodiments, the sensor 145 may be an EAP sensor commercially available under the model number 00947, AN-SS-05, or AN-SS-10 from Parker Hannifin Corporation of Minneapolis, MN.

As further illustrated in the example of FIG. 4, the dressing 110 may also include an attachment device, such as an adhesive 455. The adhesive 455 may be, for example, a medically-acceptable, pressure-sensitive adhesive that extends about a periphery, a portion, or an entire surface of the cover 125. In some embodiments, for example, the adhesive 455 may be an acrylic adhesive having a coating weight between 25-65 grams per square meter (g.s.m.). Thicker adhesives, or combinations of adhesives, may be applied in some embodiments to improve the seal and reduce leaks. In some embodiments, such a layer of the adhesive 455 may be continuous or discontinuous. Discontinuities in the adhesive 455 may be provided by apertures or holes (not shown) in the adhesive 455. The apertures or holes in the adhesive 455 may be formed after application of the adhesive 455 or by coating the adhesive 455 in patterns on a carrier layer, such as, for example, a side of the cover 125. Apertures or holes in the adhesive 455 may also be sized to enhance the MVTR of the dressing 110 in some example embodiments.

As illustrated in the example of FIG. 4, in some embodiments, the dressing 110 may include a release liner 460 to protect the adhesive 455 prior to use. The release liner 460 may also provide stiffness to assist with, for example, deployment of the dressing 110. The release liner 460 may be, for example, a casting paper, a film, or polyethylene. Further, in some embodiments, the release liner 460 may be a polyester material such as polyethylene terephthalate (PET), or similar polar semi-crystalline polymer. The use of a polar semi-crystalline polymer for the release liner 460 may substantially preclude wrinkling or other deformation of the dressing 110. For example, the polar semi-crystalline polymer may be highly orientated and resistant to softening, swelling, or other deformation that may occur when brought into contact with components of the dressing 110, or when subjected to temperature or environmental variations, or sterilization. Further, a release agent may be disposed on a side of the release liner 460 that is configured to contact the second layer 410. For example, the release agent may be a silicone coating and may have a release factor suitable to facilitate removal of the release liner 460 by hand and without damaging or deforming the dressing 110. In some embodiments, the release agent may be a fluorocarbon or a fluorosilicone, for example. In other embodiments, the release liner 460 may be uncoated or otherwise used without a release agent.

FIG. 4 also illustrates one example of a fluid conductor 465. As shown in the example of FIG. 2, the fluid conductor 465 may be a flexible tube, which can be fluidly coupled on one end to the dressing interface 480. In some embodiments, the fluid conductor 465 may be a multi-lumen tube having a primary lumen 470 and one or more ancillary lumens 475. The fluid conductor 465 may be fluidly coupled to a dressing interface 480. The primary lumen 470 may be configured to couple the dressing 110 to the negative-pressure source 105, and the one or more ancillary lumens 475 may be configured to couple the dressing 110 to a sensor, such as the sensor 135, and/or the solution source 150. The dressing interface 480 may be an elbow connector, as shown in the example of FIG. 4, which can be placed over an aperture 485 in the cover 125 to provide a fluid path between the fluid conductor 465 and the tissue interface 120.

One or more of the components of the dressing 110 may additionally be treated with an antimicrobial agent in some embodiments. For example, the first layer 405 may be a foam, mesh, or non-woven coated with an antimicrobial agent. In some embodiments, the first layer may comprise antimicrobial elements, such as fibers coated with an antimicrobial agent. Additionally or alternatively, some embodiments of the second layer 410 may be a polymer coated or mixed with an antimicrobial agent. In other examples, the fluid conductor 465 may additionally or alternatively be treated with one or more antimicrobial agents. Suitable antimicrobial agents may include, for example, metallic silver, PHMB, iodine or its complexes and mixes such as povidone iodine, copper metal compounds, chlorhexidine, or some combination of these materials.

Additionally or alternatively, one or more of the components may be coated with a mixture that may include citric acid and collagen, which can reduce bio-films and infections. For example, the first layer 405 may be a foam coated with such a mixture.

The cover 125, the first layer 405, the second layer 410, the third layer 415, and the sensor 145 or various combinations may be assembled before application or in situ. For example, the second layer 410 may be laminated to the first layer 405 in some embodiments. The cover 125 may be disposed over the first layer 405 and coupled to the third layer 415 around the first layer 405 in some embodiments. In some embodiments, one or more layers of the tissue interface 120 may be coextensive. For example, the second layer 410 may be cut flush with the edge of the first layer 405. In some embodiments, the dressing 110 may be provided as a single, composite dressing. For example, the third layer 415 may be coupled to the cover 125 to enclose the first layer 405 and the second layer 410, wherein the third layer 415 may be configured to face a tissue site.

Figure 5:
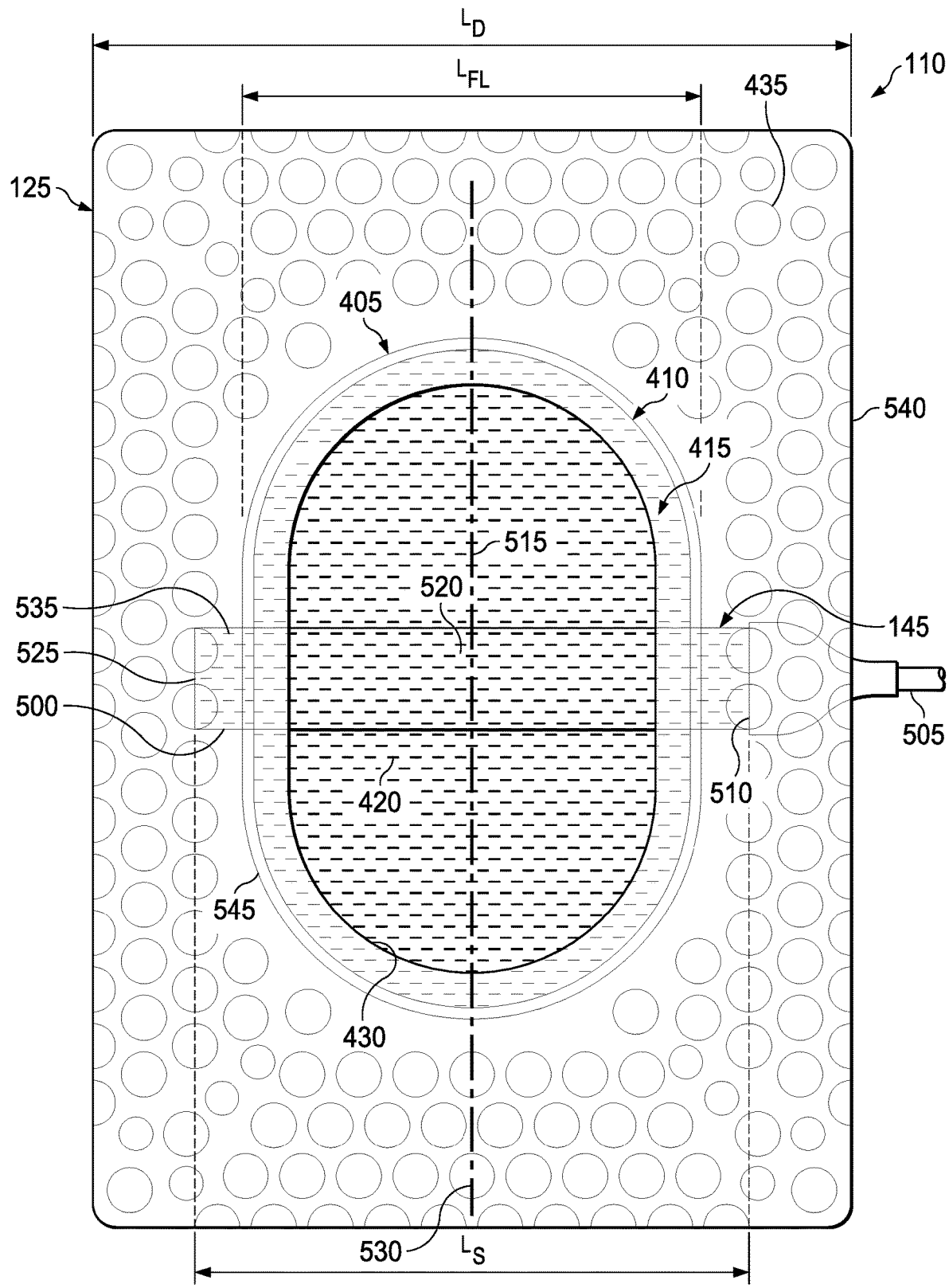
FIG. 5 is a bottom view of the example dressing of FIG. 4.

FIG. 5 is a bottom view of the dressing 110 in the example of FIG. 4, as assembled, illustrating additional details that may be associated with some embodiments. As shown in FIG. 5, the cover 125 and the third layer 415 may have substantially the same perimeter shape and dimensions, so that the cover 125 and the third layer 415 are coextensive in some examples. The second layer 410 and the first layer 405 may be centrally disposed over the third layer 415, such as over the treatment aperture 430. The cover 125 may be disposed over the first layer 405 and coupled to the third layer 415 around the first layer 405 so that at least some of the adhesive 455 can be disposed adjacent to the apertures 435. The sensor 145 may comprise a sensing element 500 and one or more leads 505 electrically coupled to the sensing element 500.

In some embodiments, the sensing element 500 may be include an electroactive polymer (EAP). In some embodiments, the sensing element 500 may have an elongate shape. For example, the sensing element 500 may be rectangular in shape. The sensing element 500 may have a first end 510, a centerline 515, a central portion 520, a second end 525, and a length $L_S$ from the first end 510 to the second end 525. The central portion 520 of the sensing element 500 may be located proximate a central portion of the dressing 110. In some embodiments for example, the centerline 515 of the sensing element 500 may be aligned with a centerline 530 of the dressing 110. The dressing 110 may have a length $L_D$ and the first layer 405 may have a length $L_{FL}$. As shown in the example of FIG. 5, in some embodiments, the length $L_S$ of the sensing element 500 may be between the length $L_D$ of the dressing 110 and the length $L_{FL}$ of the first layer 405. In some embodiments, the length $L_S$ of the sensing element 500 may be less than the length $L_D$ of the dressing 110 and greater than the length $L_{FL}$ of the first layer 405. In some embodiments, the length $L_S$ of the sensing element 500 may be equal to the length $L_D$ of the dressing 110. In some embodiments, the length $L_S$ of the sensing element 500 may be equal to the length $L_{FL}$ of the first layer 405. In some embodiments, the sensing element 500 may also include a plurality of fluid restrictions 535, such as, for example, fenestrations. The fluid restrictions 535 in the sensing element 500 may be aligned with at least some of the fluid restrictions 420 in the second layer 410. The fenestrations may allow for the transmission of fluids and negative pressure to and from the tissue site.

In some embodiments, the first end 510 of the sensing element 500 may be located proximate to a periphery 540 of the dressing 110. In some embodiments, the first end 510 of the sensing element 500 may extend to the periphery 540 of the dressing 110. In some embodiments, the first end 510 of the sensing element 500 may be located between a periphery 545 of the first layer 405 and the periphery 540 of the dressing 110. Additionally, the second end 525 of the sensing element 500 may be located proximate to a periphery 540 of the dressing 110. In some embodiments, the second end 525 of the sensing element 500 may extend to the periphery 540 of the dressing 110. In some embodiments, the second end 525 of the sensing element 500 may be located between the periphery 545 of the first layer and the periphery 540 of the dressing 110. In some embodiments, the sensing element 500 may extend across the first layer 405, with the central portion 520 located over the first layer 405 and the first end 510 and the second end 525 extending beyond opposite sides of the first layer 405. In some embodiments, the first end 510 may be located proximate to the centerline 530 of the dressing 110 and the second end 525 may be located proximate to the periphery 540 of the dressing 110. The sensor 145 may extend from the central portion of the dressing 110 to the peripheral portion of the dressing 110. In some embodiments, the sensor 145 may be encased with a medical-grade polymer. Although the sensor 145 is shown as extending in only one direction with respect to the dressing 110, in some embodiments one or more additional sensors 145 may be coupled to the dressing 110 extending at one or more angles with respect to the dressing 110.

With continued reference to FIG. 5, the one or more leads 505 of the sensor 145 may extend from the first end 510 of the sensing element 500. The leads 505 may be electrically coupled to the controller 130 (not shown). Data or signals corresponding to or representing the measurement of the sensor 145 may be transmitted by the leads 505 to the controller 130.

In operation, the dressing 110 may be applied to the tissue site such that the tissue interface 120 overlaps the edge of a wound. Negative pressure applied through the tissue interface 120 can create a negative pressure differential across the fluid restrictions 420 in the second layer 410, which can open or expand the fluid restrictions 420. For example, in some embodiments in which the fluid restrictions 420 may comprise substantially closed fenestrations through the second layer 410, a pressure gradient across the fenestrations can strain the adjacent material of the second layer 410 and increase the dimensions of the fenestrations to allow liquid movement through them, similar to the operation of a duckbill valve. Opening the fluid restrictions 420 can allow exudate and other liquid movement through the fluid restrictions 420 into the first layer 405. Opening the fluid restrictions 420 can also provide manifolding of the applied negative pressure to the tissue site. The first layer 405 can provide passage of negative pressure and wound fluid, which can be collected in the container 115. Changes in pressure can also cause the first layer 405 to expand and contract, and the second layer 410, the third layer 415, or both may protect the epidermis from irritation that could be caused by expansion, contraction, or other movement of the first layer 405. The second layer 410 and the third layer 415 can also substantially reduce or prevent exposure of a tissue site to the first layer 405, which can inhibit growth of tissue into the first layer 405. For example, the second layer 410 may cover the treatment aperture 430 to prevent direct contact between the first layer 405 and a tissue site. Additionally, around the wound, on intact skin of a periwound area, the fluid restrictions 420 may not completely open or may open a lesser amount than the fluid restrictions 420 over the wound. The dressing 110 over the tissue site may have some stretch, but may readily transmit a closure force to the tissue site which may induce macro-strain and micro-strain in the tissue site. The sensor 145 may be configured to measure the closure force applied to the tissue site under the application of negative pressure to the tissue interface 120.

Figure 6A:
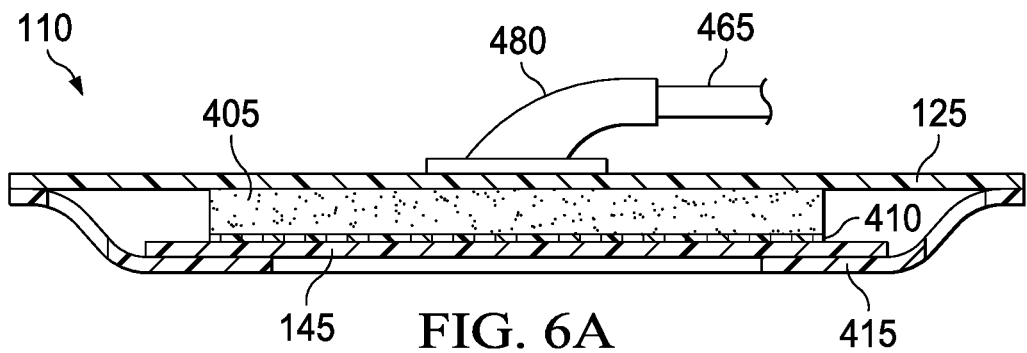
FIG. 6A is a schematic view of another example of a dressing including a sensor, illustrating additional details that may be associated with some embodiments.

FIG. 6A, FIG. 6B, FIG. 6C, and FIG. 6D are schematic views of additional examples of the dressing 110 illustrating locations of the sensor 145 according to some embodiments. The sensor 145 may be disposed between the layers of the dressing 110. As shown in FIG. 6A, the sensor 145 may be located between the second layer 410 and the third layer 415. In some embodiments, the sensor 145 may be coupled to the second layer 410 opposite the first layer 405. The sensor 145 may be coupled to the bottom side of the second layer 410. In some embodiments, the sensor 145 may be integrated with the second layer 410. In some embodiments, the sensor 145 may be printed on the bottom side of the second layer 410. In some embodiments, the sensor 145 may be coupled to the top side of the third layer 415. In some embodiments, the sensor 145 may be integrated with the third layer 415. In some embodiments, the sensor 145 may be printed on the top side of the third layer 415.

Figure 6B:
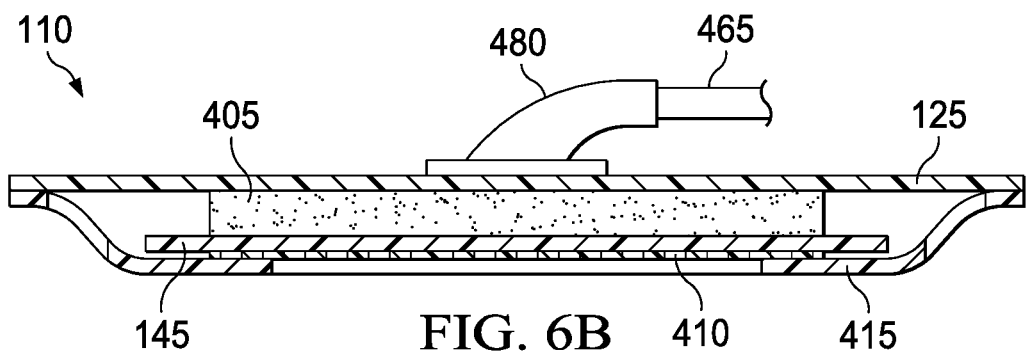
FIG. 6B is a schematic view of another example of a dressing including a sensor, illustrating additional details that may be associated with some embodiments.

As shown in FIG. 6B, the sensor 145 may be located between the first layer 405 and the second layer 410. In some embodiments, the sensor 145 may be coupled to the first layer 405 opposite the cover 125. The sensor 145 may be coupled to the bottom side of the first layer 405. In some embodiments, the sensor 145 may be integrated with the first layer 405. In some embodiments, the sensor 145 may be printed on the bottom side of the first layer 405. In some embodiments, the sensor 145 may be coupled to the second layer 410 opposite the third layer 415. In some embodiments, the sensor 145 may be coupled to the top side of the second layer 410. In some embodiments, the sensor 145 may be integrated with the second layer 410. In some embodiments, the sensor 145 may be printed on the top side of the second layer 410.

Figure 6C:
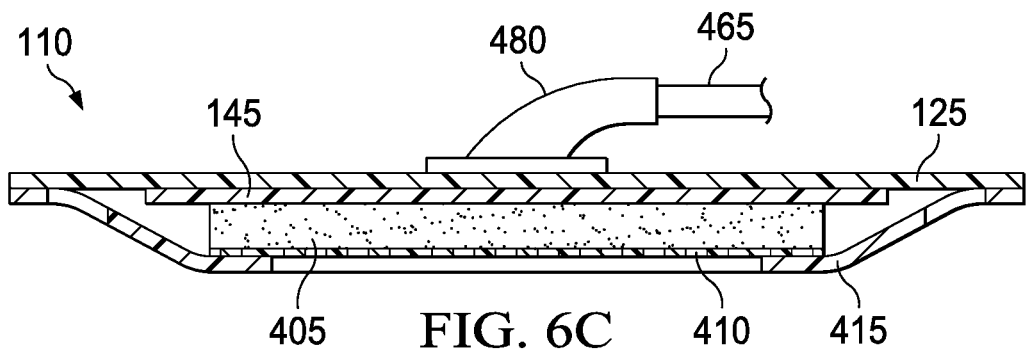
FIG. 6C is a schematic view of another example of a dressing including a sensor, illustrating additional details that may be associated with some embodiments.

As shown in FIG. 6C, the sensor 145 may be located between the cover 125 and the first layer 405. In some embodiments, the sensor 145 may be coupled to the first layer 405 opposite the second layer 410. The sensor 145 may be coupled to the top side of the first layer 405. In some embodiments, the sensor 145 may be integrated with the first layer 405. In some embodiments, the sensor 145 may be printed on the top side of the first layer 405. In some embodiments, the sensor 145 may be coupled to the bottom side of the cover 125. In some embodiments, the sensor 145 may be integrated with the cover 125. In some embodiments, the sensor 145 may be printed on the bottom side of the cover 125.

Figure 6D:
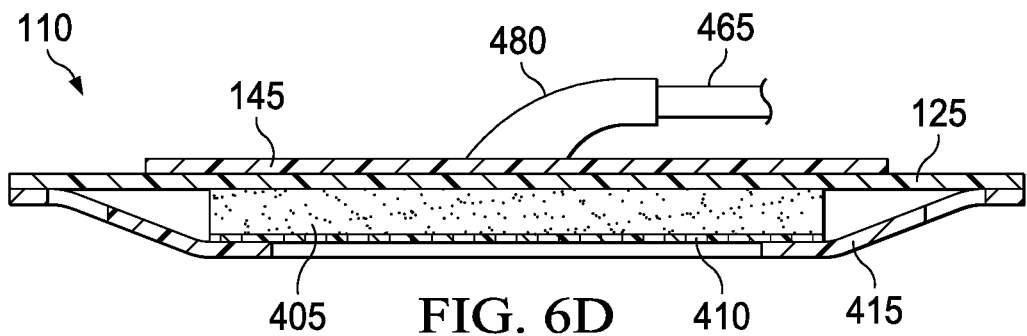
FIG. 6D is a schematic view of another example of a dressing including a sensor, illustrating additional details that may be associated with some embodiments.

As shown in FIG. 6D, the sensor 145 may be located above the cover 125. In some embodiments, the sensor 145 may be coupled to the cover 125 opposite the first layer 405. The sensor 145 may be coupled to the top side of the cover 125. In some embodiments, the sensor 145 may be integrated with the cover 125. In some embodiments, the sensor 145 may be printed on the top side of the cover 125.

Individual components of the dressing 110 in the examples of FIG. 6A, FIG. 6B, FIG. 6C, and FIG. 6D may be bonded or otherwise secured to one another with a solvent or non-solvent adhesive, or with thermal welding, for example, without adversely affecting fluid management. For example, the sensor 145 may be coupled to the cover 125, the first layer 405, the second layer 410, or the third layer 415 in any suitable manner, such as with a weld or an adhesive (e.g. a silicone adhesive, a polyurethane adhesive).

Figure 7:
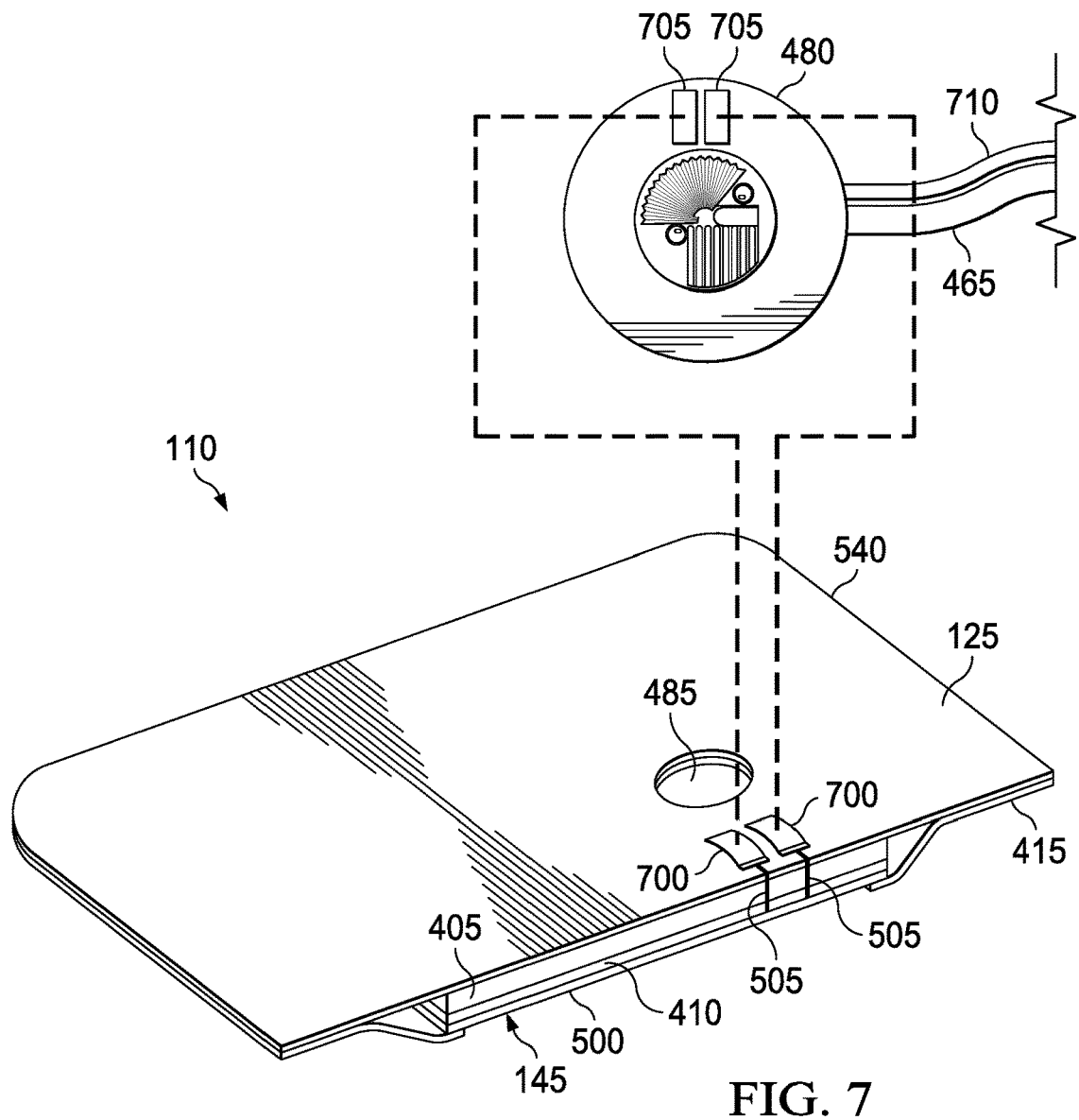
FIG. 7 is an assembly view of another example of a dressing including a sensor, illustrating additional details that may be associated with some embodiments.

FIG. 7 is a cutaway assembly view of another example of the dressing 110 including the sensor 145, illustrating additional details that may be associated with some embodiments. In some embodiments, the sensor leads 505 may extend from the sensor 145 and terminate with one or more electrical terminals, such as, for example, a pair of electrical contacts 700. In some embodiments, the electrical terminals may be proximate the peripheral portion of the dressing 110. In some embodiments, the electrical terminals may be located at the periphery 540 of the dressing 110. In some embodiments, the sensor leads 505 may terminate on the top of the cover 125 with the pair of electrical contacts 700. The electrical contacts 700 may be spring loaded. For example, the electrical contacts 700 may be cantilever springs. Additionally, the dressing interface 480 may include one or more electrical terminals, such as, for example, a pair of electrical contacts 705. The pair of electrical contacts 705 on the dressing interface 480 may be configured to electrically couple with the pair of electrical contacts 700 of the sensor 145 when the dressing interface 480 is coupled to the cover 125. The dressing interface 480 may include further include one or more leads 710 that may be electrically coupled with the pair of electrical contacts 705. Coupling the pair of electrical contacts 705 of the dressing interface 480 to the pair of electrical contacts 700 of the sensor 145 may electrically couple the sensor 145 to the controller 130. Data or signals corresponding to or representing the measurement of the sensor 145 may be communicated between the sensor 145 and the dressing interface 480 via electrical contacts 700 and electrical contacts 705. In some embodiments, the dressing interface 480 may include more than two electrical contacts 705. For example, if the dressing 110 includes more than one sensor 145, the dressing interface 480 may have a sufficient number of electrical contacts 705 to electrically couple with each sensor 145.

Figure 8:
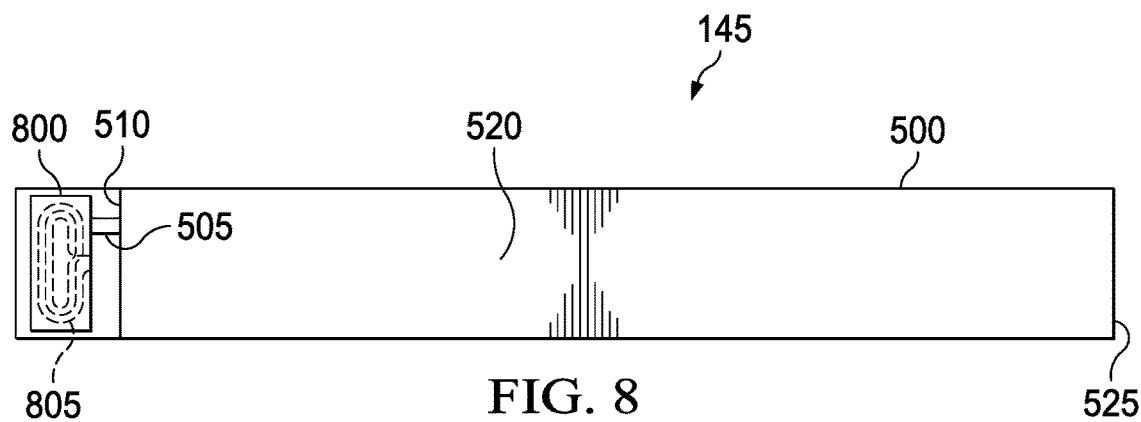
FIG. 8 is a top view of an example of a sensor that may be associated with some embodiments of a dressing.

FIG. 8 is a top view of an example of the sensor 145 that may be associated with some embodiments of the dressing 110. In some embodiments, the sensor 145 may further include a wireless communication module 800 electrically coupled to the sensing element 500 by the leads 505. The wireless communication module 800 may be configured to transmit data and/or signals to and from the sensor 145. The wireless communication module 800 may comprise an antenna 805 and a small system on a chip (SoC; not shown). In some embodiments, the wireless communication module 800 may be an NFC module, such as an NFC target, that is configured to be coupled with an NFC initiator that may power and query the sensor 145. In some embodiments, the wireless communication module 800 may function as an NFC target. In some embodiments, the wireless communication module 800 may function as an NFC initiator. In some embodiments, the wireless communication module 800 may function as an NFC target and as an NFC initiator. The wireless communication module 800 may be coupled to the first end 510 of the sensing element 500. In some embodiments, the wireless communication module 800 may be located in a different position on the sensing element 500. For example, in some embodiments, the wireless communication module 800 may be coupled to the second end 525 of the sensing element 500. In another example, the wireless communication module 800 may be coupled to the central portion 520 of the sensing element 500. In some embodiments, the wireless communication module 800 may be the RF430FRL152H NFC chip available from Texas Instruments, Inc. of Dallas, Texas. In some embodiments, the wireless communication module 800 may be a Bluetooth™ module. In some embodiments, the wireless communication module 800 may be battery-powered. In some embodiments, the wireless communication module 800 may be inductively charged or powered. The wireless communication module 800 may be coated with an insulating material, which can prevent fluids from contacting the wireless communication module 800 and may prevent shorting out of the wireless communication module 800. In some embodiments, the insulating material may comprise silicone. In some embodiments, the insulating material may comprise a medical-grade, rubberized polymer.

Figure 9:
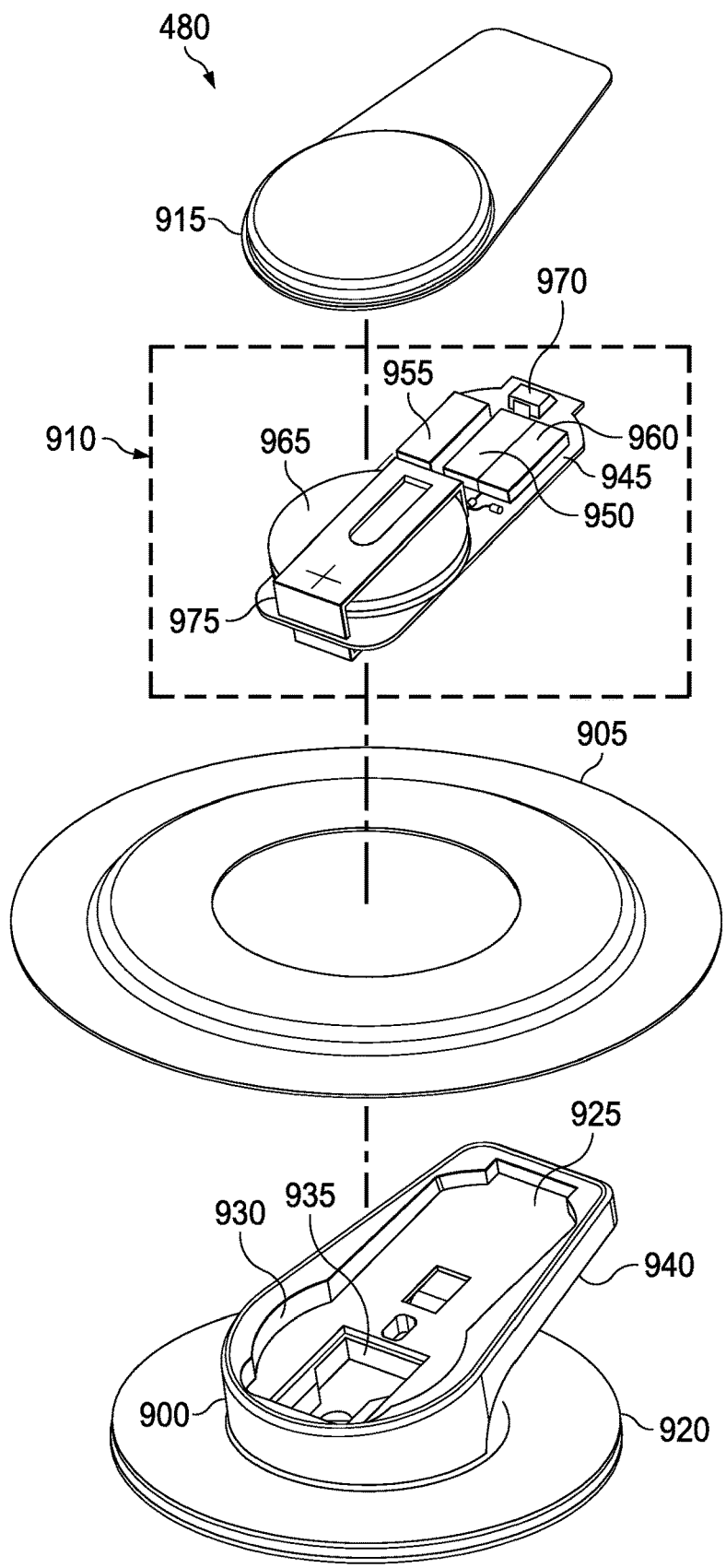
FIG. 9 is an assembly view of an example of a dressing interface including a sensor assembly that may be associated with some embodiments of a dressing.

FIG. 9 is an assembly view of an example of the dressing interface 480 that may be associated with some embodiments of the dressing 110. In some embodiments, the dressing interface 480 may include a housing 900, a ring 905, a sensor assembly 910, and a cap 915. The housing 900 may include a flange 920. In some embodiments, the housing 900 may include a wall 925 forming a component cavity 930 opening away from the flange 920. In some embodiments, the housing 900 may further include a sensor bracket 935 depending toward the flange 920 and opening away from the flange 920. The housing 900 may further include a neck 940.

In some embodiments, the sensor assembly 910 may include a circuit board 945 on which electrical circuits and/or electronic components may be printed or mounted. For example, in some embodiments, the sensor assembly 910 may further include a first wireless communications module 950, a second wireless communications module 955, a front-end amplifier 960, a power source 965, and a voltage regulator 970 electrically coupled to the circuit board 945. In some embodiments, the sensor assembly 910 may be rechargeable. In some embodiments, the sensor assembly 910 may be recharged wirelessly via inductive charging. The sensor assembly 910 may further include a bracket 975 configured to retain the power source 965 to the circuit board 945. The sensor assembly 910 may be configured to be disposed in the component cavity 930 of the housing 900. The component cavity 930 may be closed by the cap 915 to protect the sensor assembly 910.

Figure 10A:
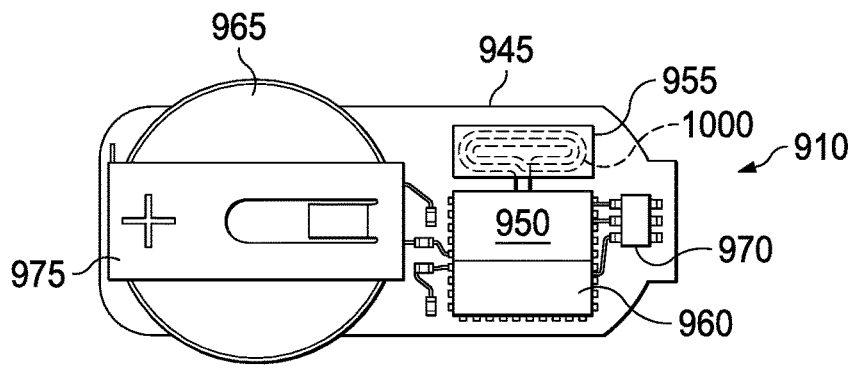
FIG. 10A is a top view of an example of a the sensor assembly of FIG. 9.

FIG. 10A, FIG. 10B, FIG. 10C, and FIG. 10D are top, side, bottom, and isometric views of the sensor assembly 910 of FIG. 9, illustrating additional features of some embodiments. As shown in FIG. 10A, the first wireless communications module 950, the front-end amplifier 960, the second wireless communication module 955, the power source 965, and the voltage regulator 970 may be coupled to a top side of the circuit board 945. The first wireless communications module 950 may include an integrated microprocessor. In some embodiments, the first wireless communication module 950 may be an integrated device implementing Bluetooth™ wireless technology. For example, the first wireless communications module 950 may be a Bluetooth™ Low Energy system-on-chip. In some embodiments, the first wireless communications module 950 may be a Bluetooth™ device that includes a microprocessor such as the nRF51822 chip available from Nordic Semiconductor.

The second wireless communication module 955 may comprise an antenna 1000 and a small system on a chip (SoC; not shown). In some embodiments, the second wireless communication module 955 may be an NFC module. In some embodiments, the second wireless communication module 955 may function as an NFC target. In some embodiments, the second wireless communication module 955 may function as an NFC initiator. In some embodiments, the second wireless communication module 955 may function as an NFC target and as an NFC initiator. In some embodiments, the second wireless communication module 955 may be integrated in or with the first wireless communications module 950. For example, in some embodiments, the second wireless communication module 955 and the first wireless communications module 950 may be included in a single integrated chip (IC) or an IC package. In some embodiments, the integrated first wireless communications module 950 and second wireless communication module 955 and may be the Laird Connectivity BL652 Bluetooth v5+NFC Module commercially available from Laird Connectivity.

The power source 965 may be secured to the circuit board 945 by the bracket 975. The power source 965 may be, for example, a battery that may be a coin battery having a low-profile that provides a 3-volt source for the first wireless communication module 950, the second wireless communication module 955, and other electronic components coupled to the sensor assembly 910. The voltage regulator 970 may provide signal conditioning.

Figure 10B:
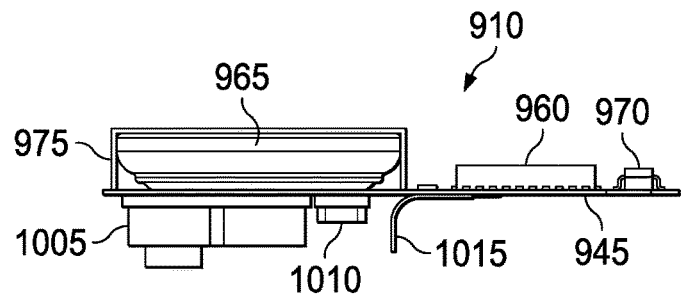
FIG. 10B is a side view of the sensor assembly of FIG. 9.
Figure 10C:
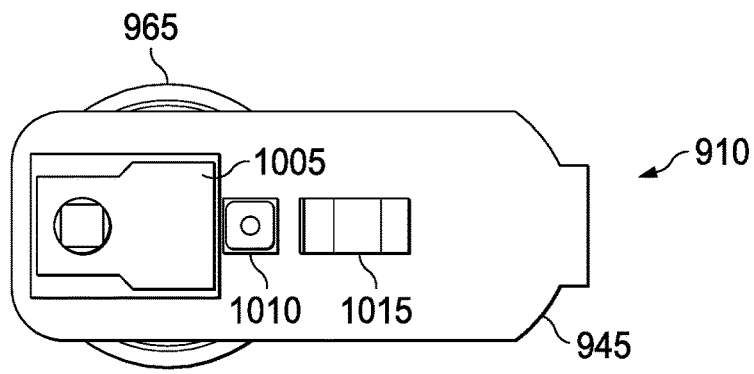
FIG. 10C is a bottom view of the sensor assembly of FIG. 9.
Figure 10D:
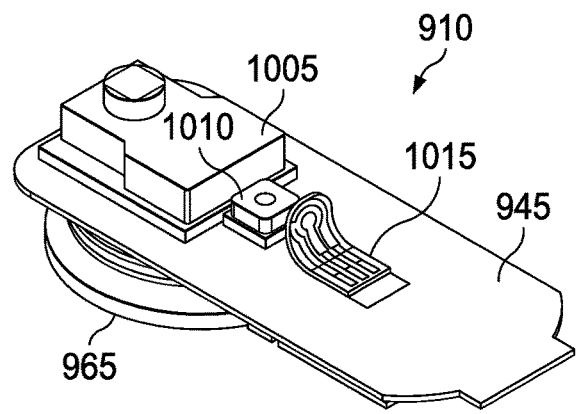
FIG. 10D is an isometric view of the sensor assembly of FIG. 9.

As shown in FIG. 10B, FIG. 10C, and FIG. 10D, in some embodiments, the sensor assembly 910 may further include one or more of a pressure sensor 1005, a humidity sensor 1010, and a pH sensor 1015. The pressure sensor 1005, the humidity sensor 1010, and the pH sensor 1015 may be electrically coupled to one or more of the first wireless communications module 950, the front-end amplifier 960, the second wireless communication module 955, the power source 965, and the voltage regulator 970.

Figure 11:
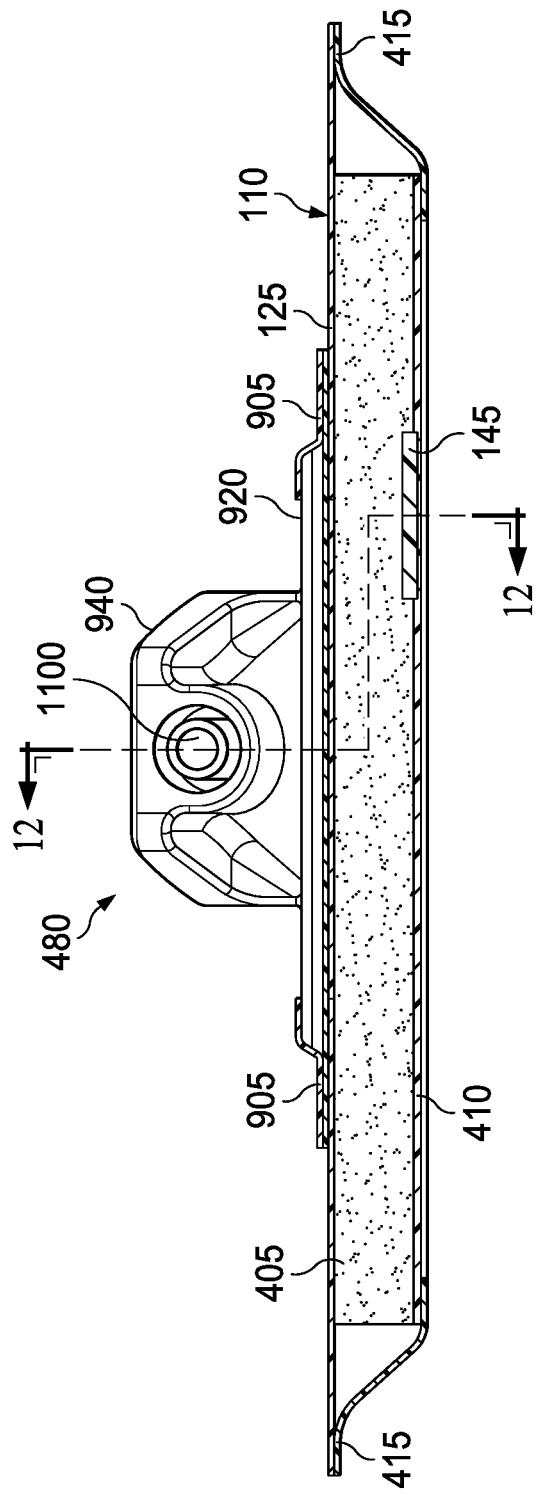
FIG. 11 is a rear view of the dressing interface of FIG. 9 coupled to an example of a dressing, illustrating additional details that may be associated with some embodiments.

FIG. 11 is a rear view the dressing interface 480 of FIG. 9 coupled to an example of the dressing 110, illustrating additional details that may be associated with some embodiments. The dressing interface 480 may be coupled to the cover 125 of the dressing 110 by the drape ring 905 which may be configured to cover the circumference of the flange 920 and the adjacent portion of the cover 125. In some embodiments, the drape ring 905 may comprise a polyurethane film including an attachment device such as, for example, an acrylic, polyurethane gel, silicone, or hybrid combination of the foregoing adhesives to couple the drape ring 905 to the flange 920 and the cover 125. The attachment device of drape ring 905 may be a single element of silicon or hydrocolloid with the adhesive on each side that functions as a gasket between the cover 125 and the flange 920. In some embodiments, the drape ring 905 may be similar to the cover 125 and/or the adhesive 455. As further shown in FIG. 11, the dressing interface 480 may further comprise a port 1100 in the neck 940. The fluid conductor 465 may be fluidly coupled to the dressing interface 480 through the port 1100. In some embodiments, the sensor 145 may be offset from the dressing interface 480. By offsetting the sensor 145 from the dressing interface 480, restriction to the application of negative pressure and/or the removal of fluids from the tissue site by the sensor 145 may be reduced or eliminated.

Figure 12:
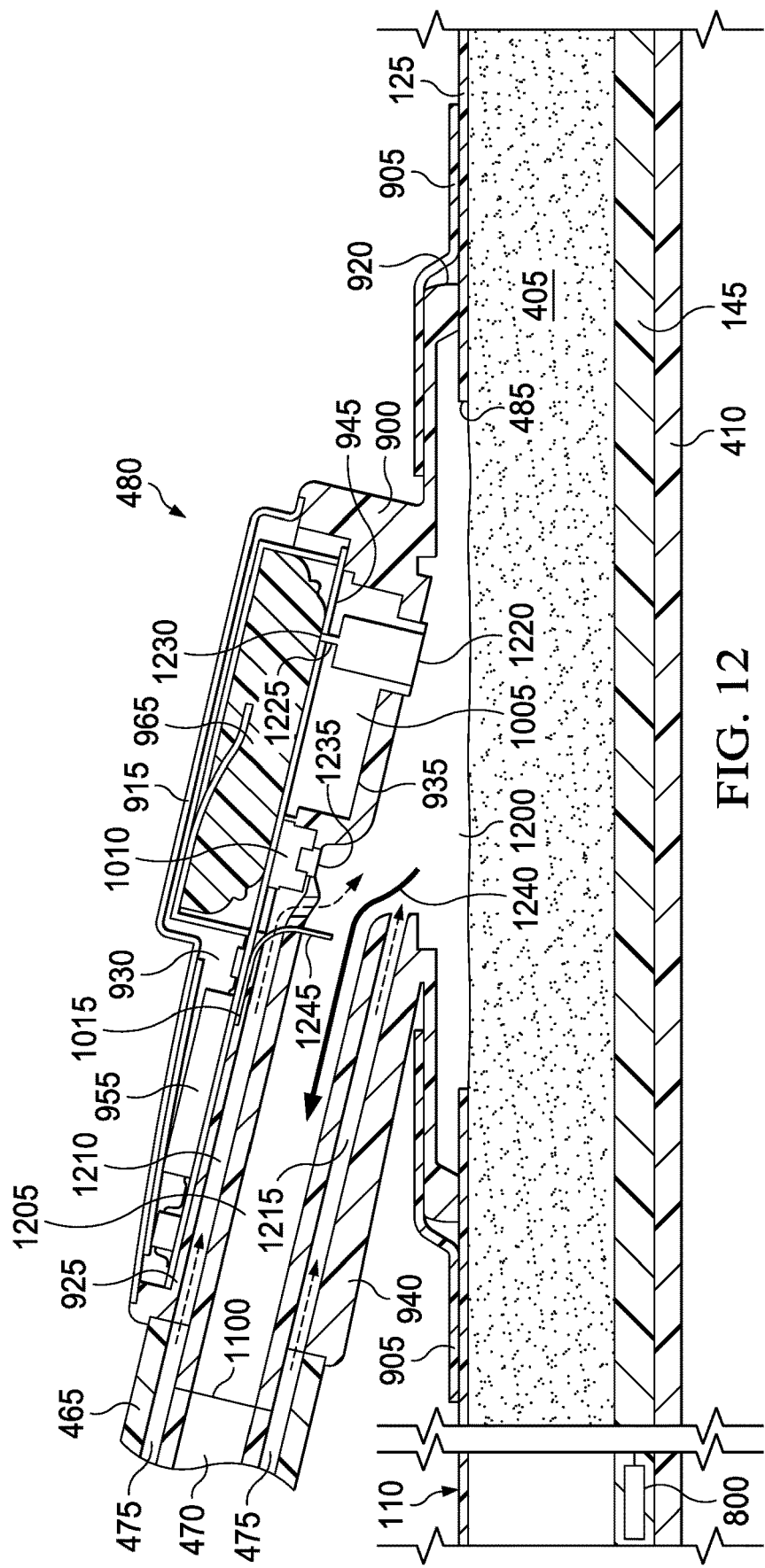
FIG. 12 is a section view of FIG. 11 taken along line 12-12.

FIG. 12 is a section view of the dressing 110 of FIG. 11 taken along line 12-12. The dressing interface 480 may further comprise a therapy cavity 1200 within the housing 900. The therapy cavity 1200 may be open to the first layer 405 when the dressing interface 480 is coupled to the cover 125 of the dressing 110. The therapy cavity 1200 may be formed in part by the wall 925. In some embodiments, the wall 925 may be between the therapy cavity 1200 and the component cavity 930. In some embodiments, the circuit board 945 and the wall 925 may cooperate to pneumatically seal the therapy cavity 1200 from the component cavity 930 when the circuit board 945 is seated in the component cavity 930.

In some embodiments, the dressing interface 480 may further include a primary conduit 1205 and one or more ancillary conduits, such as, for example, ancillary conduit 1210 and ancillary conduit 1215 extending from the port 1100 toward the therapy cavity 1200. The primary conduit 1205, the ancillary conduit 1210, and the ancillary conduit 1215 may be fluidly coupled to the therapy cavity 1200. In some embodiments, the primary conduit 1205 may be fluidly coupled to the negative-pressure source 105 by, for example, the primary lumen 470 of the fluid conductor 465. In some embodiments, one or more of the ancillary conduit 1210 and the ancillary conduit 1215 may be fluidly coupled to the sensor 135 via the ancillary lumen 475 for measuring the pressure in the therapy cavity 1200. In some embodiments, the ancillary conduit 1210 may be a venting conduit for venting or purging fluids from the therapy cavity 1200. In some embodiments, the ancillary conduit 1215 may be an installation conduit for delivering instillation fluids to the therapy cavity 1200. For example, the ancillary conduit 1215 may be fluidly coupled directly or indirectly to the solution source 150 for flushing fluids from the therapy cavity 1200 for removal by the application of negative pressure through the primary conduit 1205.

When the dressing interface 480 is coupled to the dressing 110, the second wireless communication module 955 within the dressing interface 480 may be within a sufficient proximity to the wireless communication module 800 in the sensor 145 to allow communication between the second wireless communication module 955 within the dressing interface 480 and the wireless communication module 800 in the sensor 145. For example, in some embodiments, the second wireless communication module 955 may be less than 20 centimeters away from the wireless communication module 800 when the dressing interface 480 is coupled to the dressing 110.

As further shown in FIG. 12, in embodiments of the sensor assembly 910 that include the pressure sensor 1005, the pressure sensor 1005 may be disposed in the sensor bracket 935 of the dressing interface 480. In some embodiments, the pressure sensor 1005 may be a differential gauge comprising a sensing element 1220 and a vent 1225. The sensing element 1220 may be fluidly coupled to the therapy cavity 1200 through an aperture in the wall 925. The pressure sensor 1005 may seal the aperture in the wall 925. The vent 1225 of the pressure sensor 1005 may be fluidly coupled through the circuit board 945 to the component cavity 930 and the atmosphere by a vent hole 1230 extending through the circuit board 945. In some embodiments, the component cavity 930 covered by the cap 915 may be vented to the ambient environment to provide cooling to the electrical devices and a source of ambient pressure for the pressure sensor 1005. Because the component cavity 930 is vented to the ambient environment, the pressure sensor 1005 is able to measure the negative pressure at the tissue site with reference to the ambient pressure. The sensing element 1220 of the pressure sensor 1005 may be positioned in close proximity to the first layer 405 to optimize fluid coupling and accurately measure the negative pressure at the tissue site. In some embodiments, the pressure sensor 1005 may be a piezo-resistive pressure sensor having a pressure sensing element covered by a dielectric gel such as, for example, a Model TE 1620 pressure sensor available from TE Connectivity. The dielectric gel provides electrical and fluid isolation from the blood and wound exudates in order to protect the sensing element from corrosion or other degradation. This allows the pressure sensor 1005 to measure the negative pressure at the tissue site directly within the therapy cavity 1200 of the housing 900 proximate to the first layer 405 as opposed to measuring the negative pressure from a remote location. In some embodiments, the pressure sensor 1005 may be a gauge that measures the absolute pressure that does not need to be vented. In some embodiments, the pressure sensor 1005 may also comprise a temperature sensor for measuring the temperature at the tissue site.

In embodiments of the sensor assembly 910 that include the humidity sensor 1010, the humidity sensor 1010 may comprise a sensing element 1235 that may be fluidly coupled to the primary conduit 1205 and the therapy cavity 1200 to sense the humidity of fluids drawn into the primary conduit 1205 as shown along bold arrow 1240. The sensing element 1235 of the humidity sensor 1010 may be located proximate to the connection between the primary conduit 1205 and the therapy cavity 1200. As shown in FIG. 12, the sensing element 1235 of the humidity sensor 1010 may be located a further distance away from the flange 920 than the pressure sensing element 1220 of the pressure sensor 1005. The sensing element 1235 of the humidity sensor 1010 may be positioned within the housing 900 to limit direct contact with bodily fluids being drawn into the primary conduit 1205 from the tissue site. In some embodiments, the space within the therapy cavity 1200 adjacent the sensing element 1235 of the humidity sensor 1010 may be purged by venting the space through the ancillary conduit 1210. The space may also be flushed by instilling fluids into the space through the ancillary conduit 1215. In some embodiments, the humidity sensor 1010 may further comprise a temperature sensor (not shown). In some embodiments, the humidity sensor 1010 that comprises a temperature sensor may be a single integrated device such as, for example, Model TE HTU21D(F) humidity sensor also available from TE Connectivity.

In some embodiments, the pH sensor 1015 may include a sensing element 1245 that may be located proximate to the connection between the primary conduit 1205 and the therapy cavity 1200 so that the sensing element 1245 contacts the wound fluid without contacting the wound itself so that the sensing element 1245 of the pH sensor 1015 does not interfere with the wound healing process. In some embodiments, the space within the therapy cavity 1200 adjacent the sensing element 1245 of the pH sensor 1015 also may be purged by venting the space through the ancillary conduit 1210. The space may also be flushed by instilling fluids into the space through the ancillary conduit 1215.

Figure 13:
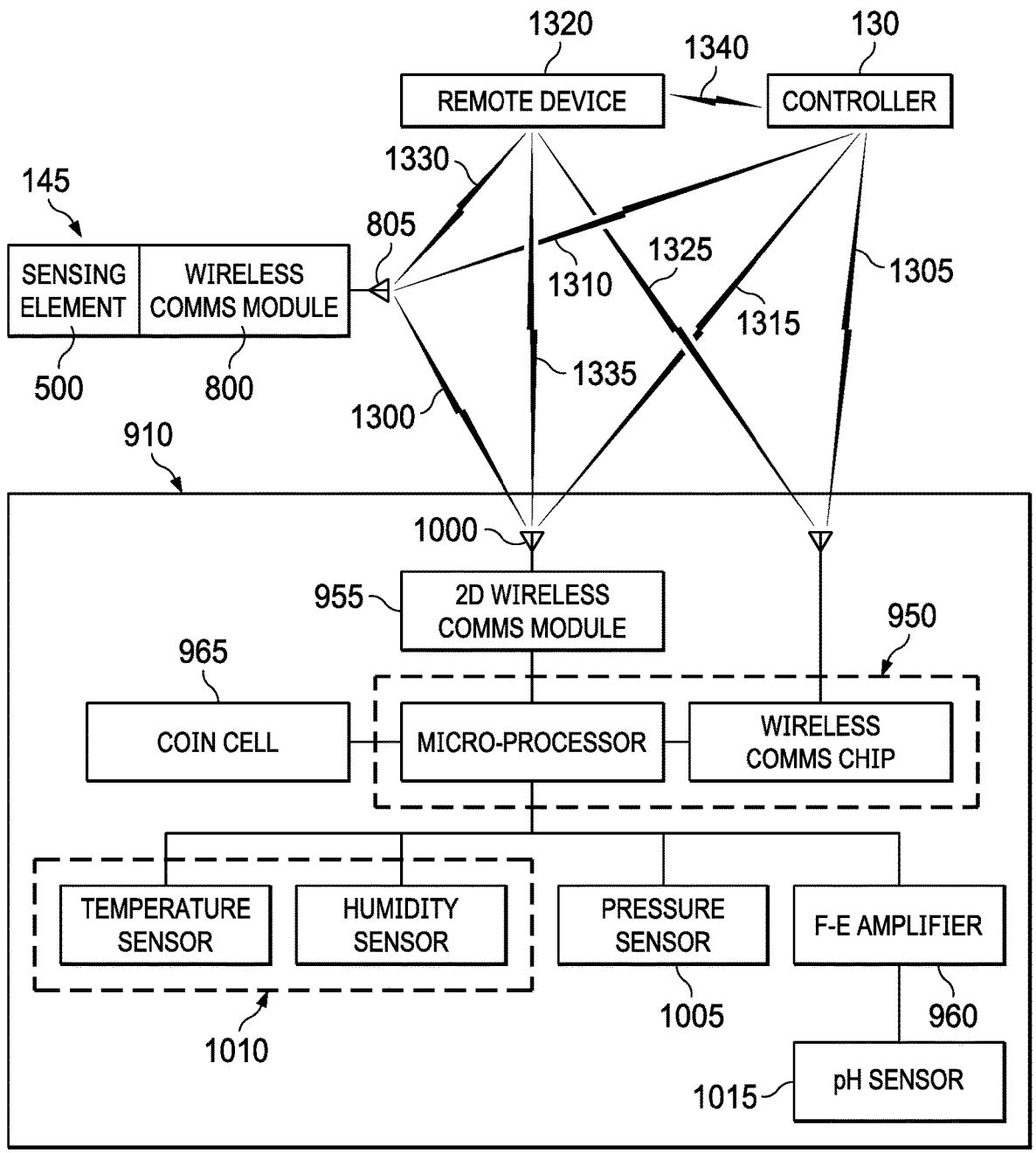
FIG. 13 is a block diagram of the sensor assembly of FIG. 9, illustrating additional details that may be associated with some embodiments.

FIG. 13 is a schematic block diagram illustrating is a block diagram of the sensor assembly 910 of FIG. 9, illustrating additional details that may be associated with some embodiments. In some embodiments, the microprocessor of the first wireless communications module 950 may be electrically coupled to the humidity sensor 1010, the pressure sensor 1005, and the pH sensor 1015. In some embodiments, the pH sensor 1015 may be electrically coupled to the first wireless communications module 950 via the front-end amplifier 960. The front-end amplifier 960 may comprise analog signal conditioning circuitry that includes sensitive analog amplifiers such as, for example, operational amplifiers, filters, and application-specific integrated circuits. The front-end amplifier 960 can measure minute voltage potential changes provided by the sensing element 1245 of the pH sensor 1015 to provide an output signal indicative of the pH of the fluids.

The second wireless communication module 955 may be electrically coupled to the microprocessor of the first wireless communications module 950. When the second wireless communication module 955 within the sensor assembly 910 is within a sufficient proximity to the wireless communication module 800 in the sensor 145, a wireless communication pathway may be created between the second wireless communication module 955 in the sensor assembly 910 and the wireless communication module 800 in the sensor 145 as indicated by wireless data signal 1300. In some embodiments, the second wireless communication module 955 in the sensor assembly 910 may function as an NFC initiator to activate the wireless communication module 800 in the sensor 145, which may function as an NFC target.

The second wireless communication module 955 in the sensor assembly 910 may send sufficient radiofrequency (RF) energy to the antenna 805 to power the wireless communication module 800 in the sensor 145. The power supplied by the second wireless communication module 955 may be sufficient to power the sensing element 500 so that the sensing element 500 can measure a physical phenomenon or property (e.g., strain) of the dressing 110. The wireless communication module 800 may then modulate the RF energy from the second wireless communication module 955 to send a signal corresponding to the physical phenomenon or property measured by the sensing element 500. For example, the signal sent from the wireless communication module 800 may indicate the strain measured by the sensing element 500. The signal received by the second wireless communication module 955 from the wireless communication module 800 may then be communicated to the first wireless communications module 950.

By powering the sensor 145 via the RF energy from the second wireless communication module 955 in the sensor assembly 910, the sensor 145 does not need its own power supply. For example, a battery does not need to be located in the dressing 110 to supply power to the sensor 145. Additionally, electrical leads extending from the sensor 145 and configured to couple to an external power supply do not need to be included in the dressing 110. Powering the sensor 145 by the second wireless communication module 955 in the sensor assembly 910 may result in reduced cost of the dressing 110, reduced complexity of the dressing 110, eliminated ingress and egress points on the dressing 110, and eliminated need to charge a battery on the dressing 110.

The controller 130 may communicate with the first wireless communication module 950 of the sensor assembly 910. The controller 130 may be able to communicate via Bluetooth™ technology (e.g., Bluetooth™ Low Energy). For example, the controller 130 may be paired with the first wireless communication module 950 via Bluetooth™ and may send and/or receive data and other information from the sensor assembly 910 as indicated by wireless data signal 1305. For example, the first wireless communication module 950 may communicate the measurements from the sensor 145 and received by the second wireless communication module 955 to the controller 130 via wireless data signal 1305. In some embodiments, the first wireless communication module 950 may also communicate the measurements from one or more of the pH sensor 1015, the pressure sensor 1005, and the temperature and humidity sensor 1010 to the controller 130 via wireless data signal 1305. In some embodiments, the controller 130 may be configured to control one or more of the negative-pressure source 105, the positive-pressure source 155, and the instillation regulator 160 in response to the signals received from one or more of the sensor 145, the humidity sensor 1010, the pressure sensor 1005, and the pH sensor 1015.

The controller 130 may be programmed to instruct the second wireless communication module 955 in the sensor assembly 910 to periodically power and query the sensor 145. The parameters measured by the sensor 145 may then be communicated back to the controller 130. For example, the controller 130 may be programmed to send a signal via Bluetooth™ to the first wireless communication module 950 every 5 minutes to trigger the second wireless communication module 955 to power and query the sensor 145 via NFC. In embodiments where the sensor 145 is an EAP sensor, for example, the measured strain data may then be communicated from the wireless communication module 800 in the sensor 145 to the second wireless communication module 955 in the sensor assembly 910, and from the first wireless communication module 950 to the controller 130 every 5 minutes. The controller 130 may have a user interface (e.g., button(s), display) by with a user can select the period (e.g., 5 minutes, 1 hour, 24 hours, 3 days, 7 days, etc.) in which the sensor 145 is queried.

In another example, when the controller 130 is within a sufficient proximity to the wireless communication module 800 in the sensor 145, a wireless communication pathway may be created between the controller 130 and the wireless communication module 800 of the sensor 145 as indicated by wireless data signal 1310. The controller 130 may function as an NFC initiator to activate the wireless communication module 800 in the sensor 145, which may function as an NFC target. The controller 130 may send sufficient radiofrequency (RF) energy to the antenna 805 to power the wireless communication module 800 in the sensor 145. The power supplied by the controller 130 may be sufficient to power the sensing element 500 so that the sensing element 500 can measure a physical phenomenon or property (e.g., strain) of the dressing 110. The wireless communication module 800 may then modulate the RF energy from the controller 130 to send to the controller 130 a signal corresponding to the measurements from the sensing element 500. For example, the signal sent from the wireless communication module 800 may indicate the strain measured by the sensing element 500.

In some embodiments, the controller 130 may establish a wireless communication pathway via NFC with the second wireless communication module 955 of the sensor assembly 910, as indicated by wireless data signal 1315, to initiate a Bluetooth™ pairing of the controller 130 with the first wireless communication module 950, as indicated by wireless data signal 1305.

Additionally, in some embodiments, a remote device 1320 may communicate with one or more of the sensor assembly 910, the sensor 145, and the controller 130. In some embodiments, the remote device 1320 may be, for example, a cell phone, tablet, laptop, computer, and server. In some embodiments, the remote device 1320 may be paired with the first wireless communication module 950 via Bluetooth™ and may send and/or receive data and other information from the sensor assembly 910 as indicated by wireless data signal 1325. For example, the first wireless communication module 950 may communicate the measurements from the sensor 145 to the remote device 1320 via wireless data signal 1325. In some embodiments, the first wireless communication module 950 may also communicate the measurements from one or more of the pH sensor 1015, the pressure sensor 1005, and the temperature and humidity sensor 1010 to the remote device 1320 via wireless data signal 1325.

In some embodiments, the remote device 1320 may be programmed to instruct the second wireless communication module 955 in the sensor assembly 910 to periodically power and query the sensor 145. The measurements from the sensor 145 may then be communicated back to the remote device 1320. For example, the remote device 1320 may be programmed to send a signal via Bluetooth™ to the first wireless communication module 950 every 5 minutes to trigger the second wireless communication module 955 to power and query the sensor 145. In embodiments where the sensor 145 is an EAP sensor, for example, the measured strain data may then be communicated from the wireless communication module 800 in the sensor 145 to the second wireless communication module 955 in the sensor assembly 910, and from the first wireless communication module 950 to the remote device 1320 every 5 minutes. The remote device 1320 may have a user interface (e.g., button(s), screen) by with a user can select the period (e.g., 5 minutes, 1 hour, 24 hours, 3 days, 7 days, etc.) in which the sensor 145 is queried.

In another example, when the remote device 1320 is within a sufficient proximity to the wireless communication module 800 in the sensor 145, a wireless communication pathway may be created between the remote device 1320 and the wireless communication module 800 of the sensor 145 as indicated by wireless data signal 1330. The remote device 1320 may function as an NFC initiator to activate the wireless communication module 800 in the sensor 145, which may function as an NFC target. The remote device 1320 may send sufficient radiofrequency (RF) energy to the antenna 805 to power the wireless communication module 800 in the sensor 145. The power supplied by the remote device 1320 may be sufficient to power the sensing element 500 so that the sensing element 500 can measure a physical phenomenon or property of the dressing 110. In embodiments where the sensing element 500 comprises an EAP sensor, the power provided by the remote device 1320 may be sufficient for the sensing element 500 to measure the strain in the dressing 110. The wireless communication module 800 may then modulate the RF energy from the remote device 1320 to send to the remote device 1320 a signal corresponding to the measurements from the sensing element 500. For example, the signal sent from the wireless communication module 800 may indicate the strain measured by the sensing element 500.

In some embodiments, the remote device 1320 may establish a wireless communication pathway via NFC with the second wireless communication module 955 of the sensor assembly 910, as indicated by wireless data signal 1335, to initiate a Bluetooth™ pairing of the controller 130 with the first wireless communication module 950, as indicated by wireless data signal 1305. In some embodiments, the remote device 1320 may establish a wireless communication pathway with the second wireless communication module 955 of the sensor assembly 910, as indicated by wireless data signal 1335, to initiate a Bluetooth™ pairing of the remote device 1320 with the first wireless communication module 950, as indicated by wireless data signal 1325. In some embodiments, the controller 130 and the remote device 1320 may communicate with one another as indicated by wireless data signal 1340.

Although the sensor 145, sensor assembly 910, controller 130, and the remote device 1320 are described as communicating via one or more of Bluetooth™ and NFC technology, it should be understood that other wireless communication technologies may be utilized that are suitable for use in medical devices.

In some embodiments, various components of the therapy system 100, such as the controller 130 and/or the remote device 1320, may include a user interface configured to provide various information regarding the therapy system 100. The user interface may be able to provide audio or visual indicia to a user. In some embodiments, the user interface may include one or more of a light that can display one or more colors (e.g., a light emitting diode (LED)), an audio device (e.g., a speaker, an alarm, a bell), and a display (e.g., a liquid crystal display (LCD), an E-Ink display, an organic light emitting diode (OLED) display, a dot matrix display). For example, an LED may be able to emit one or more colors that correspond to one or more statuses of the sensor assembly 910 and/or sensor 145. In another example, a display may be able to display one or more items of information, such as, for example (i) the status of the negative-pressure source 105 (e.g., ON, OFF, Pump Duty); (ii) the connection status one or more of the sensor 135, the sensor 140, the sensor 145, the humidity sensor 1010, the pressure sensor 1005, and the pH sensor 1015; (iii) the measurements from one or more of the sensor 135, the sensor 140, the sensor 145, the humidity sensor 1010, the pressure sensor 1005, and the pH sensor 1015; (iv) the connection status of the sensor assembly 910 to the controller 130; (v) the connection status of the sensor assembly 910; (vi) the power level of the power source 965; and (vii) error messages or codes. Additionally, in some embodiments, the sensor assembly 910 may be able to send a text message to or trigger a notification on the remote device 1320 regarding various items of information, such as a drop in strain measured by the sensor 145.

Figure 14:
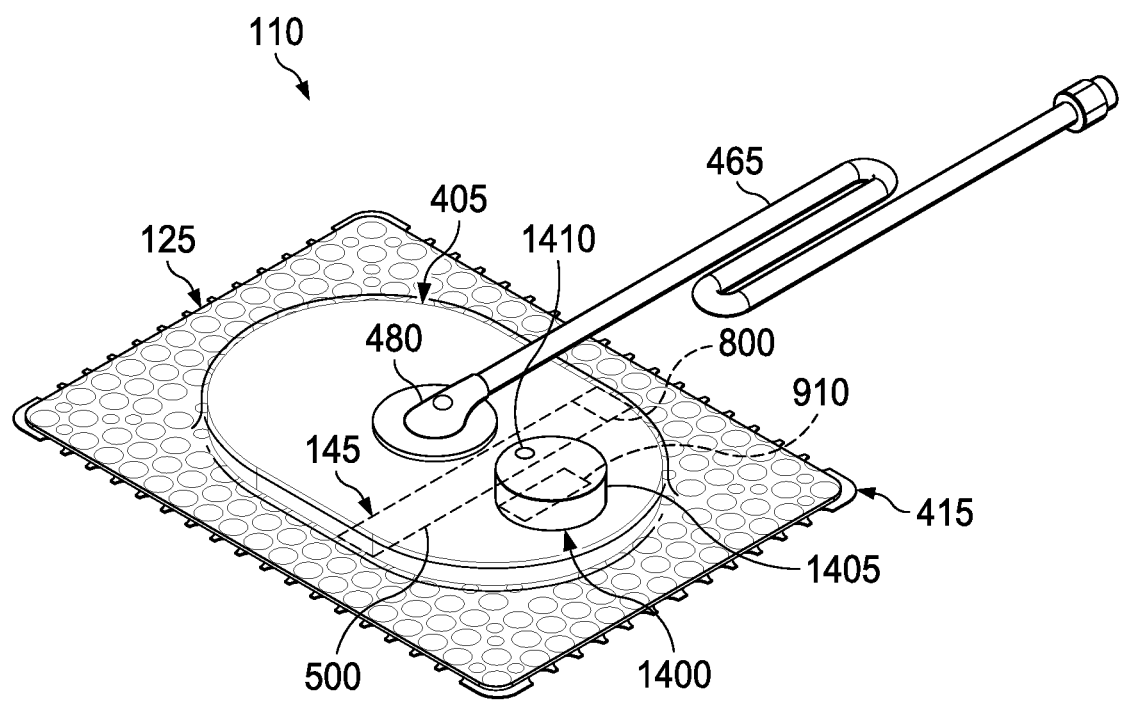
FIG. 14 is an isometric view of an example of a sensor module coupled to a dressing, illustrating additional details that may be associated with some embodiments.

FIG. 14 is an isometric view of an example of a sensor module 1400 coupled to the dressing 110, illustrating additional details that may be associated with some embodiments. The sensor module 1400 may include a housing 1405 in which the sensor assembly 910 may be housed. In some embodiments, the sensor module 1400 may also include a user interface 1410. The sensor module 1400 may be releasably coupled to the cover 125 of the dressing 110. The sensor module 1400 may be a separate component from the dressing interface 480. In some embodiments, the sensor assembly 910 may be rechargeable. For example, the sensor assembly 910 may be recharged wirelessly via inductive charging. The sensor module 1400 may be reusable on one or more patients, whereas the sensor 145 may be discarded with each dressing 110 change. Following cleaning and recharging of the sensor module 1400, the sensor module 1400 may be used with a new dressing 110 on the same patient or used with a dressing 110 on a new patient. In some embodiments, the sensor module 1400 may be configured for a single use. In some embodiments, the housing 1405 may be puck-shaped.

Figure 15:
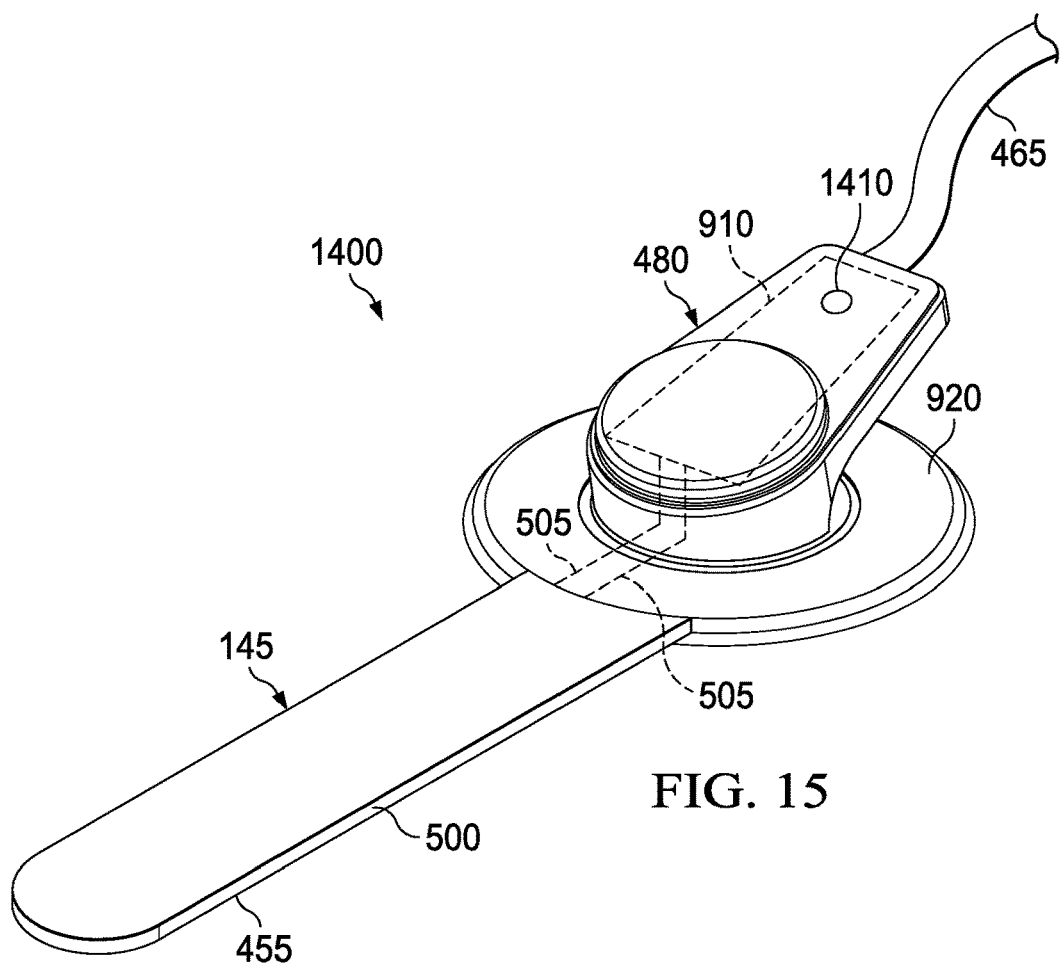
FIG. 15 is an isometric view of another example of a sensor module, illustrating additional details that may be associated with some embodiments.

FIG. 15 is an isometric view of another example of the sensor module 1400, illustrating additional details that may be associated with some embodiments. In some embodiments, the sensor module 1400 may comprise an integrated dressing interface 480 and sensor 145. The sensing element 500 may be coupled to and extend from the flange 920 of the dressing interface 480. The bottom of the sensing element 500 may be coplanar with the bottom of the flange 920. In some embodiments, the sensor 145 and the flange 920 may be configured to be coupled to the top of the cover 125. For example, the bottom of the sensing element 500 may include an attachment device, such as the adhesive 455, for coupling the sensor 145 to the cover 125. The sensor leads 505 of the sensor 145 may be electrically coupled to the sensor assembly 910 in the dressing interface 480. In the example embodiment of FIG. 15, one or more of the second wireless communication module 955 in the sensor assembly 910 and the wireless communication module 800 in the sensor 145 may be omitted. In some embodiments, during application of the dressing 110 on a patient, the sensor module 1400 can be adhered and applied to the dressing 110 with the dressing interface 480 placed over the aperture 485 (not shown) and the sensor 145 extending over at least a portion of the cover 125 of the dressing 110. The sensor module 1400 shown in FIG. 15 may be particularly beneficial for customizable dressings 110 that may be cut or shaped to fit a tissue site.

Figure 16:
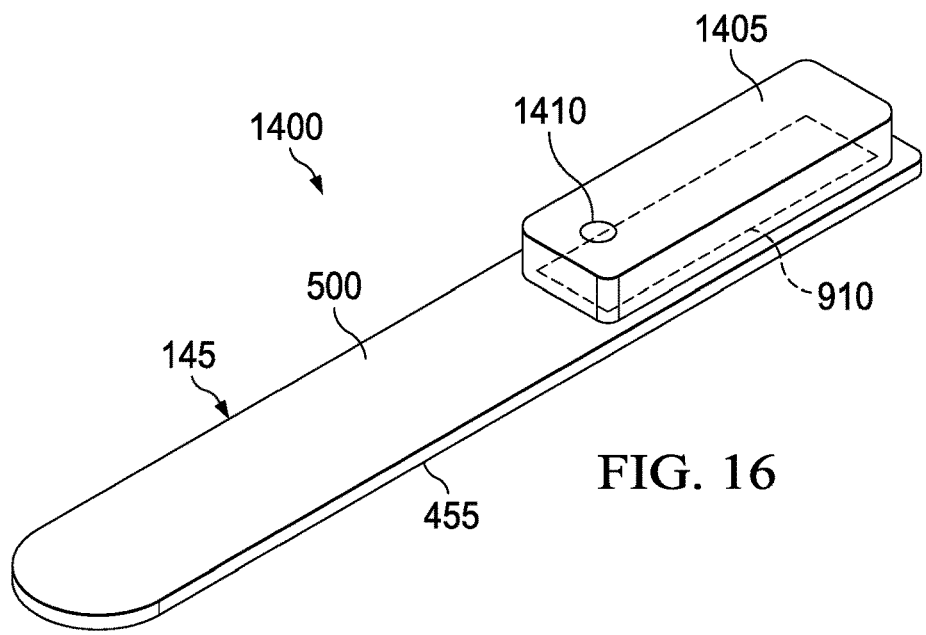
FIG. 16 is an isometric view of another example of a sensor module, illustrating additional details that may be associated with some embodiments.

FIG. 16 is an isometric view of another example of the sensor module 1400, illustrating additional details that may be associated with some embodiments. In some embodiments, the housing 1405 and the sensor 145 may be integrated to form the sensor module 1400. For example, the housing 1405 may be coupled to the top of the sensing element 500 proximate one end of the sensing element 500.

Figure 17A:
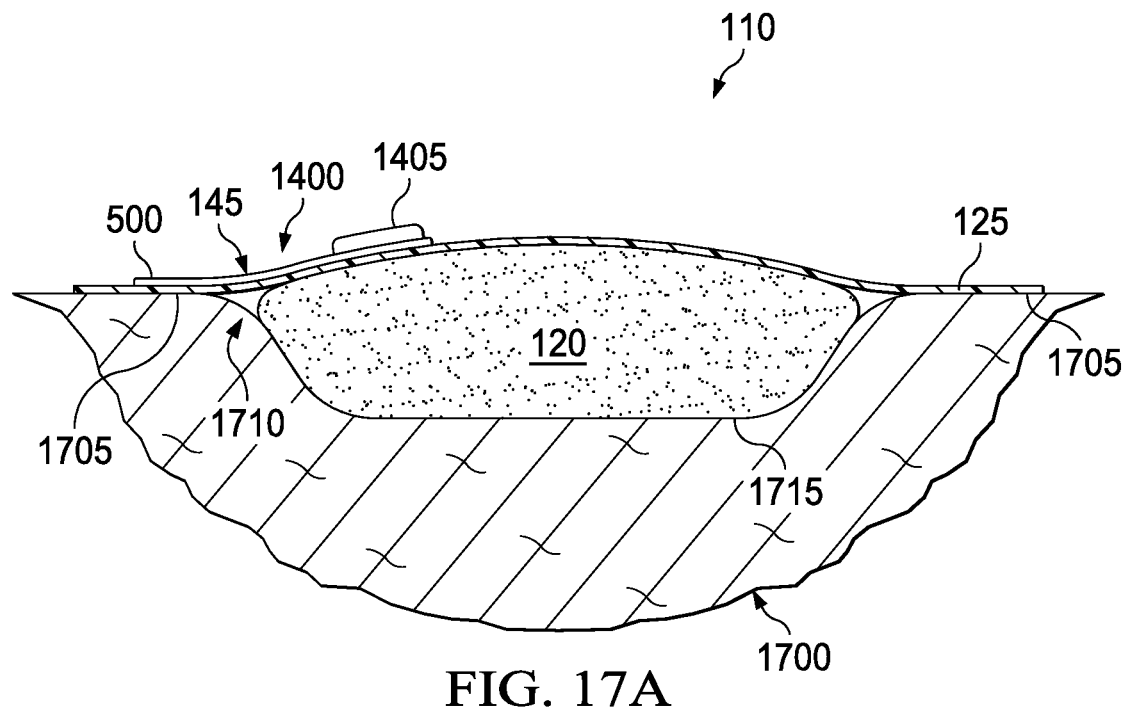
FIG. 17A is a schematic view of another example of a dressing with the sensor module of FIG. 16 coupled to a tissue site prior to the application of negative pressure, illustrating additional details that may be associated with some embodiments.
Figure 17B:
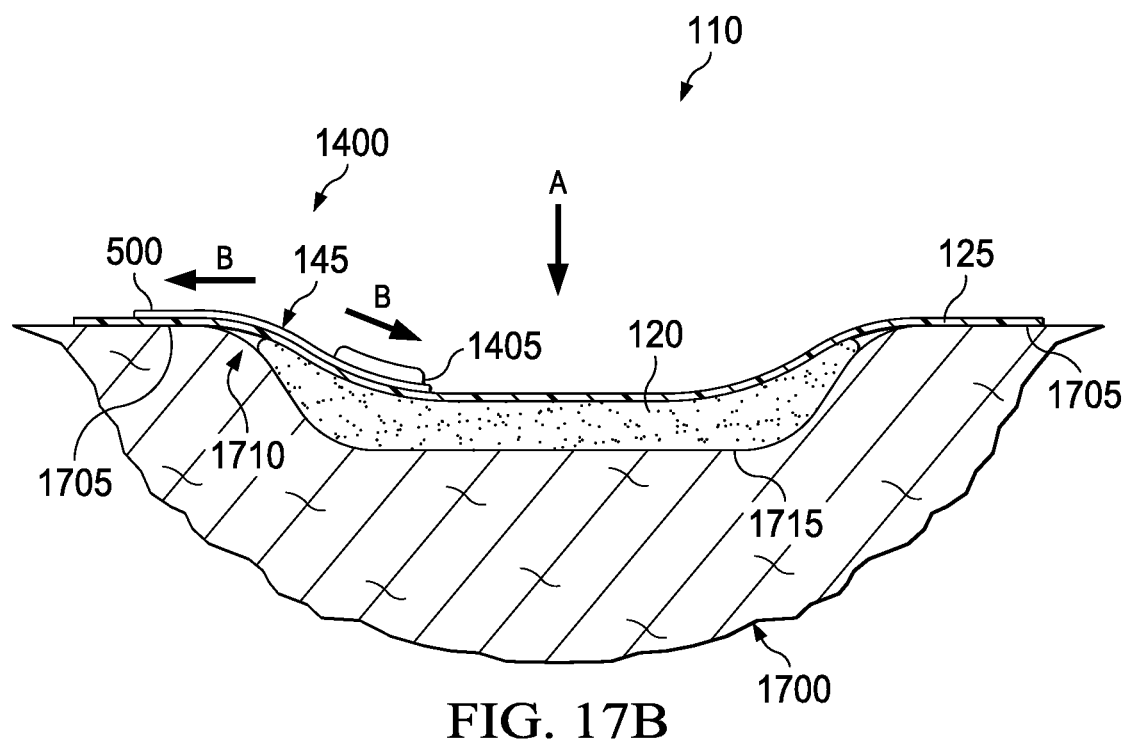
FIG. 17B is a schematic view of the dressing and sensor module of FIG. 17A after the application of negative pressure, illustrating additional details that may be associated with some embodiments.

FIG. 17A and FIG. 17B are schematic views illustrating the sensor module 1400 of FIG. 16 and an example of the dressing 110 coupled to a tissue site 1700, illustrating additional details that may be associated with some embodiments. As shown in FIG. 17A, the sensor module 1400 may be coupled to the cover 125. In some embodiments, the sensing element 500 of the sensor 145 extends from a periwound 1705, across a wound edge 1710, and over a wound 1715 of a tissue site 1700. The housing 1405 may be disposed over the wound. As shown in FIG. 17B, upon the application of negative-pressure to the tissue site 1700, the tissue interface 120 collapses and the cover 125 is pushed into the wound 1715 by atmospheric pressure (as represented by arrow A). When negative pressure is applied to the tissue site 1700, the portion of the cover 125 over the wound 1715 may move relative to the portion of the cover 125 over the periwound 1705, which remains fixed, resulting in the cover 125 being stretched. As the cover 125 is pushed into the wound 1715 it stretches. Because the sensing element 500 is coupled to the dressing 110, the stretching of the dressing 110 is transmitted to the sensing element 500 (as represented by arrows B). The sensing element 500 may stretch at the same time with and the same rate as the dressing 110. If the sensing element 500 is an EAP sensor, the stretching of the sensing element 500 causes the EAP sensor to thin and expand, increasing the capacitance of the EAP sensor. This change in capacitance of the EAP sensor can be correlated to and used as an analogue for the negative pressure applied to the tissue site 1700. Thus, the negative pressure delivered to the tissue site 1700 may be determined based on the strain measured by the sensor 145.

Figure 18A:
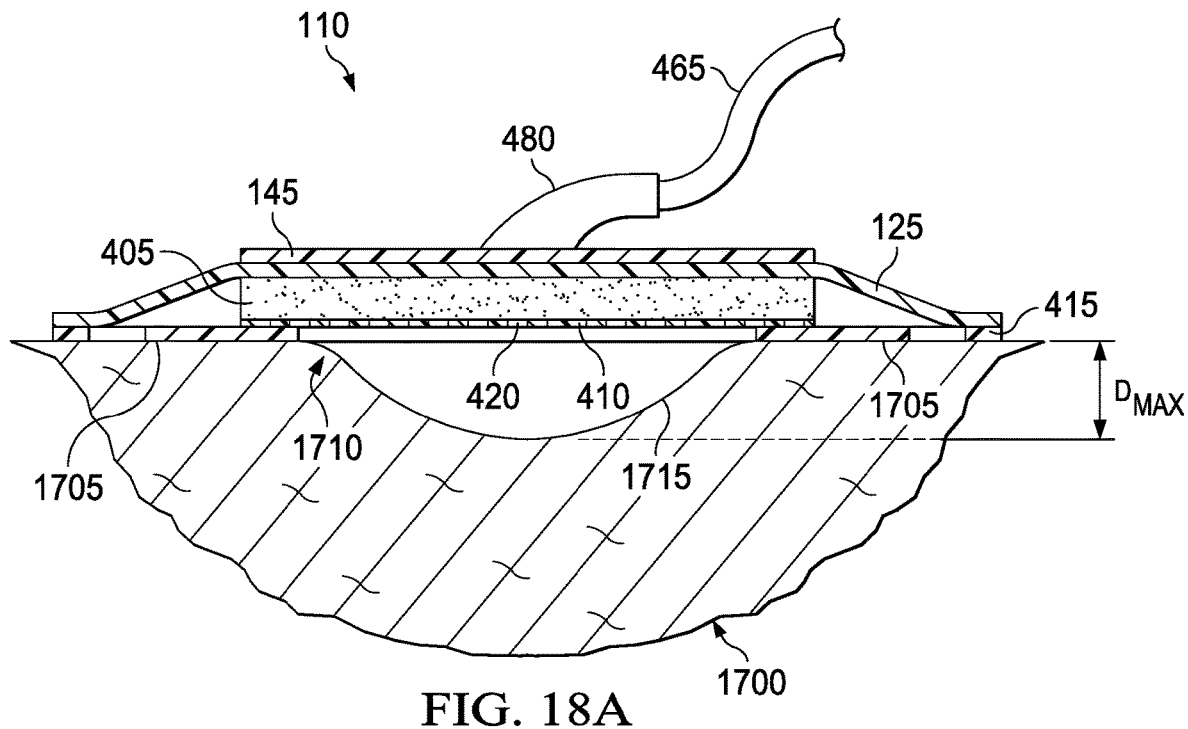
FIG. 18A is a schematic view of another example of a dressing including a sensor coupled to a tissue site prior to the application of negative pressure, illustrating additional details that may be associated with some embodiments.

FIG. 18A, FIG. 18B, FIG. 18C, and FIG. 18D are schematic views of an example of the dressing 110 coupled to a tissue site 1700, illustrating additional details that may be associated with some embodiments. FIG. 18A shows the dressing 110 applied over the tissue site 1700 before the application of negative pressure. The dressing 110 may be positioned with respect to the tissue site 1700, so that the third layer 415 may be placed within, over, on, or otherwise proximate to the tissue site 1700, particularly the wound 1715 and adjacent epidermis of the periwound 1705. The second layer 410, the third layer 415, or both may be interposed between the first layer 405 and the tissue site, which can substantially reduce or eliminate adverse interaction between the first layer 405 and the tissue site. For example, the third layer 415 may be placed over the wound 1715 (including the wound edge 1710) and undamaged epidermis to prevent direct contact with the first layer 405. The sensor 145 may also be coupled to the dressing 110 and, in some embodiments, the sensor 145 may extend across the wound 1715. When the dressing 110 is first applied to the tissue site 1700 the depth ($D_{MAX}$) of the wound 1715 may be at its greatest. As the wound 1715 heals, the depth of the wound 1715 will decrease. Once the wound 1715 completely heals, the depth of the wound 1715 will be zero or nearly zero.

Prior to the dressing 110 being pulled into the tissue site, the strain in the dressing 110 may be measured by the sensor 145. For example, if the sensor 145 is an EAP sensor, the capacitance of the EAP sensor may be converted to the strain in the dressing 110. Because the sensor 145 is coupled to the dressing 110, any stretching of the dressing 110 may be transmitted to the sensor 145. Therefore, the sensor 145 may be used to measure the stretch or strain of the sensing element 500 and the dressing 110 to which the sensing element 500 is coupled. The measured strain may be set as a baseline strain that may approximate the strain in the dressing 110 when the wound 1715 has healed.

Figure 18B:
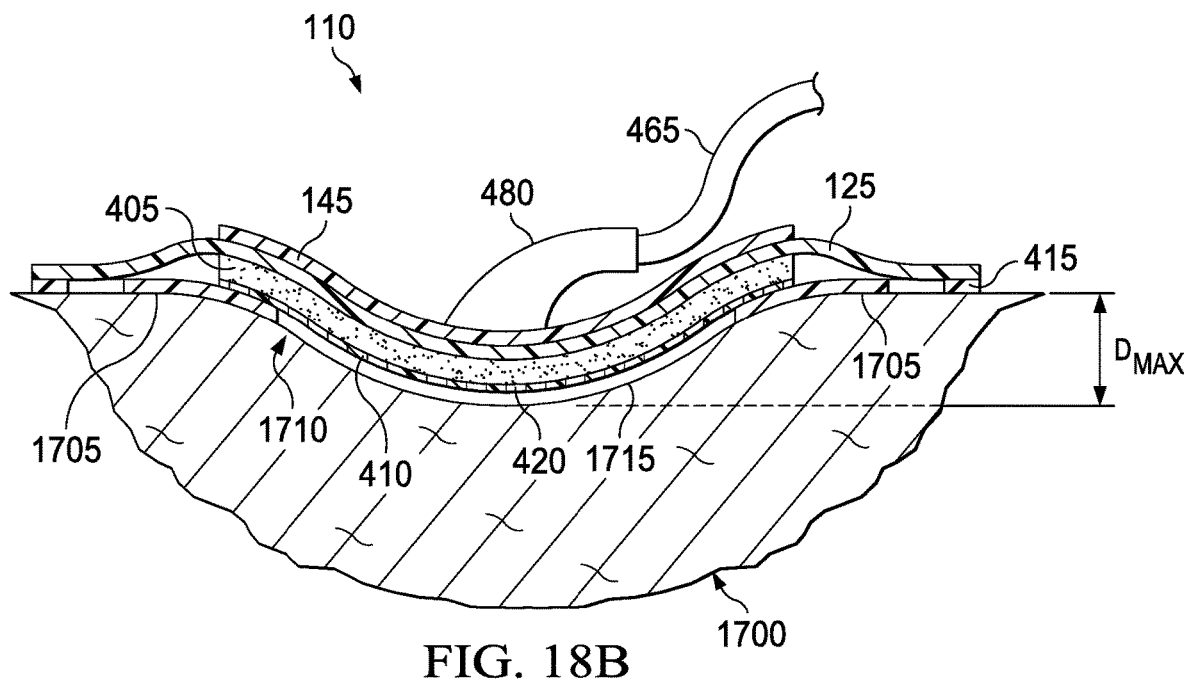
FIG. 18B is a schematic view of another example of a dressing including a sensor coupled to a tissue site after to the application of negative pressure, illustrating additional details that may be associated with some embodiments.

FIG. 18B is a schematic view of the dressing 110 and the tissue site 1700 of FIG. 18A when the dressing 110 is drawn down to the wound 1715 under the application of negative pressure. As the dressing 110 is evacuated of air, the dressing 110 is pushed into the wound 1715 by atmospheric pressure as the tissue site 1700 pushes up to meet the dressing 110. The fluid restrictions 420 open in the area of the wound 1715 and may manifold negative pressure to the wound 1715. The application of negative pressure may induce a strain in the dressing 110, which can be measured by the sensor 145. Once the baseline strain measurement is taken, negative pressure may be applied to the tissue site 1700 and the dressing 110 may be pulled into the wound 1715 and may conform to the shape of the tissue site 1700. During this process, the strain in the dressing 110 may be repeatedly measured by the sensor 145 to determine the relative depth of the wound 1715, as well as to determine whether the sensor 145 is functioning properly. When the target negative pressure at the tissue site 1700 is achieved and a steady-state negative pressure is achieved, the strain in the sensor 145 may again be periodically measured. The amount of measured strain in the dressing 110 can be correlated to the depth of the tissue site 1700. For example, this measured strain can be set as the maximum wound depth ($D_{MAX}$). In some embodiments, the strain measurements may be taken and averaged over a period of time, such as, for example, about 5 minutes. The baseline strain and the maximum strain may be set as the two calibration reference points for the system. After these two calibration points are known and set, the depth and rate and progress of healing of the wound 1715 can be tracked by measuring the strain in the dressing 110 by the sensor 145. Although patient movement may affect the measured strain, in some embodiments, measurements using the sensor 145 may be collected on a repeated basis (e.g., about every one minute, about every five minutes) during the negative-pressure therapy and then averaged over time to achieve an average strain measurement. The trend of the strain data may then be observed to monitor healing of the wound 1715.

Figure 18C:
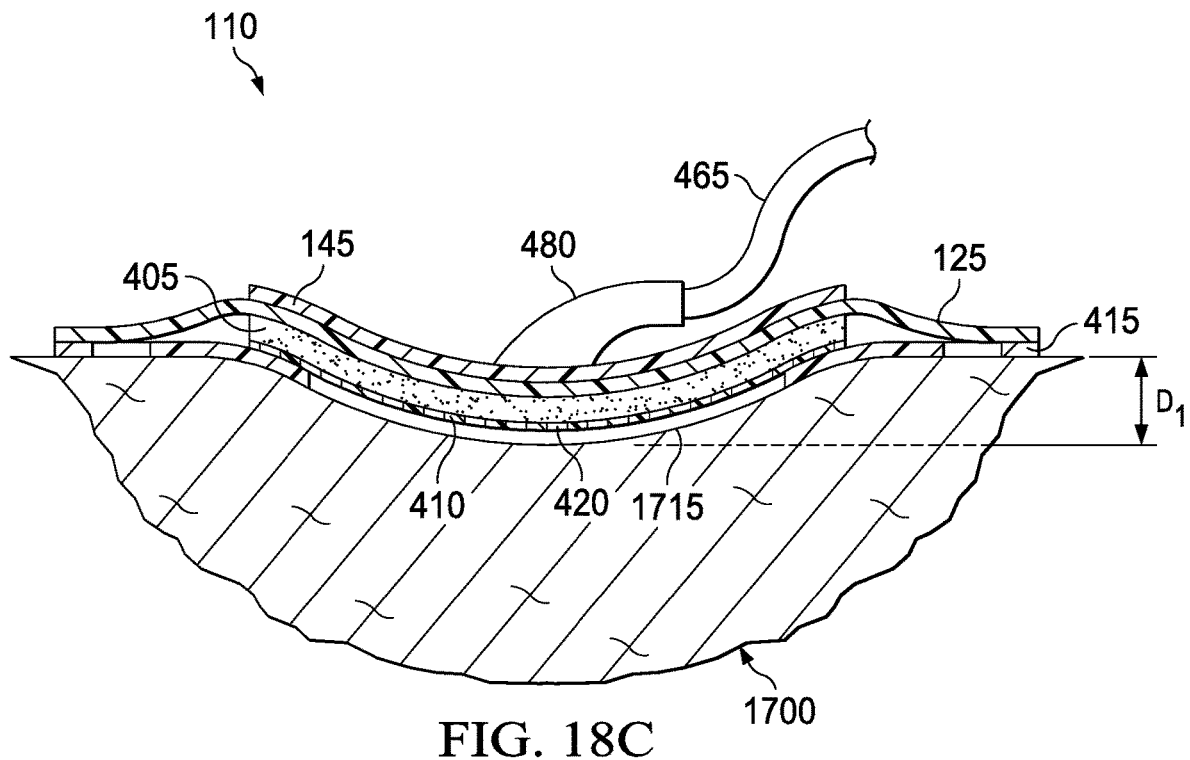
FIG. 18C is a schematic view of another example of a dressing including a sensor coupled to a tissue site during the application of negative pressure, illustrating additional details that may be associated with some embodiments.

FIG. 18C is a schematic view of the dressing 110 and the tissue site 1700 of FIG. 18A after negative pressure has been applied to the tissue site 1700 for a period of time. The depth ($D_1$) of the wound 1715 has decreased as the wound 1715 has healed ($D_1 < D_{MAX}$). For example, after about 4 to 7 days, the tissue site 1700 has filled and the dressing 110 has been displaced upward by granulation tissue, which results in less stretching of the dressing 110 and less stretching of the sensor 145. At this point, the strain in the dressing 110 measured by the sensor 145 is reduced. This reduced strain measurement indicates healing of the tissue site 1700.

Figure 18D:
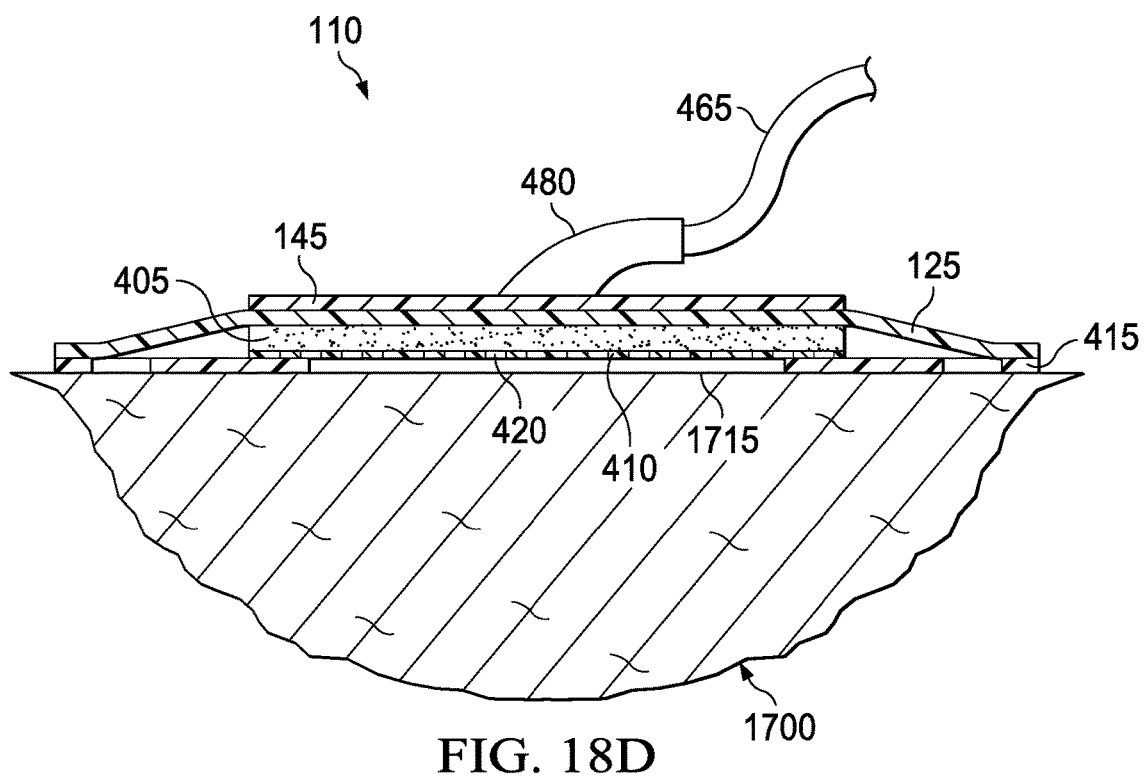
FIG. 18D is a schematic view of another example of a dressing including a sensor coupled to a tissue site following the application of negative pressure, illustrating additional details that may be associated with some embodiments.

FIG. 18D is a schematic view of the dressing 110 and the tissue site 1700 of FIG. 18A when the wound 1715 has fully healed. As shown in FIG. 18D, the wound 1715 has filled with granulation tissue and the dressing 110 and sensor 145 return to at or near their baseline positions. Accordingly, the strain in the dressing 110 measured by the sensor 145 may be at or near the baseline strain measured prior to the application of negative pressure, indicating that the wound 1715 has healed.

Figure 19A:
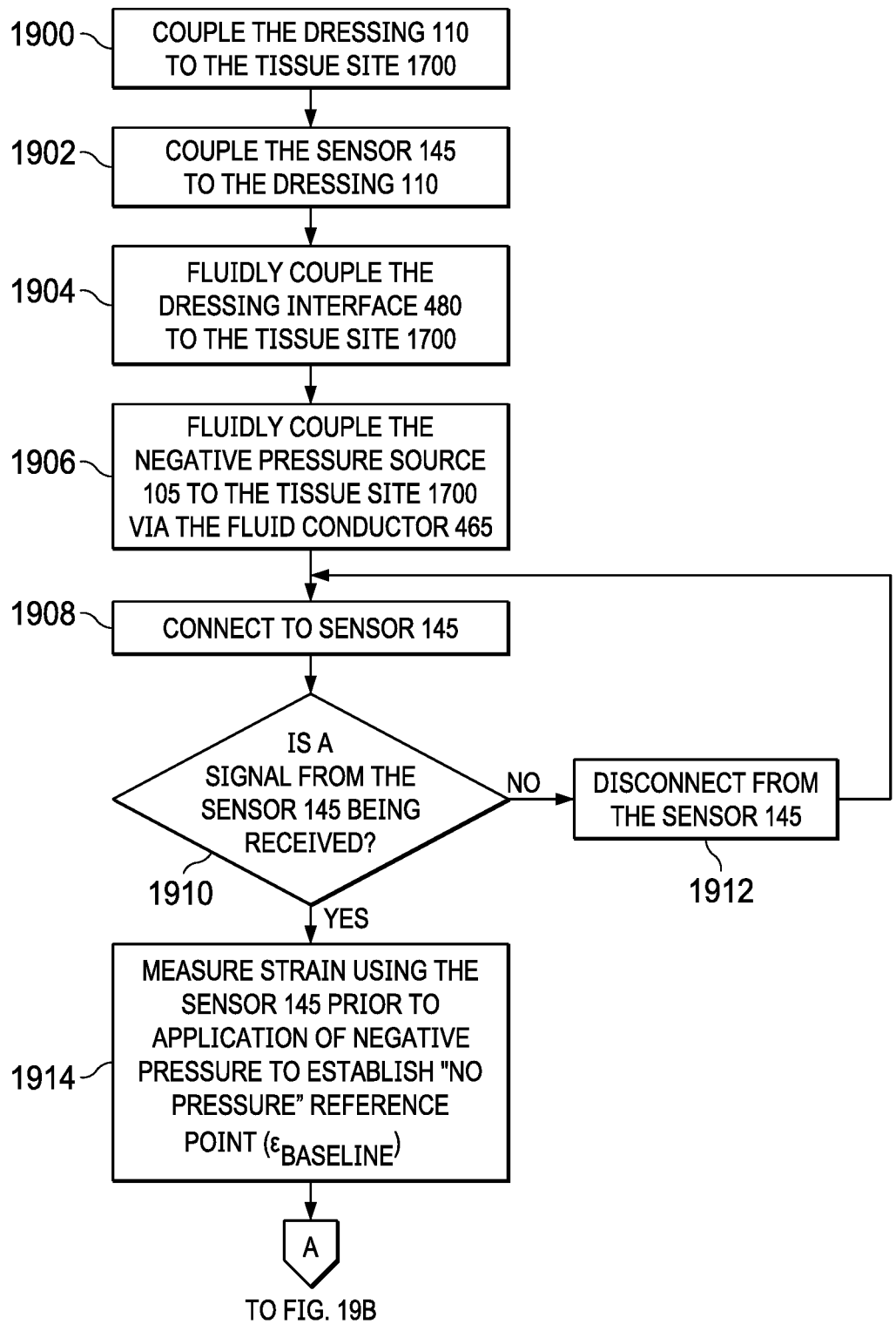
FIG. 19A, FIG. 19B, and FIG. 19C are flowcharts of an example method of treating a tissue site with negative pressure, illustrating additional details that may be associated with some embodiments.
Figure 19B:
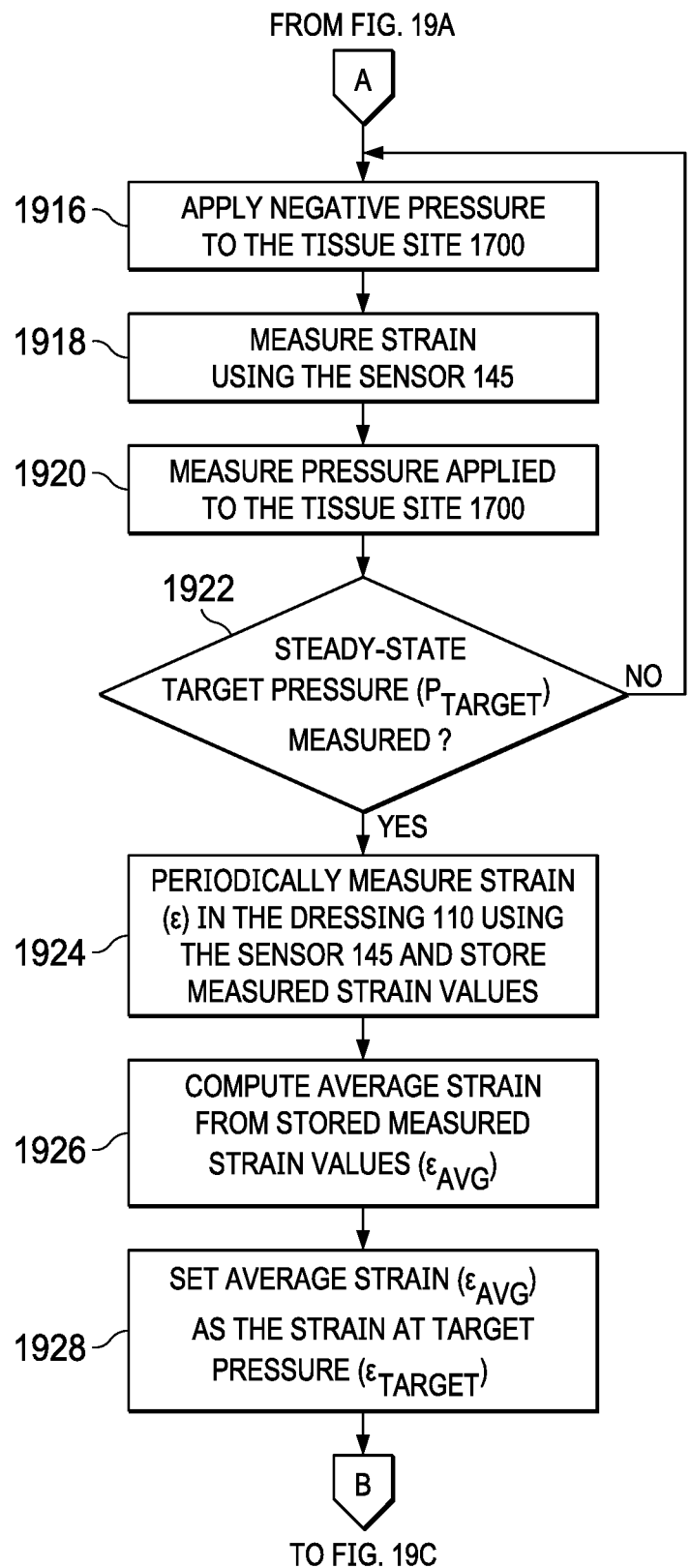
Figure 19C:
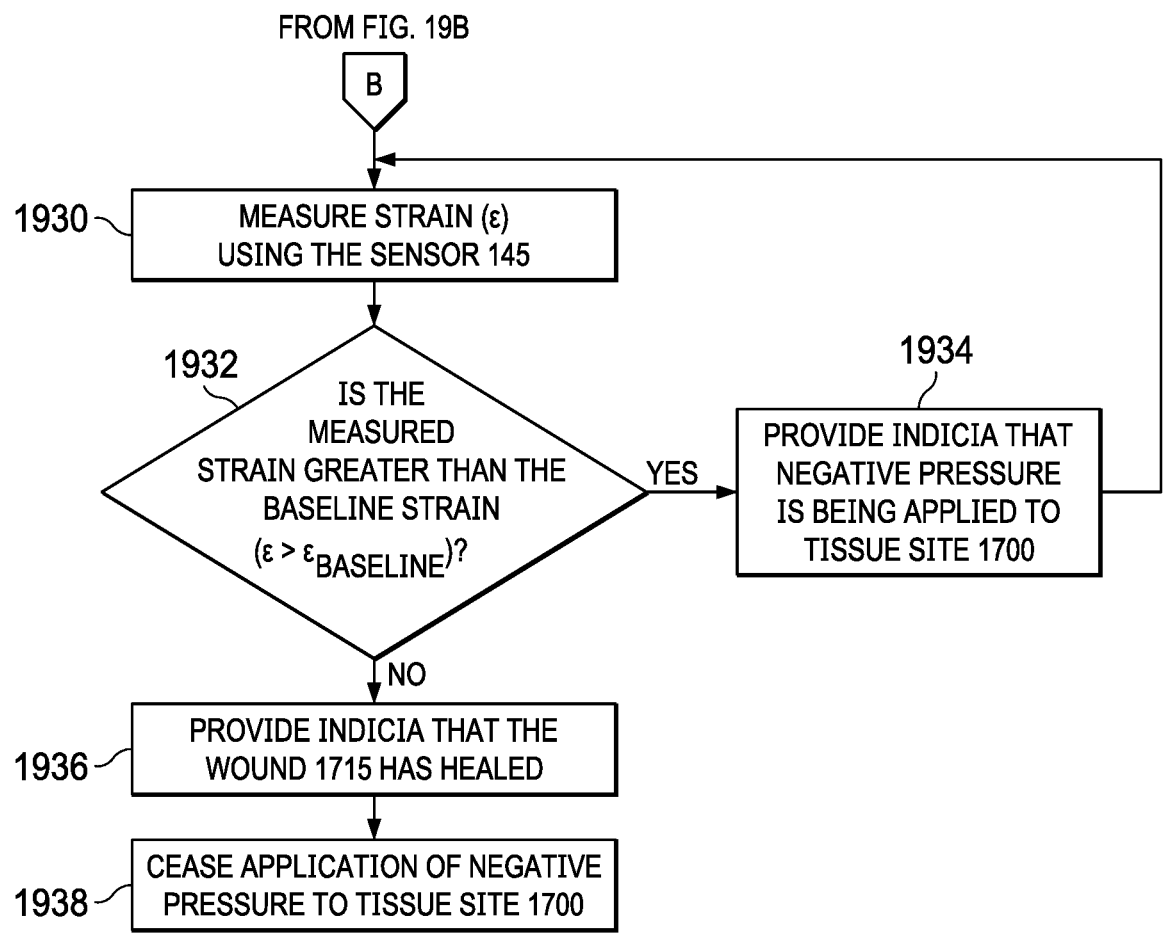

FIG. 19A, FIG. 19B, and FIG. 19C are flowcharts of an example of a method of treating the tissue site 1700 with negative pressure, illustrating additional details that may be associated with some embodiments. As shown in FIG. 19A, at step 1900 the dressing 110 is coupled to the tissue site 1700. In embodiments where the sensor 145 is not integral to the dressing 110, at step 1902, the sensor 145 may be coupled to the dressing 110. At step 1904, the dressing interface 480 may be coupled to the dressing 110 and is fluidly coupled to the tissue site 1700. At step 1906, the negative-pressure source 105 is fluidly coupled to the tissue site 1700 via the fluid conductor 465. At step 1908, the controller 130 is connected to the sensor 145 to establish communication with the sensor 145. At step 1910, the controller 130 determines whether it is receiving a signal from the sensor 145. If no signal is being received from the sensor 145, at step 1912, the controller 130 may disconnect from the sensor 145. The controller 130 may reconnect to the sensor 145 at step 1908. In some embodiments, if no signal is received from the sensor 145 after a predetermined number of cycles of steps 1910, 1912, and 1908, the controller 130 may indicate an error and may not apply negative pressure. However, if at step 1910 a signal is being received from the sensor 145, then at step 1914, the strain in the dressing 110 is measured using the sensor 145 prior to the application of negative pressure to establish the baseline strain ($\varepsilon_{baseline}$) reference point. The baseline strain ($\varepsilon_{baseline}$) may approximate the strain in the dressing 110 when the wound 1715 has healed. After step 1914, the method continues as shown in FIG. 19B.

Referring now to FIG. 19B, at step 1916, negative pressure is applied to the tissue site 1700 by negative-pressure source 105. At step 1918, the strain in the dressing 110 is measured using the sensor 145. In some embodiments, the strain in the dressing 110 may be measured repeatedly or continuously to determine the relative size of the tissue site 1700 and/or to ensure that the sensor 145 is functioning properly. At step 1920, the negative pressure applied to the tissue site 1700 may be measured. In some embodiments, the negative pressure applied to the tissue site 1700 may be measured by the sensor 135. In some embodiments, the negative pressure applied to the tissue site 1700 may be measured by the pressure sensor 1005 in the dressing interface 480. Negative pressure is applied (step 1916), the strain in the dressing 110 is measured (step 1918), and the negative pressure applied to the tissue site 1700 is measured (step 1920) until a steady-state target negative pressure ($P_{target}$) is measured at step 1922. In some embodiments, the steady-state target negative pressure ($P_{target}$) may be about −125 mmHg.

Once the steady-state target negative pressure ($P_{target}$) is reached, at step 1924, the strain ($\varepsilon$) in the dressing 110 may be periodically measured using the sensor 145 and the measured strain may be stored in memory. In some embodiments, for example, the strain measurements may be taken every second for a duration of 5 minutes. At step 1926, an average strain value ($\varepsilon_{avg}$) is computed. At step 1928, the average strain value ($\varepsilon_{avg}$) may be set as the target strain ($\varepsilon_{target}$) at the target negative pressure ($P_{target}$). The target strain ($\varepsilon_{target}$) set at step 1928 and the baseline strain ($\varepsilon_{baseline}$) set at step 1914 represent two calibration reference points for the therapy system 100. After step 1928, the method continues as shown in FIG. 19C.

Referring now to FIG. 19C, at step 1930, the strain ($\varepsilon$) in the dressing 110 is measured using the sensor 145 throughout the duration of negative-pressure therapy. At step 1932, the measured strain ($\varepsilon$) is compared to the baseline strain ($\varepsilon_{baseline}$) to determine whether the measured strain ($\varepsilon$) is greater than the baseline strain ($\varepsilon_{baseline}$). In some embodiments, the measured strain ($\varepsilon$) may be a historical average strain ($\varepsilon_{avg}$). For example, the controller 130 may compute the historical average strain ($\varepsilon_{avg}$) of the strain measurements gathered over a period of time preceding step 1932. In some embodiments, the period of time may be about 1 minute. In some embodiments, the period of time may be about 5 minutes. In some embodiments, the period of time may be about 10 minutes. In some embodiments, the period of time may be about 15 minutes. In some embodiments, a desired period of time may be specified over which the historical average strain ($\varepsilon_{avg}$) is calculated. Utilizing the historical average strain ($\varepsilon_{avg}$) in the determination at step 1932 may reduce or eliminate false positives. In some embodiments, the measured strain ($\varepsilon$) may be the historical average strain ($\varepsilon_{avg}$). In some embodiments the measured strain ($\varepsilon$) may be considered to be equal to the baseline strain ($\varepsilon_{baseline}$) within a tolerance of the set baseline strain ($\varepsilon_{baseline}$). For example, in some embodiments, the measured strain ($\varepsilon$) may be considered equal to the baseline strain ($\varepsilon_{baseline}$) if the measured strain ($\varepsilon$) is within +/−1% of the baseline strain ($\varepsilon_{baseline}$). In some embodiments, the measured strain ($\varepsilon$) may be considered equal to the baseline strain ($\varepsilon_{baseline}$) if the measured strain ($\varepsilon$) is within +/−5% of the baseline strain ($\varepsilon_{baseline}$). In some embodiments, the measured strain ($\varepsilon$) may be considered equal to the baseline strain ($\varepsilon_{baseline}$) if the measured strain ($\varepsilon$) is within +/−10% of the baseline strain ($\varepsilon_{baseline}$). In some embodiments, any desired baseline strain ($\varepsilon_{baseline}$) tolerance may be specified. In some embodiments, both the historical average strain ($\varepsilon_{avg}$) and a baseline strain ($\varepsilon_{baseline}$) tolerance may be used in making the determination at step 1932. If the measured strain ($\varepsilon$) is greater than the baseline strain ($\varepsilon_{baseline}$), then at step 1934, the therapy system 100 provides a visual and/or audio indicia that negative pressure is being applied to the tissue site 1700. The method then returns to step 1930.

If at step 1932, the measured strain ($\varepsilon$) is not greater than the baseline strain ($\varepsilon_{baseline}$), then at step 1936, the therapy system 100 may provide a visual and/or audio indicia that the wound 1715 has healed. Additionally, in some embodiments, the application of negative-pressure to the tissue site 1700 may then be ceased at step 1938. In some embodiments, the controller 130 may be programmed to turn off the negative-pressure source 105 to cease the application of negative pressure at step 1938. In some embodiments, the controller 130 may provide a visual and/or audio indicia to the user to cease the application of negative pressure at step 1938. However, if at step 1936, the measured strain is not equal to the baseline strain ($\varepsilon_{baseline}$), negative-pressure may be continued to be applied to the tissue site 1700 and process returns to step 1930.

FIG. 20 is a table associated with an example method of determining the presence of blockages or leaks in various components of the therapy system 100, illustrating additional details that may be associated with some embodiments. In embodiments of the therapy system 100 wherein the fluid conductor 465 includes the primary lumen 470 and an ancillary lumen 475, the dressing interface 480 includes the primary conduit 1205 and one or more ancillary conduits 1210, 1215, and the negative pressure applied to the tissue site can be measured via the ancillary lumen 475 and ancillary conduit 1210 or ancillary conduit 1215 by the sensor 135, blockages or leaks may be identified as shown in FIG. 20.

In Row 1, if the sensor 145 is measuring a lower strain in the dressing 110 following a rapid reduction in measured strain (e.g., a rapid reduction in measured strain from a higher strain to the lower strain, wherein the lower strain is less than the target strain ($\varepsilon_{target}$)), the pump duty of the negative-pressure source 105 is zero percent (0%) or very low, and the negative pressure measured by the sensor 135 is at or within an acceptable range of the target negative pressure ($P_{target}$), then there may be a blockage in one or more of the ancillary lumen 475, the ancillary conduit 1210, and the ancillary conduit 1215. The controller 130 may provide a visual and/or audio indicia that a blockage exists. The controller 130 may also provide a visual and/or audio indicia regarding the measured reduced strain, the pump duty, and/or the negative pressure. When there is a blockage in one or more of the ancillary lumen 475, the ancillary conduit 1210, and the ancillary conduit 1215, the sensor 135 is not measuring the negative pressure at the tissue site 1700. Thus, the pressure at the tissue site 1700 is not being accurately measured and may no longer be at the actual target negative pressure ($P_{target}$) Accordingly, the pressure measurement taken by the sensor 135 may be a false reading. Based on the false pressure measurement that the tissue site 1700 is at the target negative pressure ($P_{target}$), the controller 130 may not operate the pump of the negative-pressure source 105 or may operate the pump at a very low duty cycle, resulting in little or no negative pressure being supplied to the tissue site 1700. When the tissue interface 120 is no longer subjected to negative pressure, it may expand. The sensor 145 however, may serve as a check on this process. Measurements from the sensor 145 indicating a rapid reduction in the strain of the dressing 110 may be the result of the tissue interface 120 expanding from its deflated state. For example, the strain in the dressing 110 may rapidly reduce from a higher strain to a lower strain that is equal the baseline strain ($\varepsilon_{baseline}$). In another example, the strain in the dressing 110 may rapidly reduce from a higher strain to a lower strain that is still greater than the baseline strain ($\varepsilon_{baseline}$). That is, in some embodiments, the strain may not always rapidly reduce all the way to the baseline strain ($\varepsilon_{baseline}$). In some embodiments, the rapid reduction in strain may occur in thirty minutes or less. In some embodiments, the rapid reduction in strain may occur in an hour or less.

In Row 2, if the sensor 145 is measuring a lower strain in the dressing 110 following a rapid reduction in measured strain (e.g., a rapid reduction in measured strain from a higher strain to the lower strain, wherein the lower strain is less than the target strain ($\varepsilon_{target}$)), the pump duty of the negative-pressure source 105 is zero percent (0%) or very low, and the negative pressure measured by the sensor 135 is at or within an acceptable range of atmospheric pressure, then there may be a blockage in one or more of the primary lumen 470 of the fluid conductor 465 and the primary conduit 1205 of the dressing interface 480. The controller 130 may provide a visual and/or audio indicia that a blockage exists in one or more of the primary lumen 470 and the primary conduit 1205. When there is a blockage in one or more of the primary lumen 470 and the primary conduit 1205, negative pressure is not supplied to the tissue interface 120, causing the tissue interface 120 to expand, and the sensor 135 will then measure atmospheric pressure at the tissue site 1700.

In Row 3, if the sensor 145 is measuring a lower strain in the dressing 110 following a rapid reduction in measured strain (e.g., a rapid reduction in measured strain from a higher strain to the lower strain, wherein the lower strain is less than the target strain ($\varepsilon_{target}$)), the pump duty of the negative-pressure source 105 is high or 100 percent, and the negative pressure measured by the sensor 135 is at or within an acceptable range of atmospheric pressure, then there may be a leak in one or more components of the therapy system 100. The controller 130 may provide a visual and/or audio indicia that a leak exists in the therapy system 100. When there is a leak in the therapy system 100, the pump duty of the negative-pressure source 105 will be high or 100 percent as the controller 130 is trying to achieve the target negative pressure ($P_{target}$) Additionally, due to the leak, the sensor 135 may likely measure atmospheric pressure at the tissue site 1700. If there is a leak, the tissue interface 120 may expand from its deflated state. As the tissue interface 120 expands from its deflated state, there may be a reduction in the strain of the dressing. For example, the strain in the dressing 110 may rapidly reduce from a higher strain to a lower strain that is equal the baseline strain ($\varepsilon_{baseline}$). In another example, the strain in the dressing 110 may rapidly reduce from a higher strain to a lower strain that is still greater than the baseline strain ($\varepsilon_{baseline}$). That is, in some embodiments, the strain may not always rapidly reduce all the way to the baseline strain ($\varepsilon_{baseline}$). Depending on whether the leak is a gross leak or a gradual leak, the reduction in strain of the dressing 110 may be fast or slow. For example, where there is a gross leak, the rapid reduction in strain of the dressing 110 may occur in 5 minutes or less. For example, where there is a gradual leak, the rapid reduction in strain of the dressing 110 may occur in thirty minutes or less.

FIG. 21 is a table that may be associated with an example a method of determining the presence of blockages or leaks in various components of the therapy system 100, illustrating additional details that may be associated with some embodiments. In embodiments of the therapy system 100 wherein the fluid conductor 465 includes a primary lumen 470 but does not include any ancillary lumens 475 and the controller 130 cannot measure pressure at the tissue site 1700 by the sensor 135, blockages or leaks may be identified as shown in FIG. 21.

In Row 1, if the sensor 145 is measuring a lower strain in the dressing 110 following a rapid reduction in measured strain (e.g., a rapid reduction in measured strain from a higher strain to the lower strain, wherein the lower strain is less than the target strain ($\varepsilon_{target}$)) and the pump duty of the negative-pressure source 105 is zero percent (0%) or very low, then there may be a blockage in one or more of the primary lumen 470 of the fluid conductor 465 and the primary conduit 1205 of the dressing interface 480. The controller 130 may sound a blockage alarm and/or provide a visual and/or audio indicia that a blockage exists in one or more of the primary lumen 470 and the primary conduit 1205. When there is a blockage in one or more of the primary lumen 470 and the primary conduit 1205, negative pressure is not supplied to the tissue interface 120, causing the tissue interface 120 to expand, and the sensor 135 will then measure atmospheric pressure at the tissue site 1700.

In Row 2, if the sensor 145 is measuring a lower strain in the dressing 110 following a rapid reduction in measured strain (e.g., a rapid reduction in measured strain from a higher strain to the lower strain, wherein the lower strain is less than the target strain ($\varepsilon_{target}$)) and the pump duty of the negative-pressure source 105 is high or 100 percent, then there may be a leak in one or more components of the therapy system 100. The controller 130 may provide a visual and/or audio indicia that a leak exists in the therapy system 100.

In some embodiments, the sensor assembly 910 may function as a controller. The microprocessor of the first wireless communication module 950 may be able to operate one or more of the sensor 145, the pressure sensor 1005, the humidity sensor 1010, and the pH sensor 1015 independent of the controller 130. For example, the microprocessor of the first wireless communication module 950 may be programmed to power and receive signals from one or more of the sensor 145, the pressure sensor 1005, the humidity sensor 1010, and the pH sensor 1015 independent of the controller 130. For example, the microprocessor of the first wireless communication module 950 may perform some or all of the steps of the methods described in FIG. 19A, FIG. 19B, FIG. 19C, FIG. 20, and FIG. 21 independent of controller 130. For example, in some embodiments, the microprocessor of the first wireless communication module 950 may have sufficient processing ability to perform the reference calculations and receive the measurements from the sensor 145 to determine the state of the tissue site 1700. In some embodiments, the sensor assembly 910 may be controlled by an application running on the remote device 1320. In some embodiments, some or all of the data obtained by the sensor assembly 910 may be transmitted to the remote device 1320.

Figure 22:
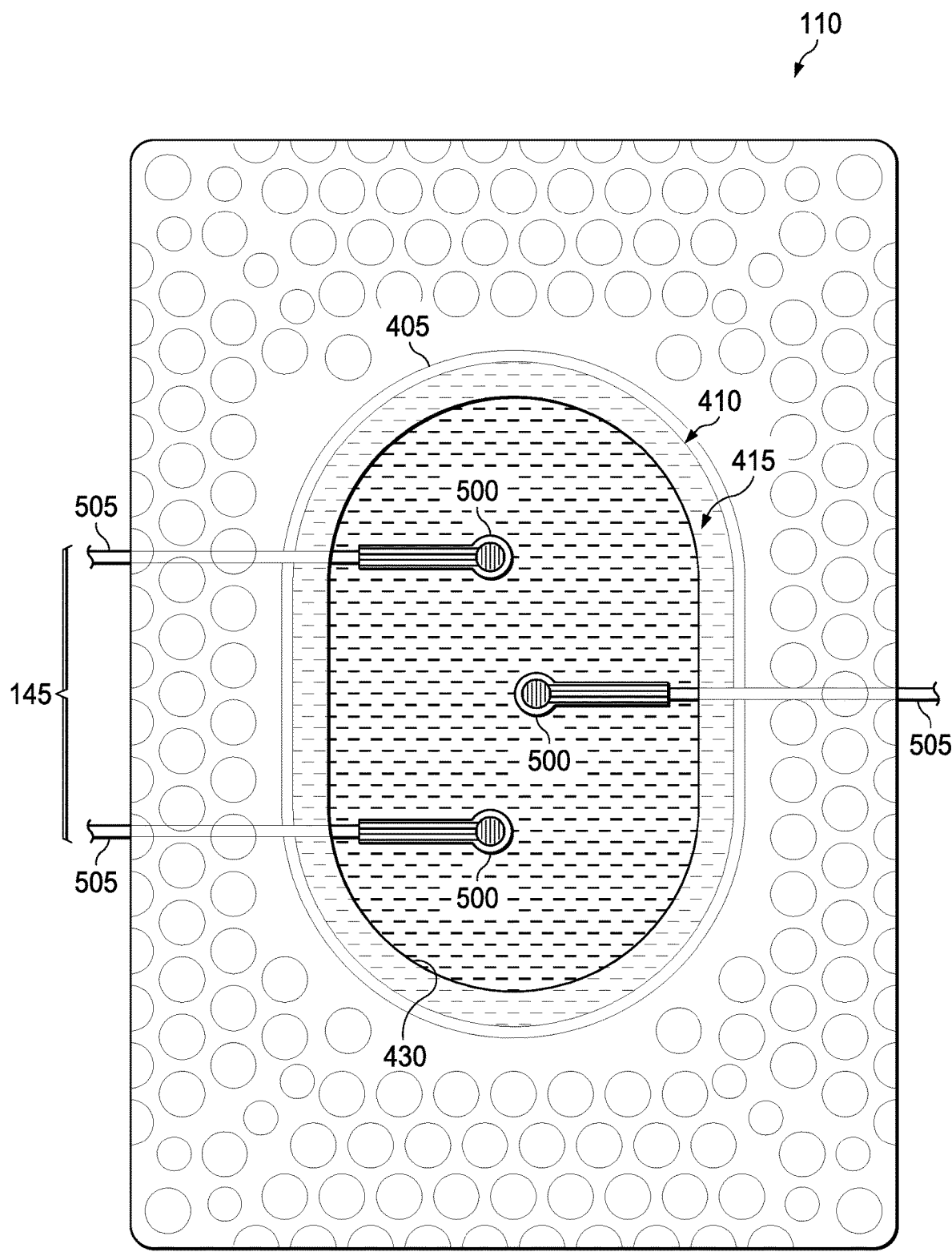
FIG. 22 is a bottom view of another example of a dressing including a sensor, illustrating additional details that may be associated with some embodiments.

FIG. 22 is a bottom view of another example of the dressing 110 including the sensor 145, illustrating additional details that may be associated with some embodiments. In some embodiments, the sensor 145 may comprise a plurality of sensing elements 500 coupled to the dressing 110. In some embodiments, the sensing elements 500 may be coupled to the second layer 410 opposite the first layer 405. In some embodiments, the sensing elements 500 may be configured to directly contact the tissue site 1700. The sensors 145 may be positioned in multiple locations across the face of the second layer 410 and within the treatment aperture 430 to measure physical phenomena or properties in the dressing 110 in multiple locations in the dressing 110. As shown in FIG. 22, the dressing 110 may include three sensing elements 500 arrayed over the first layer 405 within the treatment aperture 430. In some embodiments, the dressing 110 may include more than three sensing elements 500. In some embodiments, the dressing 110 may include less than three sensing elements 500. In some embodiments, the sensing elements 500 may comprise a strain gauge, such as, for example, a force sensitive resistor such as Type FSR149, Part No. SS-U-N-S-00001 available from I.E.E., having a >1M ohm to 1 k ohm range and a maximum applied pressure of 35 bar. In some embodiments, the strain gauge may have a length of about 36.1 mm and a width of about 7 mm. In some embodiments, the sensor leads 505 of each of the sensors 145 may be electrically coupled to the controller 130 (not shown). In some embodiments, the dressing 110 may be cut to fit the size and shape of the tissue site 1700. In such embodiments, the sensing elements 500 may be centrally located in the dressing 110 in an area where the user is instructed not to cut. In some embodiments, the controller 130 may be configured to identify when one or more of the sensing elements 500 have been cut by measuring an open or high resistance connection and the controller 130 may be able to isolate the cut sensing elements 500 from the measurements received by the controller 130 and any calculations made by the controller 130.

Figure 23:
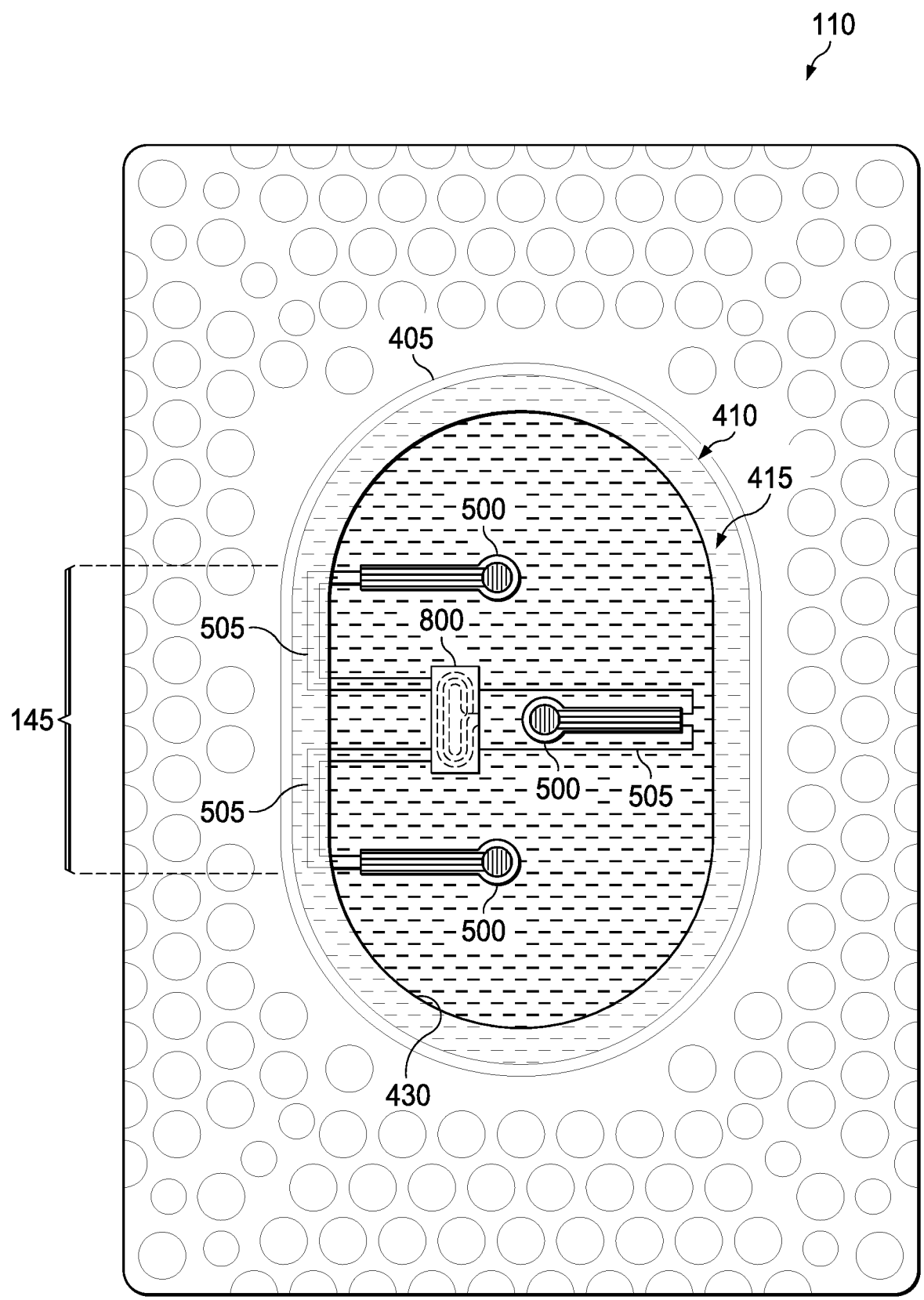
FIG. 23 is a bottom view of another example of a dressing including a sensor, illustrating additional details that may be associated with some embodiments.

FIG. 23 is a bottom view of another example of the dressing 110 including the sensor 145, illustrating additional details that may be associated with some embodiments. As shown in FIG. 23, the population of sensing elements 500 of the sensor 145 may be electrically coupled with the wireless communication module 800. In some embodiments, the population of sensing elements 500 may be electrically coupled to a single wireless communication module 800. In some embodiments, each sensing element 500 may be electrically coupled to its own corresponding wireless communication module 800. The measurements of the sensing elements 500 may be transmitted by the wireless communication module 800 to the controller 130 via the sensor assembly 910 (not shown).

Figure 24:
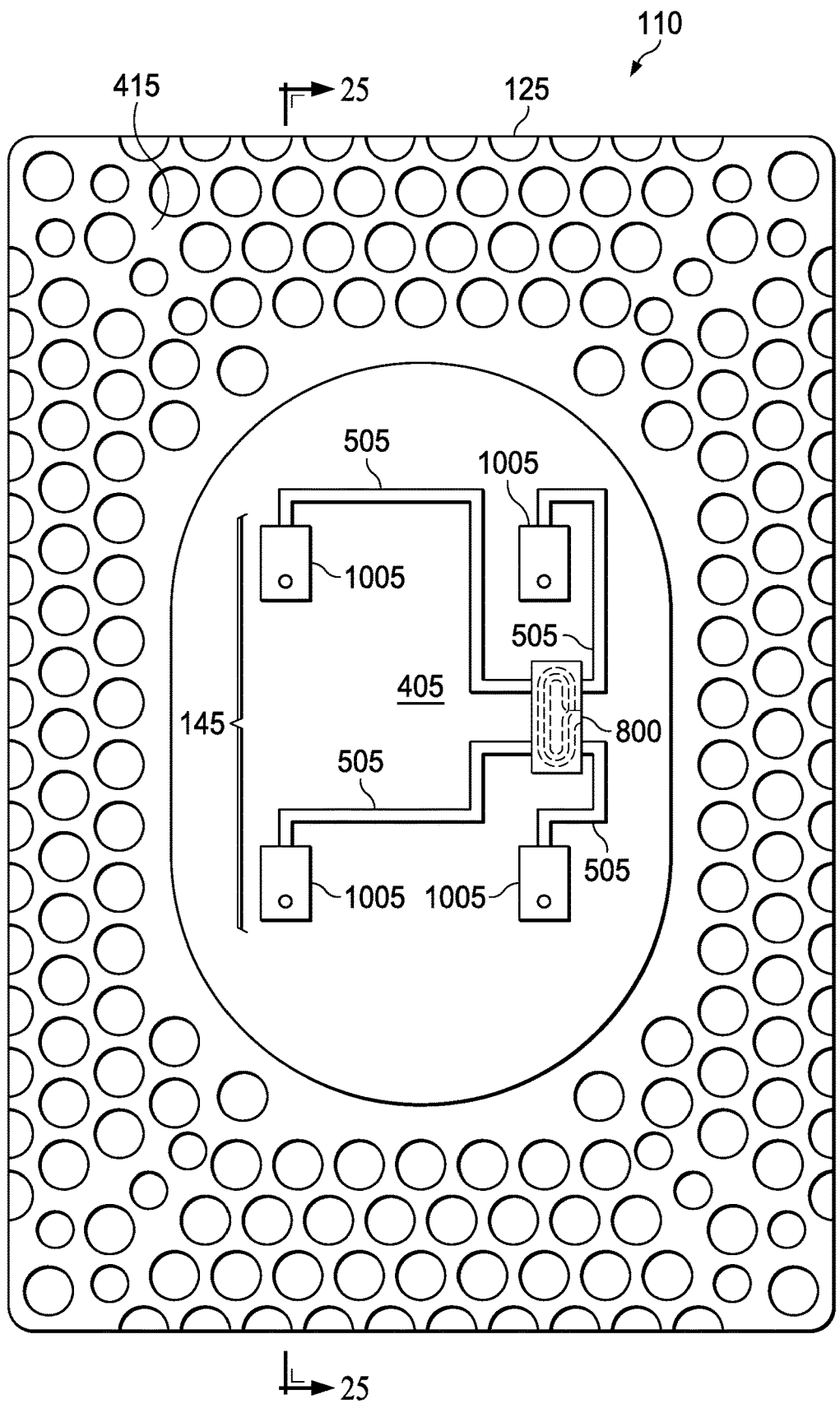
FIG. 24 is a bottom view of another example of a dressing including a sensor, illustrating additional details that may be associated with some embodiments.

FIG. 24 is a top view of another example of the dressing 110 including the sensor 145, illustrating additional details that may be associated with some embodiments. As shown in FIG. 24, in some embodiments, the sensor 145 may comprise a plurality of pressure sensors 1005 located in the dressing 110. The pressure sensors 1005 may be located in the first layer 405. The pressure sensors 1005 may be positioned in multiple locations across the first layer 405 to measure the negative pressure in multiple locations in the dressing 110. For example, the sensor 145 may include four pressure sensors 1005 arrayed in two rows and two columns in the first layer 405. In some embodiments, the sensor 145 may include less than four pressure sensors 1005. In some embodiments, the sensor 145 may include more than four pressure sensors 1005. The pressure sensors 1005 may be located in the first layer 405 in other patterns, such as, for example, a cross, a triangle, and a star. As further shown in FIG. 24, the pressure sensors 1005 may be electrically coupled with the wireless communication module 800 for wireless communication of the measured pressure to the controller 130 via the sensor assembly 910. In some embodiments, the population of pressure sensors 1005 may be electrically coupled to a single wireless communication module 800. In some embodiments, each pressure sensor 1005 may be electrically coupled to its own corresponding wireless communication module 800. In some embodiments, the population of pressure sensors 1005 may be electrically coupled via a wired connection to the therapy system 100/controller 130.

Figure 25:
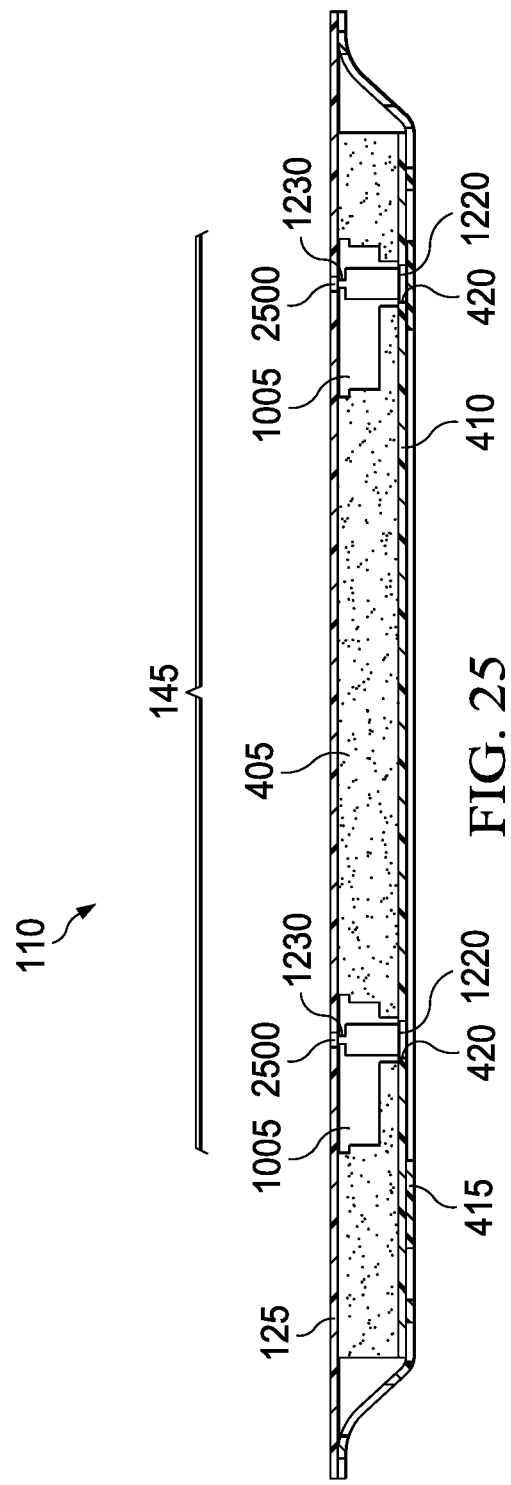
FIG. 25 is a section view of the dressing of FIG. 24 taken along line 25-25.

FIG. 25 is a section view of the dressing 110 of FIG. 24 taken along line 25-25. In some embodiments, each of the pressure sensors 1005 may be a piezo-resistive pressure sensor having a pressure sensing element covered by a dielectric gel such as, for example, a Model TE 1620 pressure sensor available from TE Connectivity. The dielectric gel provides electrical and fluid isolation from the blood and wound exudates in order to protect the sensing element from corrosion, fouling, or other degradation. This allows the pressure sensor 1005 to measure the negative pressure at the tissue site directly within the dressing 110. As shown in FIG. 25, the cover 125 of the dressing 110 may include an aperture 2500 in fluid communication with the vent hole 1230 to vent the pressure sensor 1005 to atmosphere. Additionally, the sensing element 1220 of the pressure sensor 1005 may be in fluid communication with one of the fluid restrictions 420 in the second layer 410. By placing the sensing element 1220 of the pressure sensor 1005 in fluid communication with the fluid restriction 420, the pressure sensor 1005 can directly measure the negative pressure delivered to the tissue site 1700. The pressure sensor 1005 may detect when the first layer 405 is becoming blocked with particulates or if the structure of the dressing 110 is degrading over time to create a greater pressure drop.

Figure 26:
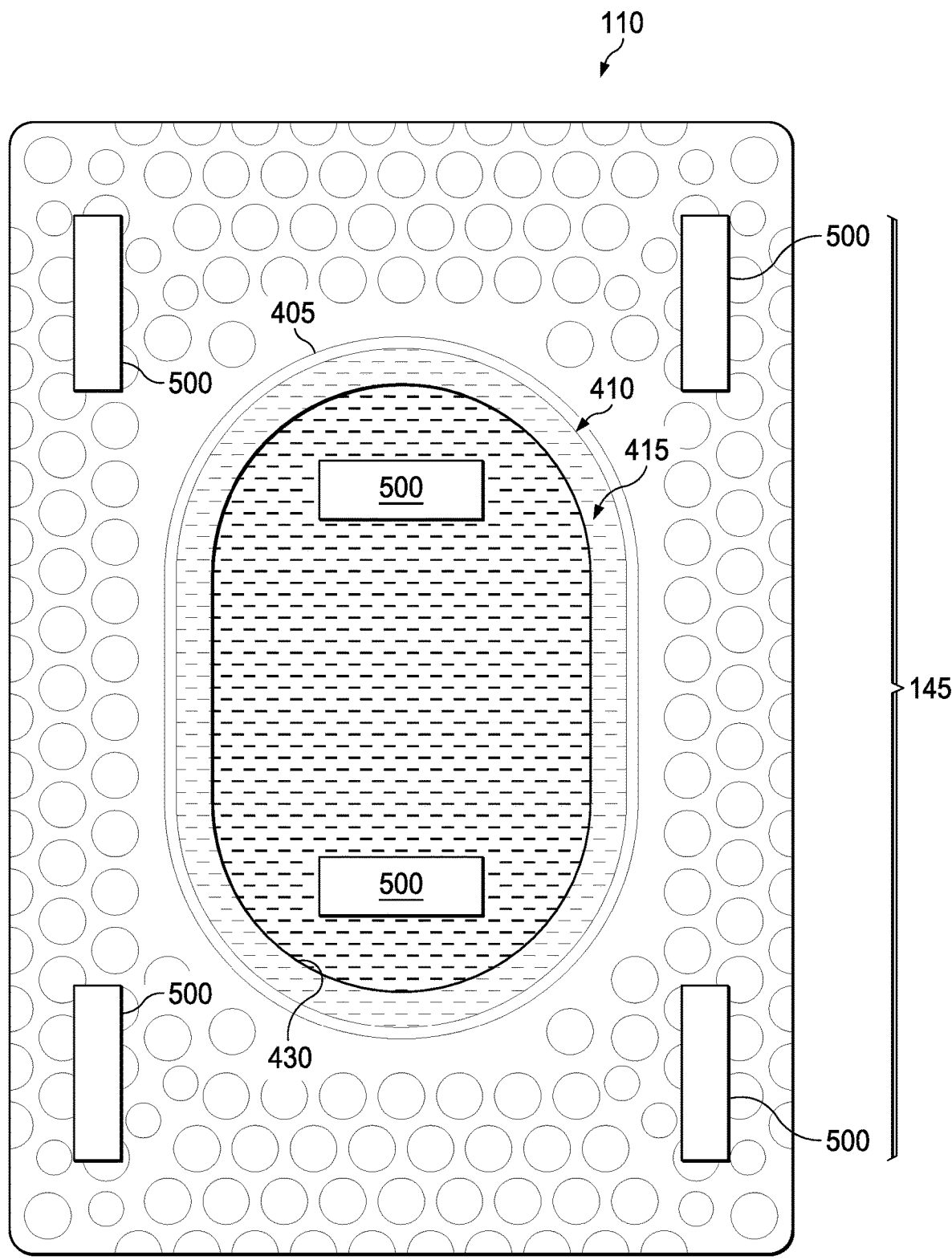
FIG. 26 is a bottom view of another example of a dressing including a sensor, illustrating additional details that may be associated with some embodiments.

FIG. 26 is a bottom view of another example of the dressing 110 including the sensor 145, illustrating additional details that may be associated with some embodiments. In some embodiments, one or more of the sensing elements 500 of the sensor 145 may comprise moisture sensors configured to measure the moisture content of the tissue site 1700. For example, one or more of the sensing elements 500 may comprise the RFM2120 or RFM2121 wireless flexible moisture sensor commercially available from Axzon (formerly RFMicron) of Austin, TX. In some embodiments where the sensing elements 500 comprise moisture sensors, the sensing elements 500 may be positioned in multiple locations across the face of the third layer 415. As shown in FIG. 26, in some embodiments, the sensing elements 500 may be positioned in multiple locations across the face of the second layer 410 and the face of the third layer 415 to measure moisture of the wound 1715 and the periwound 1705. In some embodiments, the sensor 145 may comprise sensing elements 500 positioned in multiple locations across the face of the second layer 410 to measure moisture of the wound 1715. In some embodiments, the sensing elements 500 may be positioned in multiple locations across the face of the third layer 415 to measure moisture of the periwound 1705. In some embodiments, each of the sensing elements 500 may communicate wirelessly with a RAIN/UHF compliant reader, which, in some embodiments, may be incorporated into the controller 130. In some embodiments, each of the sensing elements 500 may be coupled to a wireless communications module 800 (not shown).

Figure 27A:
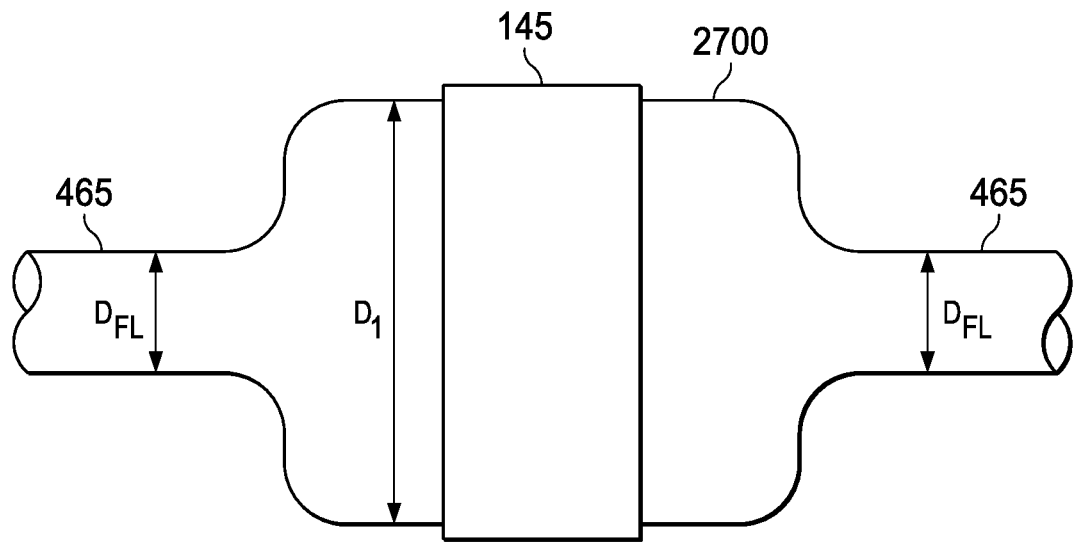
FIG. 27A is a side view of another example of a sensor coupled to an example of a fluid conductor prior to the application of negative pressure, illustrating additional details that may be associated with some embodiments.
Figure 27B:
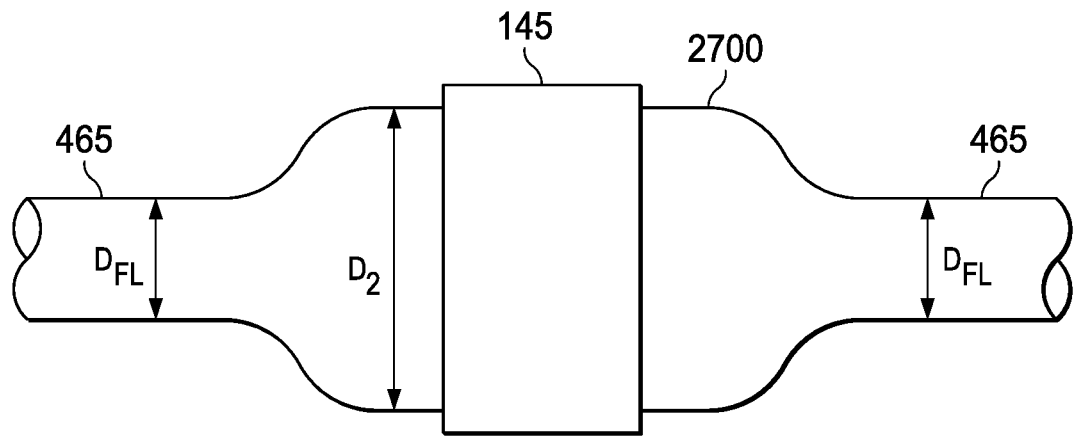
FIG. 27B is a side view of the sensor and fluid conductor of FIG. 27A after the application of negative pressure, illustrating additional details that may be associated with some embodiments.

FIG. 27A and FIG. 27B are side views of another example of the sensor 145 coupled to an example of the fluid conductor 465, illustrating additional details that may be associated with some embodiments. As shown in FIG. 27A, the fluid conductor 465 may include a chamber 2700 that has a first diameter ($D_1$) when the pressure inside the fluid conductor 465 is equal to the atmospheric pressure. This chamber 2700 may be flexible and may be configured to contract radially inward under the application of negative pressure. The sensor 145, which may be an EAP sensor, may at least partially circumscribe the chamber 2700. The first diameter ($D_1$) may be larger than the diameter ($D_{FL}$) of the remainder of the fluid conductor 465. As shown in FIG. 27B, when negative pressure is applied through the fluid conductor 465, the chamber 2700 contracts and the diameter decreases to a second diameter ($D_2$) less than the first diameter ($D_1$) ($D_2 < D_1$). The sensor 145 likewise contracts and a strain may be measured using the sensor 145. The measured strain may be used to monitor the application of negative pressure. In some embodiments, the amount of measured strain may be correlated to the amount of negative pressure supplied through the fluid conductor 465.

Figure 28A:
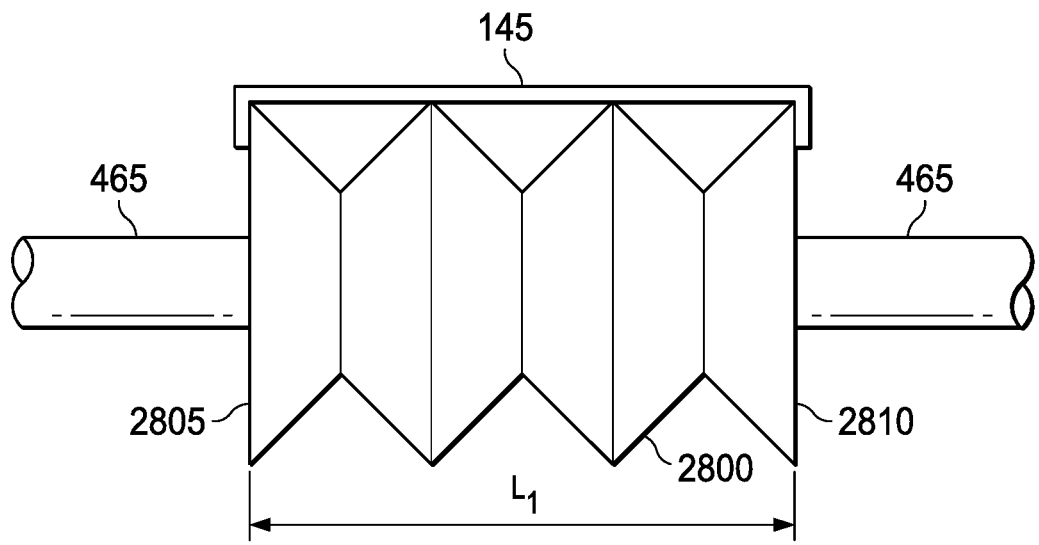
FIG. 28A is a side view of another example of a sensor coupled to an example of a fluid conductor prior to the application of negative pressure, illustrating additional details that may be associated with some embodiments.
Figure 28B:
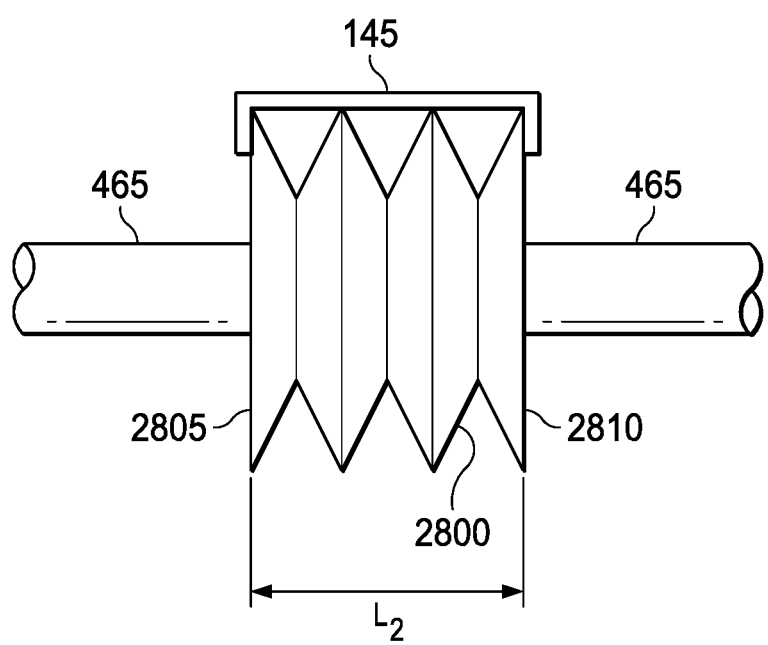
FIG. 28B is a side view of the sensor and fluid conductor of FIG. 28A after the application of negative pressure, illustrating additional details that may be associated with some embodiments.

FIG. 28A and FIG. 28B are side views of another example of the sensor 145 coupled to another example of the fluid conductor 465, illustrating additional details that may be associated with some embodiments. As shown in FIG. 27A, the fluid conductor 465 may include a chamber having flexible sides, such as a bellows 2800 with concertinaed sides. The bellows 2800 may have a first end 2805 and a second end 2810. The bellows 2800 may be configured to have a first length ($L_1$) when the pressure inside the fluid conductor 465 is equal to the atmospheric pressure. The bellows 2800 may be in an expended state when the pressure inside the fluid conductor 465 is equal to the atmospheric pressure. The sensor 145, which may be an EAP sensor, may be coupled to the bellows 2800 and may extend from the first end 2805 of the bellows 2800 to the second end 2810 of the bellows 2800. The sensor 145 may be configured to be in a stretched state when the pressure inside the fluid conductor 465 is equal to the atmospheric pressure. As shown in FIG. 28B, when negative pressure is applied through the fluid conductor 465, the bellows 2800 contracts axially and the length decreases to a second length ($L_2$) less than the first length ($L_1$) ($L_2 < L_1$). The sensor 145 likewise contracts and a strain may be measured using the sensor 145. The measured strain may be used to monitor the application of negative pressure. In some embodiments, the amount of measured strain may be correlated to the amount of negative pressure supplied through the fluid conductor 465.

Figure 29A:
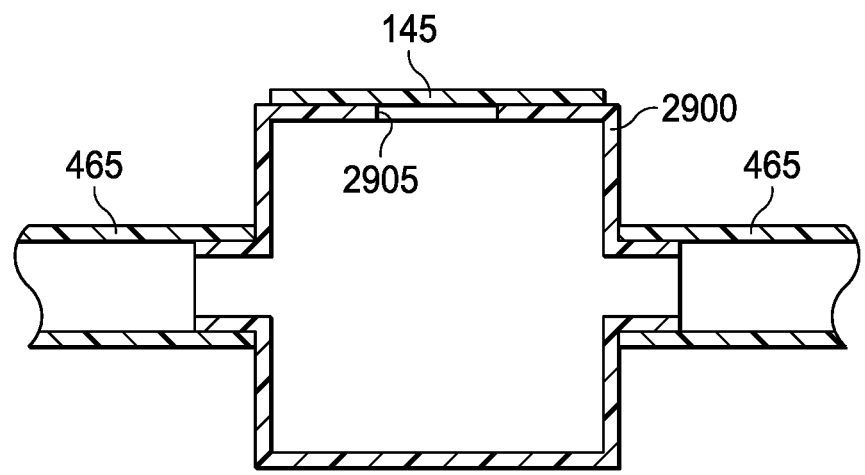
FIG. 29A is a section view of another example of a sensor coupled to an example of a fluid conductor prior to the application of negative pressure, illustrating additional details that may be associated with some embodiments.
Figure 29B:
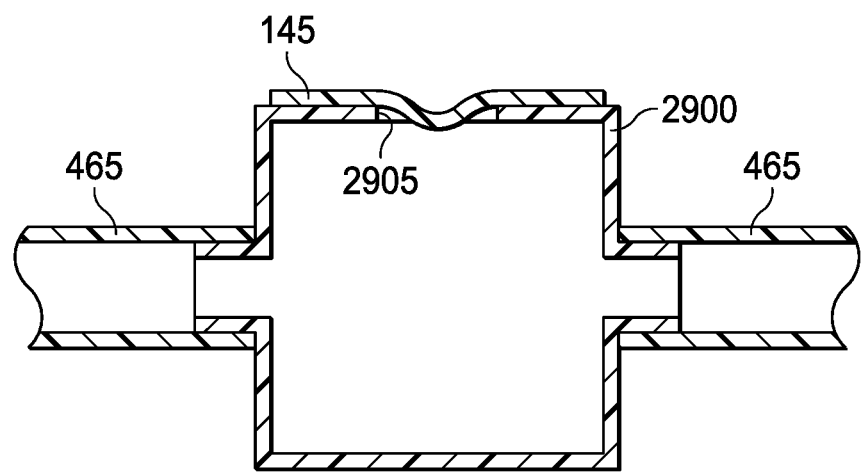
FIG. 29B is a section view of the sensor and fluid conductor of FIG. 29A after the application of negative pressure, illustrating additional details that may be associated with some embodiments.

FIG. 29A and FIG. 29B are section views of another example of the sensor 145 coupled to another example of the fluid conductor 465, illustrating additional details that may be associated with some embodiments. As shown in FIG. 27A, a chamber, such as a rigid box 2900 may be coupled in line with the fluid conductor 465. The box 2900 may be substantially rigid such that it does not collapse under the application of negative pressure. The box may include an aperture 2905. The sensor 145, which may be an EAP sensor, may be coupled to the box 2900 and seals the aperture 2905. As shown in FIG. 29B, when negative pressure is applied through the fluid conductor 465, at least a portion of the sensor 145 is drawn into the aperture 2905. The sensor 145 may stretch as it is pulled into the aperture 2905 and a strain may be measured using the sensor 145. The measured strain may be used to monitor the application of negative pressure. In some embodiments, the amount of measured strain may be correlated to the amount of negative pressure supplied through the fluid conductor 465.

The systems, apparatuses, and methods described herein may provide significant advantages. For example, measuring and trending the force applied to the dressing 110 and the displacement of the dressing 110 using the sensor 145 can allow for measuring the applied closure force to the tissue site 1700. Being able to measure the closure force applied to the tissue site 1700, can demonstrate that placing the dressing 110 over the wound 1715, instead of just within the wound 1715, results in the creation of forces which assist with closing the wound 1715. Additionally, providing the dressing 110 with the sensor 145 allows recording of a measurement that corresponds to the depth of the tissue site 1700. Further, monitoring the output of the sensor 145 over the duration of therapy can assist in tracking how the tissue site 1700 is filling and healing, as well as identifying when the tissue site 1700 has returned to the "wound full" level, indicating complete or nearly complete healing of the tissue site 1700. Tracking of how the tissue site 1700 is filling and healing using the sensor 145 may also provide assistance with follow-on therapies, such as skin grafting, the use of a dermal scaffold, or another skin coverage procedure. The use of the sensor 145 to monitor healing of the tissue site 1700 may be particularly beneficial in situations where the dressing 110 is not changed for three to fourteen days. These benefits can be achieved without impacting the application of negative pressure to the tissue site 1700 or the beneficial fluid removal and manifolding effects provided by embodiments of the dressings 110 described herein.

Additionally, in embodiments where the dressing 110 is applied over the tissue site 1700 instead of in the tissue site 1700, the sensor 145, such as the EAP sensor or the strain gauge sensor, coupled to the dressing 110 may allow measuring the strain applied to the dressing 110 to show that the dressing 110 results in the creation of forces which assists in wound closure.

Additionally, the sensor 145 may provide additional data about the dressing 110 and/or the tissue site 1700 which allows a higher level of control over the environment of the tissue site 1700. For example, the load data obtained using an EAP sensor or strain gauge, either alone or in combination with measured gas pressure, may provide real-time data about the delivery of beneficial forces, such as, for example, the closure forces, to the tissue interface 120. As another example, wherein the sensor 145 comprises one or more EAP sensors or strain gauges, the strain in the dressing 110 can be measured as an analogue to the applied negative-pressure and is not subject to the pressure drop inherent in the fluid conductor 465. Accordingly, the measurements from the sensor 145 may provide a better measure of the actual negative-pressure applied to the tissue site 1700 so that the controller 130 can more accurately deliver the desired negative pressure to the tissue site 1700. Additionally, in embodiments where the sensor 145 includes pressure sensors 1005, blockages and pressure drops in the tissue interface 120, which can negatively impact the delivery of negative pressure to the tissue site 1700 may be directly identified and measured. The sensor 145 may enable the controller 130 to distinguish between a blockage and when the container 115 is full. Accordingly, a clinician can be notified of the existence of a blockage or excessive pressure drop so that the clinician can eliminate the blockage and/or change the dressing 110.

The sensor 145 may further provide a force measurement sensor that can be integrated with the dressing 110 to telemeter and record the deformation of the dressing 110 as it is pushed into the wound 1715 while being able to provide a "pressure loss" or "blockage alarm" in the event of a failure of the tissue interface 120 to deflate or a rapid inflation of the tissue interface 120 due to a blockage in the fluid conductor 465 or a failure in the therapy system 100, which is not reliant upon or affected by contact with fluids from the tissue site 1700. The sensor 145 can detect the presence of sub-atmospheric pressure at the tissue site 1700, while being fluidly uncoupled. If the pressure at the tissue interface 120 changes rapidly and returns to an inflated state and no reduction of negative pressure is measured by the sensor 135, a blockage can be identified. Moreover, the sensor 145 coupled to the dressing 110 allows for determining blockages or leaks without requiring a multi-lumen fluid conductor and a pressure sensor, which may reduce cost and/or complexity of the therapy system 100. The sensor 145 may be in direct contact with the tissue site 1700 or may be located behind the third layer 415 without any impact on its ability to measure strain or load. The sensor 145 may provide a low-cost way of measuring the negative pressure applied to the tissue site 1700. The sensor 145 may be used with a variety of negative-pressure therapy systems, including the therapy system 100, to enhance feedback and safety.

The ability of some embodiments of the sensor 145 and the sensor assembly 910 to operate without being in fluid or gas contact with the tissue site 1700 and any fluids therefrom, allows the sensor 145 and the sensor assembly 910 to be used multiple times on the same or different tissue sites. Additionally, the microprocessor in the first wireless communication module 950 in the sensor assembly 910 may allow the sensor module 1400, including the sensor assembly 910 and the sensor 145, to operate independently of the therapy system 100, including the controller 130 thereof.

The sensor 145 and the sensor assembly 910 may provide additional benefits. For example, if the sensor 145 measures a drop in strain, and thus a drop in reduced pressure applied to the tissue site 1700, the sensor assembly 910 may cause a user interface on the sensor module 1400, the controller 130, and/or the remote device 1320 to change color and/or to emit a sound. The sensor assembly 910 may even send a text message to a designated phone number. The ability of the sensor assembly 910 to transit information regarding the sensor 145 to a remote location may be particularly beneficial if a patient has multiple tissue sites 1700 connected to single therapy system 100 via Y-connector, where the Y-connector communicates negative pressure from only one tissue site 1700 to the sensor 135. The ability of the sensor assembly 910 to transit information regarding the sensor 145 to a remote location may also allow the status of negative-pressure therapy to be remotely monitored for multiple patients.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use. For example, in some configurations the dressing 110, the container 115, or both may be separated from other components for manufacture or sale. In other example configurations, the controller 130 may also be manufactured, configured, assembled, or sold independently of other components.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A dressing for treating a tissue site with negative pressure, the dressing comprising:
   a tissue interface;
   a cover coupled to the tissue interface; and
   a sensor having a plurality of fluid restrictions through the sensor and configured to measure a strain in the dressing.

2. The dressing of claim 1, wherein the strain in the dressing is correlated to a negative pressure applied to the tissue site.

3. The dressing of claim 1, wherein the strain in the dressing is correlated to a depth of the tissue site.

4. The dressing of claim 1, wherein the sensor is coupled to the cover.

5. The dressing of claim 1, wherein the sensor is coupled to the tissue interface opposite the cover.

6. The dressing of claim 1, wherein the sensor is coupled to the cover by a silicone or polyurethane adhesive.

7. The dressing of claim 1, wherein the tissue interface further comprises a fluid control layer comprising a liquid-impermeable, elastomeric material, and wherein the sensor is coupled to the fluid control layer.

8. The dressing of claim 1, wherein the sensor comprises an electroactive polymer sensor.

9. The dressing of claim 8, wherein the cover has a central portion that is located over the tissue interface and a peripheral portion that is configured to be coupled to undamaged epidermis peripheral to the tissue site, and wherein the sensor has an elongate shape and is configured to extend from the central portion to the peripheral portion.

10. The dressing of claim 9, wherein the sensor has an elongate shape having a first end and a second end, wherein the first end is configured to be located in the central portion and the second end is configured to be located in the peripheral portion.

11. The dressing of claim 1, wherein the sensor extends along a length of the dressing.

12. The dressing of claim 1, wherein the sensor comprises a strain gauge.

13. The dressing of claim 1, wherein the sensor is encased within a medical-grade polymer.

14. The dressing of claim 1, further comprising a dressing interface configured to be fluidly sealed with the cover and fluidly coupled to the tissue interface.

15. The dressing of claim 14, wherein the dressing interface further comprises a user interface configured to indicate a status of the sensor.

16. The dressing of claim 14, wherein a signal is configured to be communicated from the sensor to the dressing interface and electrical energy is configured to be supplied from the dressing interface to the sensor if the dressing interface is coupled to the sensor.

17. The dressing of claim 1, wherein the sensor further comprises electrical leads extending from the sensor and terminating at terminals located on the cover.

18. The dressing of claim 17, further comprising a dressing interface having electrical leads terminating at terminals configured to be coupled with the terminals of the sensor.

19. The dressing of claim 1, wherein the sensor further comprises an NFC target that is configured to be coupled with an NFC initiator to power and query the sensor.

20. The dressing of claim 1, wherein the sensor further comprises a wireless communication module configured to transmit data to and from the sensor.

21. The dressing of claim 1, further comprising a gas pressure sensor disposed in the tissue interface, the gas pressure sensor configured to measure a gas pressure delivered to the tissue site.

22. A system for treating a tissue site, the system comprising:
the dressing of claim 1; and
a negative-pressure source fluidly coupled to the dressing.

23. The system of claim 22, further comprising a controller coupled to the sensor, the controller configured to receive a signal from the sensor corresponding to a strain in the dressing.

24. The system of claim 23, wherein the controller is coupled to the negative-pressure source and configured to control the negative-pressure source in response to the signal received from the sensor.

25. A sensor module configured to be coupled to a dressing for treating a tissue site with negative pressure, the sensor module comprising:
a controller;
an electroactive polymer sensor coupled to the controller;
a dressing interface integrated with the controller, the dressing interface having a flange; and
the electroactive polymer sensor coupled to and extending outwardly from the flange, a surface of the electroactive polymer sensor configured to face the tissue site being coplanar with a surface of the flange configured to face the tissue site.

26. The sensor module of claim 25, wherein the electroactive polymer sensor is configured to measure a strain in the dressing.

27. The sensor module of claim 25, further comprising one or more of a temperature sensor and a humidity sensor.

28. A method of treating a tissue site with negative pressure, the method comprising:
coupling a dressing to the tissue site, the dressing comprising:
a cover; and
a tissue interface coupled to the cover, wherein the tissue interface is proximate a wound;
coupling a sensor to the dressing, the sensor having a plurality of fluid restrictions through the sensor and configured to measure a strain in the dressing;
fluidly coupling a dressing interface to the dressing;
fluidly coupling a fluid conductor to the dressing interface;
fluidly coupling a negative-pressure source to the tissue interface via the fluid conductor;
measuring a baseline strain in the dressing using the sensor in the absence of negative pressure applied to the tissue site;
applying negative pressure to the tissue site using the negative-pressure source;
measuring a strain in the dressing using the sensor; and
determining a depth of the tissue site based on the measured strain.

* * * * *